(12) United States Patent
Simon

(10) Patent No.: US 11,047,683 B2
(45) Date of Patent: Jun. 29, 2021

(54) METHOD OF ESTIMATING A DIRECTION OF ABSOLUTE ORIENTATION OF AN OPTRONIC SYSTEM

(71) Applicant: THALES, Courbevoie (FR)

(72) Inventor: Alain Simon, Les Mesnuls (FR)

(73) Assignee: THALES, Courbevoie (FR)

( * ) Notice: Subject to any disclaimer, the term of this patent is extended or adjusted under 35 U.S.C. 154(b) by 392 days.

(21) Appl. No.: 16/308,405

(22) PCT Filed: Jun. 20, 2017

(86) PCT No.: PCT/EP2017/065025
§ 371 (c)(1),
(2) Date: Dec. 7, 2018

(87) PCT Pub. No.: WO2017/220537
PCT Pub. Date: Dec. 28, 2017

(65) Prior Publication Data
US 2019/0383609 A1     Dec. 19, 2019

(30) Foreign Application Priority Data

Jun. 21, 2016 (FR) .................................. 1600986

(51) Int. Cl.
*G01C 9/00* (2006.01)
*G01C 17/38* (2006.01)
*G01S 5/16* (2006.01)

(52) U.S. Cl.
CPC .............. *G01C 17/38* (2013.01); *G01C 9/00* (2013.01); *G01S 5/163* (2013.01)

(58) Field of Classification Search
CPC .................................. G01C 17/38; G01C 9/00
(Continued)

(56) References Cited

U.S. PATENT DOCUMENTS 6,009,629 A      1/2000  Gnepf et al.
7,451,059 B2    11/2008  Malchi et al.
(Continued)

FOREIGN PATENT DOCUMENTS

EP       0 351 469 A1    1/1990
FR       2 969 766 A1    6/2012
WO    2011/073144 A1    6/2011

OTHER PUBLICATIONS

Guan, et al., "The Novel Method of North-finding Based on the Skylight Polarization", Journal of Engineering Science & Technology Review, vol. 6, Issue 1, pp. 107-110, (2013).
(Continued)

*Primary Examiner* — Aditya S Bhat
(74) *Attorney, Agent, or Firm* — BakerHostetler

(57) ABSTRACT

A method for estimating the bearing of an optronic system in a geographical reference frame, the optronic system being situated at a first position and denoted first optronic system is provided. It comprises the following steps: defining a collaborative configuration, by way of the first optronic system and of at least one other optronic system, the optronic systems being respectively situated at separate positions and equipped with means for communication with one another, and with acquisition devices, acquiring, in a scene, one or more objects common to the optronic systems, the direction of orientation between each optronic system and each object being unknown, determining two positions from among those of the optronic systems, for at least one common object: measuring the relative angle by way of a relative angle measurement device fitted to the first optronic system, measuring the elevation of the object by way of an elevation measurement device fitted to the first optronic system, performing additional measurements by way of each other optronic system, with the two positions and the measurements constituting observations, communication, by the
(Continued)

other optronic system(s) to the first optronic system, of the observations that it does not have, on the basis of the observations, estimation, by the first optronic system, of the bearing of the first optronic system.

25 Claims, 11 Drawing Sheets

(58) Field of Classification Search
USPC .......................................................... 702/150
See application file for complete search history.

(56) References Cited

U.S. PATENT DOCUMENTS

| | | |
|---|---|---|
| 8,151,475 B2 | 4/2012 | Albo et al. |
| 2010/0088063 A1 | 4/2010 | Laughlin |
| 2015/0075359 A1* | 3/2015 | Seugnet .................. F41G 3/065 89/200 |

OTHER PUBLICATIONS

Khalighi, et al., "Survey on Free Space Optical Communication—A Communication Theory Perspective", Journals & Magazines, IEEE Communications Surveys & Tutorials, vol. 16, Issue: 4, 2014.
Kirchner, et al., "Multistatic Laser Ranging to Space Debris", 2012.
Gardi, et al., "Unmanned Aircraft Bistatic LIDAR for CO2 Column Density Determination", 2014 IEEE Metrology for Aerospace (MetroAeroSpace), 2014.
Dalgleish, et al., "Experiments in bistatic Laser Line Scan (LLS) underwater imaging", Oceans 2009.

\* cited by examiner

METHOD OF ESTIMATING A DIRECTION OF ABSOLUTE ORIENTATION OF AN OPTRONIC SYSTEM

CROSS-REFERENCE TO RELATED APPLICATIONS

This application is a National Stage of International patent application PCT/EP2017/065025, filed on Jun. 20, 2017, which claims priority to foreign French patent application No. FR 1600986, filed on Jun. 21, 2016, the disclosures of which are incorporated by reference in their entirety.

FIELD OF THE INVENTION

The field of the invention is that of estimating the bearing of one or of a plurality of optronic systems in order to determine absolute directions of orientation in a geographical reference frame (North-finding function) and possibly positions (location function). The invention also makes it possible to estimate the complete attitude of one or more systems in a geographical reference frame (attitude calibration function).

BACKGROUND

System orientation technologies, whether these be technologies for determining the direction of the North or for estimating attitude, are found in numerous civilian and military applications and also in mechanisms within living beings.

For military applications, mention may be made of techniques using: magnetic compasses, such as described in document U.S. Pat. No. 6,009,629 "Process for determining the direction of the earth's magnetic field", but they exhibit poor performance (class of 10 milliradians) that are difficult to integrate in order to isolate the compass from other apparatuses using current sources that modify the EM environment, and require knowledge of the local magnetic declination (angle between local magnetic and geographic meridians, to be added to the magnetic measurement in order to ascertain the geographic azimuth), which is itself also poorly known within the class of 10 milliradians, in order to transform the magnetic azimuth into a geographic azimuth or direction; FOGs, an acronym for the expression fiber-optic gyroscopes, laser gyrometers (RLGs or ring laser gyroscopes), hemispherical resonator gyroscopes (or HRGs), as described in document U.S. Pat. No. 8,151,475 "North finding device, system and method", but these exhibit drawbacks in terms of volume, mass, electrical consumption and a high cost;

MEMSs (microelectromechanical systems), which aim to replace magnetic compasses, as described in document US20100088063 "Method and Apparatus for Precision Azimuth Measurement", but these exhibit insufficient performance (a few milliradians), low maturity and require a calibration procedure that may be lengthy and complex;

landmarks or geographical coordinates with spatial or terrestrial information, as described in document U.S. Pat. No. 7,451,059 "True azimuth and north finding method and system", but these do not always make it possible to ascertain "correct coordinates", that is to say in at least the class of a meter, as well as sufficiently characteristic details regardless of the area of implementation and that are situated within the acquisition perimeter of the device. This is supplemented by a problem of ageing/updating of reference data and of description that is insufficient for allowing referencing from viewpoints that may be highly different (notably between vertical map or satellite views and a quasi-horizontal view of the device);

directions of celestial bodies, as described in document EP0351469 "An astronomical north finding system", which offer good but non-continuous performance (difficult to see stars during the day, or the sun through thick cloud);

antennae with GNSS receivers that allow reasonable performance to be achieved for length bases greater than 1 m, but for a size, a mass and a consumption that are barely compatible with a portable device and require time and prudence in terms of installation;

magnetohydrodynamics, as described in the document by Agnew et al. "North-Finding Module base on Magneto-Hydrodynamic Sensor".

In terms of civilian applications and in addition to the above list, reference is essentially made to the total station (theodolite or tachometer) used by geometers. These apparatuses use gyrometers or coders that allow measurements of angles with excellent precision (50 μrad). However, this measurement precision is not calibrated and does not allow use thereof for the sole purpose of achieving an absolute measurement. To this end, they generally resort to using references (landmark, celestial bodies). In addition, the implementation time of these systems is lengthy (more than 10 minutes), they have a high cost (about €50 k) and a considerable weight (about 30 kg).

By virtue of an attractive cost and volume, the growing number of MEMSs in numerous apparatuses and domestic applications is speeding up maturity thereof (harnessing of components such as accelerometers and magnetometers, and calibration performance), without it however being possible to imagine performances better than 5 mrd for several years. Moreover, although their accelerometers are able to be calibrated just once (in the factory), calibrating their magnetometers requires a systematic procedure on the site of use prior to measurement.

In terms of the techniques implemented by living beings, reference is made in particular to the navigation and orientation of animals (such as bees, homing pigeons, starlings, monarch butterflies, etc.) with the sun and the utilization of the polarization of the sky, which is used by some flying animals to navigate over long distances, as described in the document by Guan et al. "The Novel Method of North-finding Based on the Skylight Polarization" (2013). Other animals use the stars for nocturnal migration (sparrows, and some grasshoppers), and others use the Earth's magnetic field, the wind or seabed currents. For many of them, the operation of the receptor organs and the processing of information remains poorly understood. The same is true for the efficiency with which these organisms are able to estimate orientation, but this seems insufficient)(>1°) with regard to what is targeted here (~1 mrd) and is based on a device and mechanisms that are not easily reproducible outside of a living system.

The drawbacks of these approaches are summarized in the following table:

| | |
|---|---|
| Magnetic compass | Imprecise measurement subject to electromagnetic fluctuations in the environment requires knowledge of the local magnetic declination |
| FOG gyro | Expensive and heavy and initialization constraint |
| MEMS | Imprecise, immature and initialization constraint |
| Celestial | Non-continuous, possible identification difficulty with regard to stars, requires good measurement of the vertical. |
| GNSS | Requires reception over the area of the optronic system and bulky in terms of the deployment (antenna) of the apparatus |
| Landmark | Requires access to details regarding the area whose coordinates have to be determined during preparation. The level of precision of the coordinates adds constraints with regard to the sources used for preparation. Visibility of the landmarks over an area and measurement capability are not guaranteed. |
| Magnetohydrodynamics | Insufficient performance on a low-cost detector, otherwise volume, cost and implementation relatively burdensome. |
| Optical coder | Precise relative measurement but requires calibration with a reference to fix the origin of the measurements. |
| Polarization of the sky | Very imprecise, immature |
| theodolites | High implementation time and cost. Need for a geodetic reference. |

Overall, the availability of the direction of the North, or more generally of a direction of orientation, of the class of the milliradian remains a challenge that is difficult to solve without using reference information and with use of a low-volume and low-cost (of the order of €1 k) system.

It involves determining, by way of optronic systems, geographical directions and possibly geographical locations of objects of a scene, with an aim of high accuracy (better than one milliradian), quickly (within a few seconds) and without accessing a spatial reference, such as landmark coordinates, measurements or directions of objects visible in the scene, and doing so by way of a lightweight additional device of little cost.

SUMMARY OF THE INVENTION

The aim of the invention is to respond to this challenge by overcoming the drawbacks associated with the above methods.

According to the invention, the function for estimating the direction of the North or "North finder" is performed, generally in real time, by a collaborative estimation of the bearing of a plurality of delocalized optronic systems, in particular able to be equipped with optronic components including one or more cameras, with relative angle measurement apparatuses (EMAR), with geodetic position measurement apparatuses (EMPG) and with means for communication with one another, which exchange information and measurements on objects whose geographical coordinates or absolute positions and directions of orientation with respect to said systems are not known. The measurements obtained autonomously by the means specific to each optronic system are performed and exchanged between systems using a predefined protocol.

More precisely, one subject of the invention is a method for estimating the bearing of an optronic system in a geographical reference frame, with a predetermined desired precision (PGS), the optronic system being situated at a first position and denoted first optronic system. It is primarily characterized in that it comprises the following steps:

A) a collaborative configuration being defined by:
   a geometry or positions of at least two optronic systems including the first optronic system and at least one other optronic system, said optronic systems being respectively situated at separate positions and equipped with means for communication with one another and with devices for acquiring one or more objects in a scene, the first optronic system furthermore being equipped with an elevation measurement device and with a relative angle measurement device, each other optronic system furthermore being equipped with a distance measurement device and/or with an elevation measurement device and/or with a relative angle measurement device and/or with an approximate azimuth measurement device, K objects common to said optronic systems, whose positions are unknown, a nature of the measurements available for each optronic system, known statistical characteristics of the measurement errors, determining a collaborative collaboration in order to achieve the desired precision (PGS), which comprises the following sub-steps:

A1) defining a collaborative configuration,

A2) for this collaborative configuration, calculating, by way of a processing unit fitted to the first optronic system, a theoretical precision PGT using only said collaborative configuration and position scenarios for the objects, A3) comparing the calculated theoretical precision (PGT) and the desired precision (PGS) and, if the comparison is not satisfactory, reiterating steps A1), A2) and A3) for another collaborative configuration, and if not moving to step B), B) using the optronic systems of the collaborative configuration resulting from step A3), estimating a bearing ($\overline{G_1}$) of the first optronic system, which comprises the following sub-steps:

B1) by way of the acquisition device of each optronic system, acquiring, in the scene, one or more objects common to said optronic systems, the direction of orientation between each optronic system and each object being unknown, B2) determining two geodetic positions from among those of said optronic systems, B3) for at least one common object:
  measuring the relative angle by way of the relative angle measurement device fitted to the first optronic system (S1),
  measuring the elevation of the object by way of the elevation measurement device fitted to the first optronic system (S1),
  by way of the first optronic system (S1) and of each other optronic system (S2, . . . , Sm, . . . SM), performing additional distance and/or elevation and/or relative angle and/or approximate azimuth measurements,
B4) with the two positions and said measurements constituting observations, communication, by each other optronic system (S2, . . . , Sm, . . . SM) to the first optronic system (S1), of the observations resulting from each other optronic system,
B5) on the basis of the observations resulting from the first optronic system and of the observations communicated by each other optronic system, estimating the bearing ($\overline{G_1}$) of the first optronic system using a processing unit (110) fitted to the first optronic system, configured to solve a system of equations having at least one unknown which is the bearing ($\overline{G_1}$) of the first optronic system,
C) estimating a precision (PGE) of the estimated bearing ($\overline{G_1}$) of the first optronic system, comparing it with the desired precision (PGS) and, if the comparison is not satisfactory, reiterating steps A), B) and C), choosing another collaborative configuration.

The method makes it possible to obtain a bearing and therefore a direction of the geographical North (also denoted North) with a quality greater than what a single optronic system would be capable of obtaining, including in a situation in which it were to have identical measurements on all of the objects. Some optronic systems may not even have measurement apparatuses allowing them to autonomously determine a North even with poor quality.

To clarify expectations, with measurements whose precisions are as follows:
  absolute position, with EMPG, of the class of 3 m to 1 σ,
  relative positions of the optronic systems of the order of 1 m to 1 σ,
  elevations of the lines of sight to the objects of the class of 1.5 mrd,
  distance from an object to the optronic system of the class of 2 m to 1 σ,
  measurement of relative angle between lines of sight of the class of 0.5 mrd to 1 σ,
the class of accuracy obtained with regard to the bearing estimation for the first optronic system is then of the order of 1 mrd to 1 σ with a base between the systems of the order of magnitude of one kilometer, σ being the standard deviation of the distribution about the mean value. The performance (or precision) here is simply given in the form of an order of magnitude, as it depends:
  on the number of objects with regard to which the systems share their measurements,
  on the geometrical configuration of the objects, that is to say their relative position on the ground and their position with respect to the optronic systems, the measurement methods implemented by the optronic systems; for example with or without "electronic distance measurement apparatuses" EMED, with or without "geodetic position measurement apparatuses" EMPG, etc.

The performance may be sub-mrd but, in order to achieve this level of performance, with regard to the orders of magnitude communicated for the measurements, optimization is preferably performed by amending:
  the number and/or the position of the collaborating optronic systems,
  the number and/or the position of the objects on which the measurements are performed.

The main advantages of the method according to the invention are as follows:
  high precision for the function of estimating the bearing and therefore for the North-finding function, linked to the ability to observe objects in basic configurations between systems and/or for positioning objects relative to the collaborating systems; this being the case independently of the latitude, in contrast to methods sensitive to the measurement of gravity or to motion acceleration or the Earth's rotation, and independently of the accurate knowledge of the local electromagnetic environment for methods based on measurements of the Earth's magnetic field,
  ability to estimate, by way of a network of optronic systems and a set of observations, a value (such as in particular a bearing or the direction of the North and/or the position of a system), which is inaccessible using a single system,
  high degree of availability of the North-finding function linked:
    to the low constraints with regard to the information to be acquired (objects having unknown and non-cooperating coordinates)
    to the capability of operating with systems having devices that are not being used (for example systems without EMEDs, without EMPGs)
    to the possibility of working in a constricted environment, liable at least locally to worsen or to inhibit the use of devices on some systems,
    to extend the (passive) reference acquisition area,
    to extend the area of activity (coverage of networked systems greater than that of a single system),
  SWaP (small weight and power) aspect
    equal volume, as there is no addition of specific hardware apparatuses for performing the North-finding function on an optronic system that is already equipped so as to perform topographical measurement, monitoring or target-tracking functions (leaving aside communication means that are moreover generally available)
    equal mass, as the essentially software requirement is able to be implemented on existing cards/CPU,
    low consumption limited to a low CPU requirement,
  of being able to be added easily within pre-existing apparatuses with little impact on the architecture of optronic systems (essentially a software modification),
  without the requirement to methodically prepare the mission, in particular with the prior requirement to ascertain information or the requirement to deploy apparatuses in situ in order to determine geographical coordinates of objects, speed of availability of a bearing solution (typically less than 10 s) in contrast to some "North finding" methods, in particular inertia-based ones, which may require several minutes of observations at the level of an optronic system, or ones based on reference points requiring preparation work in order to work out coordinates,
  the solution is continuous since there is no need for maintenance as the solution does not drift, and there is the additional possibility of locating objects in the environment, once a bearing has been estimated, for the purpose of establishing a database of coordinates able to serve for anchoring purposes and the possibility of thus re-estimating the bearings of systems, including if they observe movements, low cost of the method, as the optronic system is equipped with the necessary measurement devices and the user has a communication means.

This method also makes it possible to work opportunistically. Opportunistically is understood to mean the ability to estimate the bearing:

quickly, that is to say:
without resorting to analysis or to a prior operation of analyzing or working out characteristics of elements of the area (for example preparation of the mission consisting in extracting landmarks or other information from the scene),
without implementing an acquisition procedure exceeding 30 seconds, autonomously, that is to say without resorting to a source of external information able to add scale information, and without resorting to a source of spatial references or geographical coordinates of entities of the scene, with objects that are not preselected by are chosen in situ (without prior designation or advance identification) and that do not have the configuration of a set or of a specific geometric pattern that would considerably reduce the possibility of effectively using the device without modifying the deployment thereof, with particular objects that do not require an exchange of information regarding their position/direction or, more generally, that do not require information other than just their photon emission, without preparation prior to the mission and without deployment of any additional device in the scene before the measurements are performed.

Using a configuration of networked collaborating optronic systems thus makes it possible to substantially increase the amount of information/number of observations available and the number of unknowns to be determined.

The expected advantages pertain to:
the operating capability, which extends over an area greater than what an optronic system operating with a landmark would be able to achieve (dispensing with a distance measurement on objects makes it possible notably to increase the search area, from the acquisition range of the EMED to the visual range of the system),
the performance of the collaborative system is better than that of a single system accessing a landmark, and is adjustable simply by amending the distance and the positioning relative to the object(s), the number of objects that are used, the nature of the measurements that are performed, the way in which the calculations are estimated or worked out,
the capability of operating with devices having different methods (for example no EMED in order to lighten the systems, reduce their cost, their mass, their consumption and increase their discretion),
the ability to operate in constricted electromagnetic conditions:
no GNSS signals on a system (masking or no receiver),
no MED on an object, either through the choice of discretion in a tactical context, or due to an equivalent surface of the object that is too small to return a signal level able to establish the MED,
advantages of networked systems (modularity, robustness to faults, etc.),
ability to deploy the function on a pre-existing system simply by updating software (primarily software exclusive of information-exchanging means).

The PGS class is typically the class of 1 mrd.

Acquisition of an object of the scene at the level of a system refers, in the broadest sense, to the operations:
of choosing this object in the scene,
of collecting information regarding this object,
of extracting information regarding this object.

For one specific implementation of the process, these operations may be performed in an operator-assisted manner or automatically.

The choice of an object may be guided in accordance with a pre-established acquisition doctrine and/or visibility reasons.

Information collection relates to the creation of an image of the object in an optronic path or the materialization thereof in a direct path that ensures the simple centering thereof on the path that is used, the measurement of absolute and/or relative angles, the measurement of distance between the system and the object, the reception, on the system, of signals coming from another system and reflected by this object.

Information extraction consists in looking for specific structures on the collected signal in order to ascertain a characteristic and generally compressed representation of the object for the purpose of utilizing it and/or transmitting it in a more relevant, robust and automatic manner. These processing operations are performed in the calculating unit 110 or on the internal calculator of 120.

In one assisted implementation, pointing of the object at the center of an imager 101 will be enough to collect and associate with it the EMED and EMAR information without extracting more information. It is also possible to contemplate manually extracting the coordinates of one or more imaged objects outside of the image center through designation of the operator and using the optical characteristics of the imager and the angular measurement means to determine the directions of the imaged objects that may be designated in the image.

In one automatic implementation that may be contemplated either with low-field imagers mounted on a pan & tilt platform or omnidirectional imagers (OMNI), the characteristics of the objects will preferably be extracted automatically, as indicated further below. For these 2 situations, the hardware in question performs the role of an EMAR 130. For use with pan & tilt, the automation of the method assumes:
that a first system establishes an approximate location of the area of interest with its own collection means (EMPG 105, EMED 106/107 and magnetic compass 108 for example)
that the collaborating systems orient their imaging path and EMED in the direction defined according to their position given by their EMPG and the approximate location communicated by the first system.

The reacquisition, on a system "Sj", of an object from the scene already acquired by a system "Sj" may be guided by the same principles as those implemented for collection thereof on the first system 'Si'. As indicated, it moreover uses an "approximate" location. The term "approximate" in this case qualifies the quality of a location accessible on a system "Si" that does not generally have a bearing or a reference orientation allowing it to access the PGS directly; in practice there may be more than one order of magnitude between the approximate orientation measured on "Si" and the one allowing access to the PGS.

The collection also covers the exchange, between the systems, of information in relation to their measurements. When information is received, the provision of measurements originating from other systems, leading to the number of degrees of freedom (DoF), with regard to the quantities to be estimated, of the receiver system being reached or exceeded, makes it possible:

to estimate the quantities, comprising in particular the bearing thereof, to improve the positions of the objects already acquired by the system; this post-processing will notably improve a possible future orientation of a new system with regard to this object, to improve positioning when a new object is chosen at the level of the system; this enhancement will then benefit the future reacquisitions of this object.

Various configurations of collaborating systems are contemplated.

For example, the steps of estimating the bearing ($\overline{G_1}$) of the first optronic system are performed by way of two optronic systems and for a single common object, and the additional measurements are obtained as follows:

measuring the distance between each optronic system and the object by way of a distance measurement device fitted to each optronic system, measuring, in an approximate manner with precision better than 5°, an azimuth of the object by way of an approximate azimuth measurement device fitted to the first optronic system, and the observations are sufficient for the estimation.

For example, the steps of estimating the bearing ($\overline{G_1}$) of the first optronic system are performed by way of two optronic systems and for two common objects, and the additional measurements are obtained as follows:

measuring the distance between each optronic system and each object by way of a distance measurement device fitted to each optronic system, measuring the elevation between each optronic system and each object, and the observations are sufficient for the estimation.

For example, the steps of estimating the bearing ($\overline{G_1}$) of the first optronic system are performed by way of two optronic systems and for two common objects, and the additional measurements are obtained as follows by each optronic system:

measuring the distance between the first optronic system and each object by way of a distance measurement device fitted to the first optronic system, measuring the elevation of each object by way of an elevation measurement device fitted to each optronic system, measuring the relative angle of each object by way of a relative angle measurement device fitted to each optronic system, measuring an azimuth, with a precision better than 5°, on one of the two objects by way of an azimuth measurement device fitted to each optronic system, on the basis of the observations, estimating, using the first or the second optronic system, the bearing of the second optronic system with a precision of at least the PGS class, and the observations are sufficient for the estimations.

For example, the steps of estimating the bearing ($\overline{G_1}$) of the first optronic system are performed by way of two optronic systems and for at least two common objects, and the additional measurements are obtained as follows:

measuring the distance between each optronic system and each object by way of a distance measurement device fitted to each optronic system, measuring the elevation of each object by way of an elevation measurement device fitted to each optronic system, measuring the relative angle of each object by way of a relative angle measurement device fitted to each optronic system, on the basis of the observations, estimating the bearing of the second optronic system with a precision of at least the PGS class, and the observations are sufficient for the estimations.

For example, the steps of estimating the bearing ($\overline{G_1}$) of the first optronic system are performed by way of two optronic systems and for one common object, and the additional measurements are obtained as follows:

measuring the distance between each optronic system and the object, by way of a distance measurement device fitted to each optronic system, measuring the elevation of the object by way of an elevation measurement device fitted to each optronic system, on the basis of the observations, estimating the bearing of the second optronic system with a precision of at least the PGS class, and the observations are sufficient for the estimations.

For example, the steps of estimating the bearing ($\overline{G_1}$) of the first optronic system are performed by way of two optronic systems and for one mobile common object, the measurements are performed over time intervals that at least partly overlap, and the additional measurements are obtained as follows:

measuring the distance between each optronic system and the object by way of a distance measurement device fitted to each optronic system, measuring the elevation of the object by way of an elevation measurement device fitted to each optronic system, measuring the relative angle by way of a relative angle measurement device fitted to each optronic system, measuring an azimuth between each optronic system and the object, with a precision better than 5°, by way of an azimuth measurement device fitted to each optronic system, on the basis of the observations, estimating the bearing of the second optronic system, and the observations are sufficient for the estimations.

The acquisition of measurements on fixed objects, from delocalized fixed optronic systems, does not require any particular prudence to synchronize the measurements.

The acquisition of mobile objects may also make it possible to provide a North-finding function. In the middle of a stretch of water for example, a moving watercraft may perform the role of a common object for measurements, provided that the system is able to synchronize said measurements.

According to one feature of the invention, at least one common object is mobile; the measurements are then performed over time intervals that at least partly overlap.

Advantageously, the path of the mobile object is estimated at the same time as said estimations, over the time range of the measurements.

For example, the steps of estimating the bearing ($\overline{G_1}$) of the first optronic system are performed for two common objects and by way of two optronic systems, the communication means are optical means, and the additional measurements are obtained as follows:
  measuring the distance corresponding to the sum of the distance between an object and an optronic system and the distance between said object and the other optronic system by way of a distance measurement device comprising an emitter fitted to the other optronic system and a receiver fitted to the optronic system,
  measuring the relative angle of each object by way of a relative angle measurement device fitted to each optronic system,
  measuring an azimuth between each optronic system and each object by way of an azimuth measurement device fitted to each optronic system,
  on the basis of the observations, estimating the bearing of the second optronic system,
  and the observations are sufficient for the estimations.

For example, the steps of estimating the bearing ($\overline{G_1}$) of the first optronic system are performed for at least two common objects and by way of at least two optronic systems, and the additional measurements are obtained as follows:
  measuring the relative angle of each object by way of the relative angle measurement device fitted to the first optronic system,
  measuring the elevation of each object by way of the elevation measurement device fitted to the first optronic system,
  measuring the distance between each optronic system and each object, by way of a distance measurement device fitted to each optronic system,
  and the observations are sufficient for the estimation.

For example, the steps of estimating the bearing ($\overline{G_1}$) of the first optronic system are performed for at least one common object and by way of at least three optronic systems, and the additional measurements are obtained as follows:
  measuring the relative angle of each object by way of a relative angle measurement device fitted to each optronic system,
    and the elevation of each object by way of an elevation measurement device fitted to each optronic system,
  determining the position of a third optronic system,
  on the basis of the observations, estimating the bearing of each optronic system,
  and the observations are sufficient for the estimation.

For example, the steps of estimating the bearing ($\overline{G_1}$) of the first optronic system are performed for at least two common objects and by way of at least two optronic systems, and the additional measurements are obtained as follows:
  measuring the relative angle of each object by way of a relative angle measurement device fitted to each optronic system,
    measuring the distance between each optronic system and each object by way of a distance measurement device fitted to each optronic system,
    measuring an azimuth between each optronic system and each object, with a precision better than 5°, by way of an azimuth measurement device fitted to each optronic system,
  on the basis of the observations, estimating the bearing as well as the roll and pitch of each optronic system,
  and the observations are sufficient for the estimations.

For example, the steps of estimating the bearing ($\overline{G_1}$) of the first optronic system are performed by way of a first and of a second optronic system, for a common object and another object having an unknown position not common to the two optronic systems, that is to say visible only to the second optronic system, and the additional measurements are obtained as follows:
  measuring the elevation of each object by way of an elevation measurement device fitted to the second optronic system,
  measuring the distance between the first optronic system and the common object by way of a distance measurement device fitted to the first optronic system,
  measuring the distance between the second optronic system and each object by way of a distance measurement device fitted to the second optronic system,
  the position of the first optronic system is determined by way of a positioning device fitted to said optronic system and the position of the second optronic system is determined by estimation, and in that the observations are sufficient for the estimations.

When at least one optronic system Sm, m varying between 2 and M, is a mobile optronic system having a known path, the measurements performed from the mobile system(s) may be temporally synchronized.

When a magnetic compass is used, it may be calibrated by way of measurements on one or/and several objects.

According to one feature of the invention, it comprises, prior to the measurements, a step of selecting the objects of the scene using a common visibility criterion and/or a performance criterion regarding the direction of orientation.

It may also comprise, prior to the measurements, a step of selecting positions of the optronic systems.

The positions of the optronic systems are typically determined by way of a positioning device fitted to each optronic system.

The positions of the objects are generally unknown.

When an object has a known position, the position of the first optronic system is determined by way of a positioning device fitted to said optronic system and the position of the second optronic system is determined by estimation, and the observations are sufficient for the estimations.

According to one feature of the invention, the means for communication between the two optronic systems are formed by a radio link.

Having performed the bearing estimation or "North finding" function, the network of collaborating optronic systems is also able, simultaneously or sequentially, to perform location, tracking or 3D object reconstruction functions over the measurement area.

The method according to the invention may advantageously comprise a step of calculating the coordinates and/or the direction of the acquired objects on the basis of the observations.

Two optronic systems or even more may be one and the same portable optronic system, and the method then includes a step of moving the portable system from the first position to the second position.

The values and characteristics of the observations are generally stored by each optronic system.

Another subject of the invention is a computer program product, said computer program comprising code instructions for performing the steps of the method as described when said program is executed on a computer.

The bearing and therefore the North is obtained on each optronic system having a relative angular measurement apparatus, it being readily understood that optronic systems that do not have these are limited to supplying the other optronic systems of the network observing objects.

BRIEF DESCRIPTION OF THE DRAWINGS

Other features and advantages of the invention will become apparent on reading the detailed description that follows, given by way of nonlimiting example and with reference to the appended drawings, in which.

From one figure to another, the same elements bear the same references.

DETAILED DESCRIPTION

As will now be seen in more detail, the method according to the invention allows one or more optronic systems to calibrate their mechanical device or relative angle measurement apparatus (EMAR), this amounting to estimating the bearing of the system and therefore to determining the direction of the North with a predetermined desired precision. This covers the case of an optronic system that is not capable of obtaining this by itself, as well as the case of an optronic system that is able to obtain a bearing but not precisely enough. The term EMAR is used more generally to denote an apparatus having the ability to measure a relative angle. In practice, the EMAR may be a goniometer, an inertial measurement unit (IMU), a magnetic compass or any other instrument using a principle that makes it possible to evaluate a relative rotation. Its measurement accuracy should be consistent with the PGS in configurations for accessible deployment and for implementation of the systems.

A stationed 2-axis EMAR (with horizontal and vertical reading) makes it possible to measure the elevations directly. Stationing consists in particular in adjusting the horizontality of the plane of the EMAR, for example with a spirit-level device. To avoid this operation, which may prove tricky, it is possible to estimate, prior to the measurements on the objects, the non-horizontality of the EMAR when the optronic system has integrated inclinometers.

To operate with a device that is generally more lightweight, it is also possible to use a single-axis EMAR; an inclinometer for furthermore measuring the elevations of sighted objects should then be integrated into the optronic system and aligned with its LoS. Hereinafter, the configuration {stationed 2-axis EMAR} is therefore assimilated with the configuration {stationed 1-axis EMAR+inclinometer}.

Figure 1:
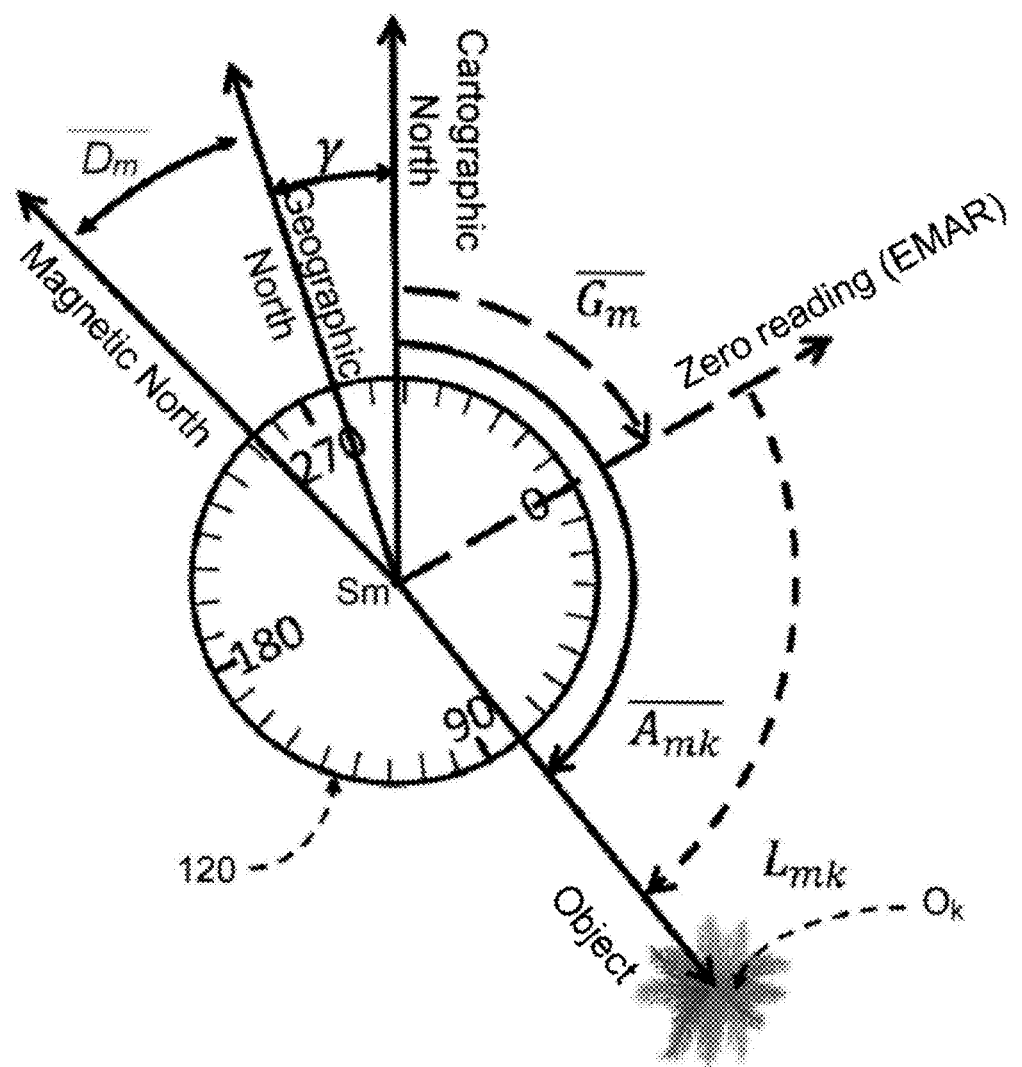
FIG. 1 illustrates the values respectively defined by the terms, bearing, azimuth, relative angle, FIG. 2 schematically show examples of visibility maps, respectively seen from 2 positions (FIG. 2a, FIG. 2b) and the visibility map common to the two positions (FIG. 2c), FIG. 3 schematically shows one example of collaborating optronic systems according to the invention, and using means for communication via radio link, FIG. 4 schematically shows another example of collaborating optronic systems according to the invention, and using optronic communication means, FIG. 5 schematically show examples of configurations of collaborative systems able to implement the method according to the invention, having 2 optronic systems and a single relative angle measurement device, FIG. 6 schematically show examples of configurations of collaborative systems able to implement the method according to the invention, having 2 optronic systems and 2 relative angle measurement devices, FIG. 7 schematically show examples of configurations of collaborative systems able to implement the method according to the invention, having at least 3 optronic systems, FIG. 8 schematically show examples of configurations of at least 2 collaborative systems, one of which does not have EMPG, FIG. 9 schematically shows the apparatuses of one example of a collaboration configuration with 2 systems having low-quality EMARs in the form of magnetic compasses, FIG. 10 show one example of a spatial representation of the efficiency with which it is possible to estimate a bearing (FIG. 10a) or a position (FIG. 10b) by presenting the information in the form of equal performance curves, obtained from configuration 2.4 of FIG. 6.

A few definitions are recalled with reference to FIG. 1. When the azimuth reference is cartographic (Grid North), the direction of an object in relation to the "North of the map" is called bearing or cartographic azimuth. When the reference of the directions is geographic North (True North), the angle between an object and this North is a geographic azimuth. The difference between the two azimuths corresponds to the local convergence of the meridians 'γ', which is fixed at a given location and for a given cartographic projection. Geographic azimuth and bearing of the EMAR (corresponding to the direction of the zero reading) or of an object are then equivalent (to within the constant γ). The magnetic declination "D" represents the angle between local magnetic and geographic meridians. While "γ" is obtained in an accurate manner without resorting to a physical measurement, this is not the case for "D", whose value is marred by a residual error of the class of ½°.

If $A_{mk}$ is the geographical azimuth at which an optronic system "m" observes an object "k", and if $L_{mk}$ is the horizontal reading of the EMAR of the optronic system m when the direction of observation (or Line of Sight or LoS) of the optronic optronic system is aligned with the object "k", then the bearing $G_m$ of the optronic system satisfies the basic relationship:

$$\overline{G}_m = \overline{A}_{mk} - L_{mk}$$

The bearing "G" of a system having an EMAR corresponds to the geographic azimuth of the direction corresponding to the zero of its horizontal reading. When it is stationed, the EMAR is positioned at the horizontal by way of a spirit level or by way of an automatic procedure (such as the attitude measurement configuration for example or else by comparing vertical measurements of a 2-axis EMAR with those of an inclinometer aligned with the LoS of the optronic system).

The method according to the invention is a collaborative method based on:
observing, by way of at least two non-collocated (that is to say respectively situated at separate positions) optronic systems, one to a plurality of common objects of the scene, these objects having an unknown position and direction (the direction of orientation between each optronic system and this (or these) object(s) is unknown); the only condition required for an object is that it is distinct enough from the background so as to be able to be acquired by said delocalized optronic systems, performing measurements on these objects, autonomously using each of the optronic systems, exchanging, between optronic systems:
at least two predetermined positions of optronic systems and measurements on these objects.
The device formed of all of the collaborating optronic systems is denoted "collaborative system".

The object may correspond to an artificial or natural structure of the scene. It may be fixed or mobile.

Before launching the step of acquiring the observations, the optronic systems that will collaborate, the apparatuses to be used and the objects to be measured are determined for the purpose of collecting the measurements that will best contribute to the North calculation function. The collaboration between systems is optimized by determining the objects of the scene that will be used and/or groups of optronic systems that are intended to collaborate.

First of all, it is evaluated whether the available resources (optronic systems, apparatuses available on the optronic systems, position of objects able to form the subject of a measurement) make it possible to evaluate the bearings to be estimated (on one or more optronic systems) according to the assigned quality objective, also called PGS or desired bearing precision.

PGE is used to denote the estimated bearing precision, PGS is used to denote the predetermined desired bearing precision (desired precision threshold), and PGT is used to denote the theoretical bearing precision, predicted according to the calculation as a function of the choice of a collaboration configuration.

When it is desired to ascertain the bearing with a predetermined precision PGS (desired bearing precision), one or more collaborative configurations are defined (step A1) by the processing unit of S1, or any other unit that may have information determined and communicated by the other systems, a collaborative configuration comprising a plurality of optronic systems and one or more common objects, and the following steps are performed prior to the measurements by way of the processing unit of S1:
  a) a theoretical bearing precision PGT is calculated for a collaborative configuration (step A2),
  b) when PGT PGS (step A3), the collaborative configuration is confirmed, and if not steps a and b are reiterated for another collaborative configuration.

To achieve the PGS, there is determined, from among all of the available resources (optronic systems, measurement devices, accessible areas), a minimum configuration that offers a theoretical bearing precision (PGT) closest to PGS. A theoretical bearing precision (PGT) is first of all evaluated using a calculation based on the information added by the geometry of all of the optronic systems (also denoted network) or by the position of the systems, by the nature of the available measurements (measurements that will be used, such as: angle, distance, elevation, position, etc., and the nature of these measurements so as not to confuse them with the measurement values expressed as a number of degrees, of meters, as geographical coordinates, etc.) and by the statistical characteristics of the errors in these measurements (bias, mean, standard deviation, distribution, etc.); this is done without effectively implementing measurements, that is to say without measuring their values.

Figure 11:
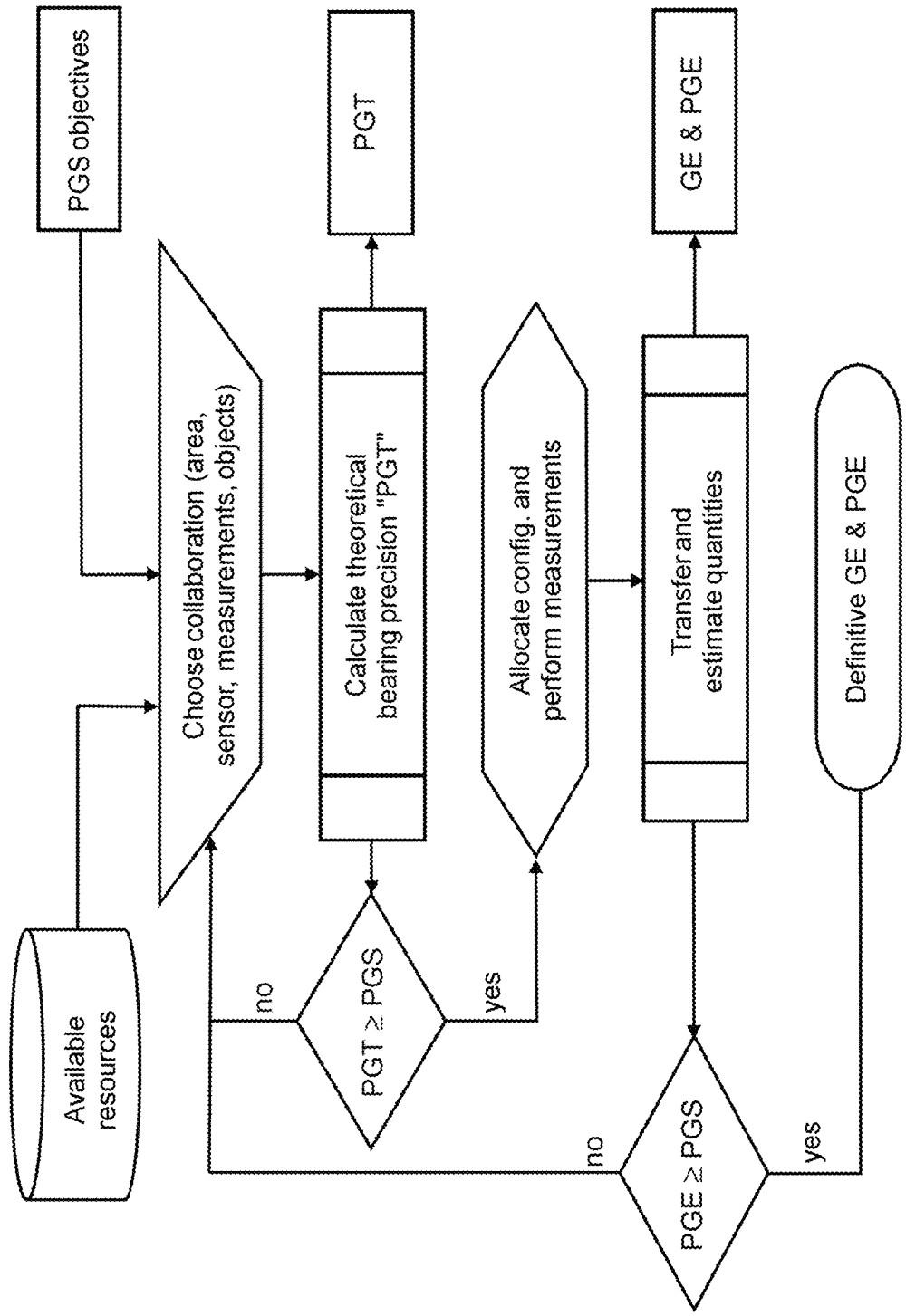
FIG. 11 is a flow chart illustrating various steps of selecting a collaboration configuration.

We preferably proceed incrementally as follows, as illustrated in FIG. 11, GE being the estimated bearing, also denoted $\overline{G_1}$.

We start naturally by choosing 2 systems S1, S2, and a collaboration between them is sought, for example limited to measurements on a single "visible" object (k=1) from the 2 systems (cf. FIG. 2), seeking one object whose a priori unknown position gives the best PGT.

If the PGT is compatible with the PGS (step A3), the collaborative configuration is confirmed.

If the PGT is insufficient, it is assumed that the object occupies a position corresponding to the location for which this PGT is the best possible (even if it is insufficient), and an additional object is sought that makes it possible to improve the PGT. Iteration is thus performed until reaching a threshold on a maximum number of objects (K=4 for example, but this number may be adjusted so as to comply with an acceptable time for exchanging information and for taking measurements, or in order to reach a sufficient degree of freedom with regard to the number of quantities to be estimated).

If the PGT is compatible with the PGS, the collaborative configuration is confirmed.

If the PGT still remains worse than the PGS, an additional optronic system, if it exists (S3), is taken into consideration by distributing a collaboration over a minimum number of objects (K):

If the PGT is compatible with the PGS, the collaborative configuration is confirmed.

If the PGT is insufficient, it is assumed that the object occupies a position corresponding to the location for which this PGT is the best possible (even if it is insufficient), and an additional object is sought that makes it possible to improve the PGT. Iteration is thus performed until reaching a threshold on the maximum number of objects.

If the PGT still remains worse than the PGS, an additional optronic system, if it exists, is taken into consideration, and the process is reiterated with this additional optronic system, with limitation to a maximum number of optronic systems (M=5 for example).

If the PGT still remains worse than the PGS, one of the optronic systems is moved, if possible, over the area, essentially seeking optimum performance according to the relative positioning parameter of the optronic systems; for example, a first collaborative object is fixed on the common visibility criterion and on a noteworthy character of the object able to facilitate acquisition thereof from another optronic system.

These objects may be selected on the basis of criteria of visibility between systems and/or of visibility of the objects of the scene for each system (unobstructed objects and/or objects situated at an altitude, for example). The choice of the object may comply with pre-established rules regarding criteria using:
  the height of the object, for example in order to facilitate common visibility thereof from the various positions of the optronic systems, and/or the elevation of the ground over the area (accessible via a digital terrain model DTM), specific features in the optronic image in terms of radiometric signature (gradient or contrast), so as to be extracted and characterized automatically by conventional image processing operations from the literature, such as, without limitation: SIFT pour Scale-invariant feature transform, SURF for Speeded-Up Robust Feature, HOG for Histogram of Oriented Gradients, GLOG for Gradient Location and Orientation Histogram.
  the spatial density or distribution of the previous detections projected into the scene, so as to choose a candidate object for the measurements that is far enough away from another neighboring object to avoid possible ambiguity in the association of the object between distributed systems.

They may also be selected in a predefined area, and the association of the objects intended for the measurements between systems is then guided so as to facilitate the orientation calculated by way of the positions of the systems.

Optionally, digital terrain model (DTM) data may be used in the process. When they are available, these data may be used in several ways:
- to predetermine candidate areas for entity sharing. It is possible to give preference to areas situated in the vicinity of ridge lines or else at the bottom of valleys (talweg), which may be determined directly from the DTM data,
- to determine whether a small area (or approximately prelocated object) is visible from the position of the optronic system,
- to evaluate, at the level of a particular optronic system having to take a plurality of measurements on a given object over the course of a pathway, an acquisition area to be given preference for the choice of the object (visibility from a plurality of viewpoints), as well as the candidate locations for taking measurements,
- to evaluate, on the basis of the known positions of a plurality of (at least 2) optronic systems, common areas or positions seen by these various optronic systems for the purpose of giving preference to the object areas of interest for sharing information.

Figure 2A:
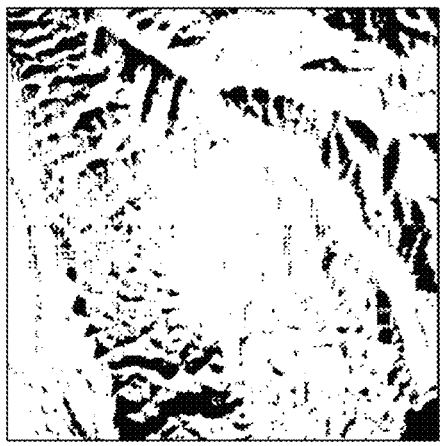
Figure 2B:
Figure 2C:

To illustrate this last point, reference is made to FIG. 2. FIGS. 2a and 2b show visibility maps $CV_1$ and $CV_2$ respectively obtained from two different positions (P1, P2) on the ground; they are obtained from a DTM established over a sampled geographical area in topographical coordinates over 5 km×5 km, centered on a geographical position. These visibility maps are binary maps having the value 0 (black) if the point is not seen and the value 1 (white) if the corresponding point of the scene is visible from the position of the optronic system. FIG. 2c shows the visibility map $CV_{12}$ common to positions P1 and P2. It is obtained simply as a product of the two visibility maps $CV_1$ at P1 and $CV_2$ at P2. An object situated on a white cell of the map $CV_{12}$ is seen both by the system S1 at P1 and by the system S2 at P2. Of course, the probability of finding an area containing an object visible from P1 and P2 is always lower (or equal in the extreme case of flat terrain) than the probability of finding it from P1 or from P2.

If N systems are all put into collaboration on an object from their "N" positions, the candidate area is a visibility map of the set "CVE", determined according to the individual visibility maps "$CV_n$" from each optronic system position, with:

$$CVE_{1...N} = \prod_{n=1}^{N} CV_n$$

In a less constrictive manner, if the visibility map "CVT" is sought for a set of collaborative systems corresponding to all of the geographical areas over which an object is seen by a minimum of η systems, the visibility map "CVT" is given according to:

$$CVT_{1...N} = \left(\sum_{n=1}^{N} CV_n\right) \geq \eta I_{WH}$$

in which the minimum number of systems for a possible collaboration corresponds in the least constrictive manner to η=2 (object visible to only 2 systems), W and H are the node numbers of the rasters of the DTM, and "$I_{WH}$" is the identity matrix of size W×H.

The DTM is run by the calculating unit. A suitable graphical interface is provided to the user for the purpose of facilitating the acquisition of the object, with:
- area designation,
- crossing point designation,
- presentation of specific areas as ridge lines,
- inter-visibility viewing of areas (point to area) from the current position of the optronic system or multipoint to area, by merging the visibilities of one and the same area seen by a plurality of optronic systems.

To achieve a predefined performance (or precision), the objects may also be selected depending on:
- the type of measurements on the objects and the type of associated errors, constraints imposed by the electromagnetic environment that may influence the available measurement devices, or more generally their effective use constraints.

Figure 10A:
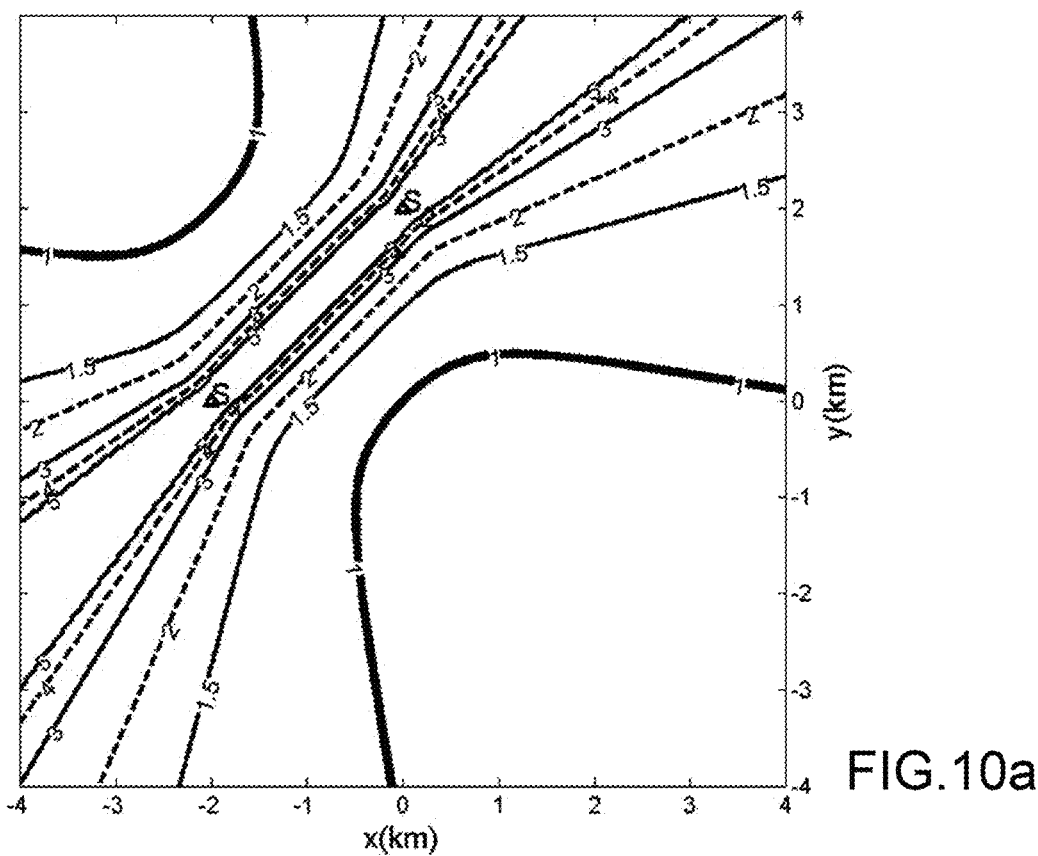
Figure 10B:
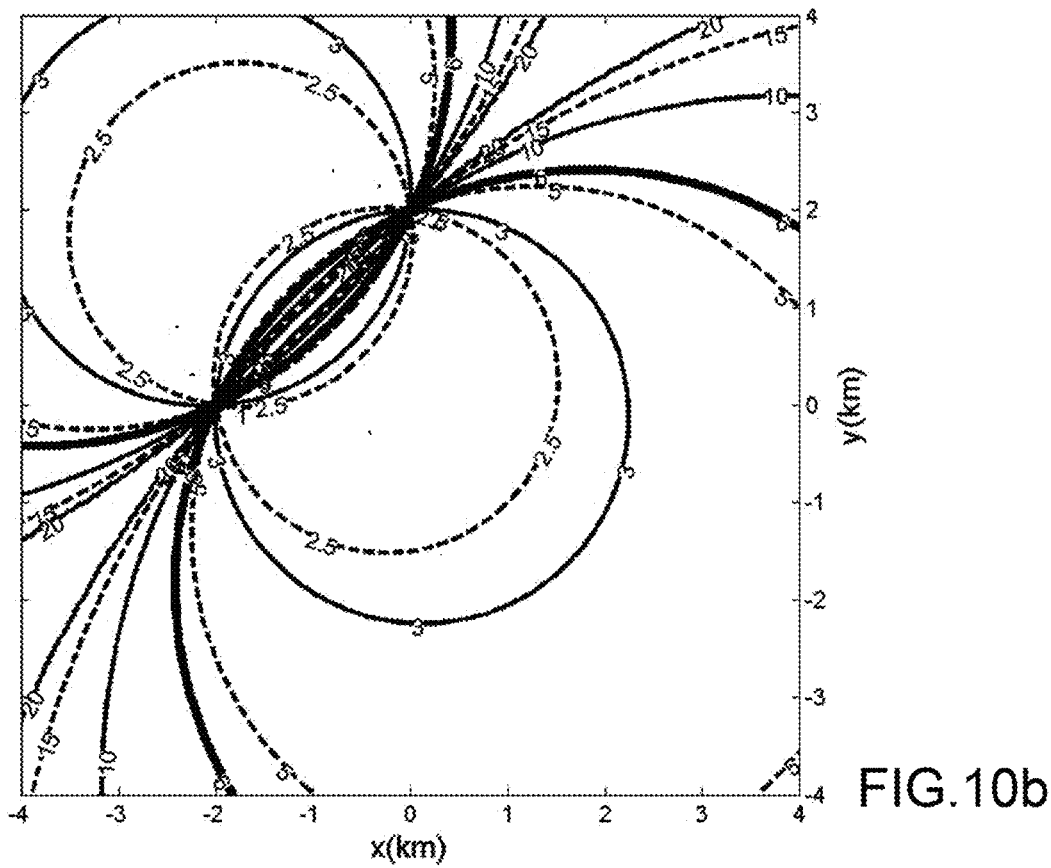

One example of a selection using a criterion for performing measurements on the objects is given further on, in the context of a collaboration of 2 optronic systems having to estimate their bearings on a single object (configuration 2.4). One depiction of the performance accessible for the bearing (PGT) according to the position of the object is illustrated in FIG. 10a, and one depiction of the performance accessible for the position of the object according to the area in which the object is situated is illustrated in FIG. 10b. This spatial variation in the performance illustrates notably that the performance of the bearing PGT depends on the area in which the object for collaboration is situated. To access a sub-mrd performance of the bearing, the single object has to be situated in an area corresponding to the lower right-hand quarter of the figure.

By fixing the position of the object O1 within an appropriate area, the bearing could be estimated with better performance using an object O2. This performance is optimized by moving the object O2 over the entire area; the performance would be, for most of the area, better in each position (except in the case where 2 objects were to be coincident or if O2 is aligned with S1 and S2).

In the case of an unfavorable area (desert, sea), the common objects may be mobile (land vehicle, watercraft, aircraft). Although, generally speaking, these objects have an unknown position, some of them may be terrestrial or celestial landmarks; this reduces the number of objects to be observed and/or improves the quality of the results of the calculations.

With common objects having been selected and shared between the optronic systems in question, the following steps (steps B1, B2, B3, B4, B5, C) are implemented. The North (=geographical North) will be taken as an example of a direction of orientation to be estimated, but any other direction may be chosen.

The method according to the invention is implemented by way of collaborating optronic systems, that is to say optronic systems communicating with one another in order to exchange information.

A configuration of collaborating systems is characterized by the following elements:
- the number of collaborating systems,
- the type of device available and implemented in order to collect measurements on objects of the scene from each system,
- the number of objects of the scene on which the measurements are performed,
- the estimated physical quantity or quantities (bearing, position, attitude, etc.).

The common feature of these configurations is:
that they implement at least 2 collaborating systems,
that they utilize observations including the positions of optronic systems stationed at at least 2 separate positions,
that they have an EMAR on at least one of the collaborating systems (S1),
that they perform measurements on at least one object "k" of the scene,
that they estimate at least the bearing of the EMAR of the collaborating system S1.

Figure 3:
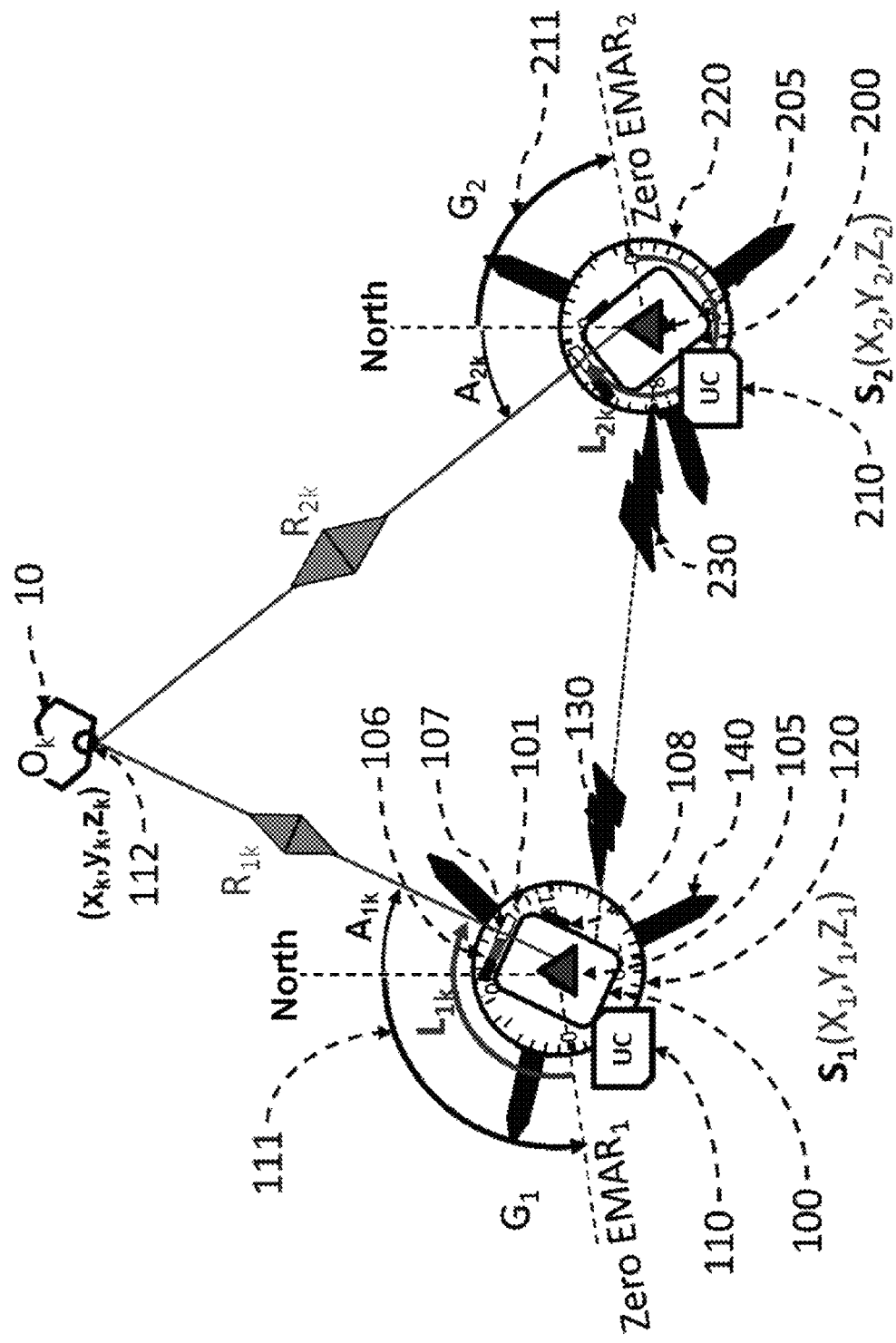

One example of a configuration having 2 collaborating optronic systems S1 and S2 and with 1 common object Ok is shown in FIG. 3.

Generally speaking, the method according to the invention makes it possible to precisely estimate, in a geographical reference frame, the North of an optronic system situated at a first position and denoted first optronic system S1. It is equipped:

with an acquisition device 101 able to produce images either with a visible or/and infrared (IR) detector or directly on the pupil of the user with a direct optical path or binoculars, producing images of at least one object k in a scene (k varies between 1 and K, where K is the number of objects of the scene, K≤1; in the example of the figure K=1), such as a camera (whose field of vision or FoV may vary by a few degrees in order to improve the range up to 360° for hemispherical vision based on a fisheye detector) or binoculars equipped with a pointer, the direction of orientation between S1 and each of these K objects is unknown, and with a device (EMAR or "relative horizontal angular measurement apparatus") for measuring the relative angle $L_{1k}$ between S1 and each object k, and mounted on a tripod so as to be as horizontal as possible or, more precisely, so that its inclination is of the order of the precision targeted for the calculation of the direction, i.e. of the order of the mrd, this alignment being able to be performed independently by way of a stationing procedure;

with a device for measuring elevation $E_{1k}$ between S1 and each object k (for example just a 2-axis EMAR that performs the dual function of measuring relative angle and elevation, or inclinometer), with a calculating unit 110 integrated into the optronic system or an external one, for example in the form of a tablet, PDA, etc., able to perform the calculations and, more generally, to implement the method for estimating the bearing of the EMAR of one or of a plurality of systems, with communication means 130 for communicating with one or more other optronic systems S2, S3, ... , Sm, ... SM, where M≥2. These communication means may be integrated into the optronic system Sm, or into the calculating unit 110, or take a common more standard form. A priori, the communication network is deployed outdoors on a terrestrial, airport-based, naval and/or satellite-based theater. Communications may be performed via a radio or phonic or telephone or optical link, etc. The communication network may be a GSM or UTMS network, via satellite or another telecommunications network. Information may be exchanged by conventional external means (radio or digital link, via antennae or satellites, the Internet if the optronic systems are connected to the network, walkie-talkies, Morse code, etc.). It is not excluded that the optronic systems may also dialog directly by connecting to a physical Ethernet/fiber-optic network, provided that the calculating unit of the optronic system Sm or the external calculating unit 110 are able to be connected thereto. It is also possible to contemplate optical communication between systems, possibly with a support 140, which may be a tripod, positioned on the ground or in a reference plane of a vehicle, possibly a pan & tilt or a motorized platform performing the role of an EMAR 130; supported by 140, it makes it possible to automatically orient the acquisition device in a control direction.

S1 is generally equipped with "EMPG" or "geographical position measurement apparatus" positioning means in the form for example of a GNSS receiver 105 (GPS, GLONAS, etc.). Unless indicated otherwise, it is considered that S1 is equipped with an EMPG.

S1 is generally equipped with an EMED aligned with the axis of the LoS of the system S1, such as a laser telemeter with an emission path 106 and a reception path 107.

According to the invention, S1 interacts with at least one other system S2, ... , Sm, ... SM, where M≥2, each other optronic system (Sm) being equipped:

with a (visible or IR) optronic acquisition device 201 able to form images of an object Ok seen both by S1 and by Sm and denoted object common to S1 and Sm; this is a camera or binoculars generally equipped with a laser telemeter EMED aligned with the LoS of the system Sm, with communication means 230 for communication with S1, compatible with those of S1 130 for exchanging observations, and preferably with an internal calculating unit 210 used notably when Sm also calculates its bearing.

Sm is generally equipped with an EMPG in the form for example of a GNSS receiver 205. Unless indicated otherwise, it is considered that Sm is equipped with an EMPG.

The acquisition devices of the optronic systems may also be omnidirectional optronic sensors that natively incorporate an EMAR in the form of their imaging detector. The latter may indiscriminately be dioptric or catadioptric. In this type of observation device, the axis of the LoS is oriented close to the vertical, and the omnidirectional sensor is mounted on an (aerial) platform or a (terrestrial) tripod. The essential difference with optronic sensors having a smaller field is that the optronic detector here directly performs the role of an EMAR on the overview. The internal parameters of the omnidirectional sensor, which make it possible to describe the internal photon paths using parametric laws, are assumed to have been estimated beforehand by a calibration process. By default, the common observation of a sufficient number of a number of objects may make it possible to better estimate or refine these geometric laws, which depend on the architecture of the optronic system and determine the formation of the images.

These omnidirectional sensors are particularly beneficial for performing panoramic monitoring in order to track objects or reconstruct 3D scenes in the common areas of visibility of the optronic systems. The quality of absolute orientation of the omnidirectional sensor improves spatial referencing of the tracked objects and makes it possible to superimpose them on other geographical information. This is detailed at the end of the description.

For configurations using EMEDs, it is possible to use, as acquisition device, the one fitted to latest-generation mobile telephones, which are furthermore equipped with a telemetry function.

The positions of the objects on which the measurements are performed are unknown. The directions of orientation between each optronic system and the objects are unknown. Therefore, there are no geographical coordinates or geographical directions (azimuth, elevation) for the objects on which the measurements are performed.

A first optronic system S1 means an optronic system situated at a first position; . . . ; an $m^{th}$ optronic system Sm means an optronic system situated at an $m^{th}$ position. These may be separate optronic systems or one and the same optronic system that is transportable or portable and has been moved from one position to the other.

It is even possible to consider a single optronic system that uses its movement over the terrain to accrue observations on objects of its choice. This is in some ways a self-collaborative system. It is noted that, over the course of the movement, the measurements performed on a particular object are not necessarily all of the same nature. It is possible for example to illustrate this aspect with consideration to an optronic system equipped with a portable camera with a GNSS receiver, a telemeter and an inclinometer, which will make it possible to perform measurements over the course of the movement. Once the travel has finished, the user is able for example to mount his camera on an EMAR of goniometer type and estimate the bearing thereof (its North or geographic azimuth corresponding to the zero value of the horizontal reading of the goniometer). For at least one of these positions (for example the last one), the lightweight part of the device (camera or binoculars) is mounted on the EMAR, which is itself carried on a tripod. This implementation has the main advantage of reducing the measurement collection time and the required apparatus volume and also makes it possible to dispense with the requirements in terms of communicating the observations, which are able to be managed inside the system.

The method according to the invention consists in estimating the bearing of at least one system, i.e. $\overline{G_1}$ for the system S1; this bearing represents the geographic azimuth corresponding to the zero reading of its EMAR. In other words, it involves finding the direction of the geographical North from the position of S1 or else calibrating the EMAR of S1 by estimating its bearing.

The method according to the invention comprises the following steps:
  determining two geodetic positions from among those of the optronic systems (S1, S2, . . . , Sm, . . . SM), these positions are determined by their EPMGs or, in the absence of 2 known positions Sm, these may secondarily:
    either be determined by triangulation, using landmarks, or by other methods known to those skilled in the art,
    or be deduced by the process by performing measurements on other objects having a known position; in this case, the total number of positions known between the optronic system and the object must be ≥2.
  acquiring at least one common object k by way of the acquisition device of S1, measuring the relative angle $L_{1k}$ by way of the relative angle measurement device (EMAR) of S1, and also $E_{1k}$,
  acquiring the object k by way of the other optronic systems collaborating with S1,
  performing additional measurements (of distance $R_{mk}$ and/or of elevation $E_{mk}$ and/or of relative angle $L_{mk}$ and/or of approximate azimuth $A_{0mk}$) by way of the collaborating optronic systems S1, S2, . . . , Sm, . . . , SM,
  the positions of the other systems and said measurements ($=L_{1k}+E_{1k}$+additional measurements) constituting observations, communicating, to S1, the observations or, more precisely, the observations that S1 does not have itself (S1 knows for example its position and also $L_{1k}$ and $E_{1k}$),
  calculating the bearing of S1 (the North) from just these observations, this being performed by S1.

Note: the order of the majority of these operations may be changed, and only the bearing calculation is performed after all of the observations have been collected.

It has been indicated that the system S1 begins to observe before the other systems Sm (m=2 . . . M), but it is readily understood that the order of observation by the various systems is not enforced.

S1 may also calculate the bearings of the other optronic systems ($G_2$, . . . , $G_m$, . . . , $G_M$) and also communicate to them the result, if it exists, from the communication means of S1 to these other optronic systems. According to one alternative, some of these other systems that are equipped with calculating means and that have received the necessary observations calculate their bearings themselves.

S1 calculates the bearing $\overline{G_1}$ (or the azimuth corresponding to the zero value) of its EMAR 120 on the basis of the observations and using the following notations:
  the Cartesian coordinates of the positions of the interacting optronic systems are denoted ($X_m$, $Y_m$, $Z_m$); they are local Cartesian coordinates that are generally known and obtained after transformations of the geodetic coordinates (longitude, latitude, altitude or height over the Earth's ellipsoid) resulting from the measurement by the EMPG, or may be predetermined via another means;
  the elevation of the line of sight from the optronic system m on the object k is $E_{mk}$, which is generally known;
  the angular reading of the EMAR on the optronic system m to the entity k is denoted $L_{mk}$, which is generally known;
  the distance between the optronic system m and the entity k is $R_{mk}$, which is generally known according to the EMED;
  the bearing $\overline{G_m}$ of the optronic system m is unknown and constitutes the solution to the North finding;
  the Cartesian coordinates of the objects to which the measurements pertain are ($\overline{x_k}$, $\overline{y_k}$, $\overline{z_k}$), they are generally unknown.

Note regarding the alignments of apparatuses: the EPMG is preferably situated close to the phase center of the EMED, which is itself aligned with the LoS of the optronic system, which is itself orthogonal to the axis of elevation of the EMAR. These alignment estimation operations may be performed via factory calibration procedures or during specific acquisition procedures or steps on the ground by each system before collaboration. The residual errors have to be limited so as not to worsen the results with regard to the allocated performance objective PGS (and typically lower, for each allocation, than half the measurement performance).

Strictly speaking, a direction obtained from a system S2 transforms into a very slightly different direction, all the more so when the 2 systems are close, in the local reference frame of the system S1. The transformation is a rotation whose elements are simply fixed according to the longitudes and latitudes of the 2 systems. More precisely, utilizing the direction measurements requires a rectification that is performed as follows. A direction $u_{2k}$ measured on the object "k" from the origin of the local geographical reference frame of the system S2 will correspond to a rectified direction $u'_{2k}$ having an azimuth and elevation that are slightly different when they are considered in the Cartesian reference frame whose axes correspond to the local geographical reference frame of the system S1. In practice, if $(\lambda_m, \varphi_m)$ are used to denote the longitude and latitude of the sensor "$S_m$" for $m \in \{1,2\}$, we have:

$$u'_{2k} = \begin{pmatrix} \sin\varphi_2 \sin\varphi_1 \cos\Delta\lambda + \cos\varphi_2 \cos\varphi_1 & \sin\varphi_2 \sin\Delta\lambda & \sin\varphi_2 \cos\varphi_1 \cos\Delta\lambda - \cos\varphi_2 \sin\varphi_1 \\ \sin\varphi_1 \sin\Delta\lambda & \cos\Delta\lambda & \cos\varphi_1 \sin\Delta\lambda \\ \cos\varphi_2 \sin\varphi_1 \cos\Delta\lambda - \sin\varphi_2 \cos\varphi_1 & -\cos\varphi_2 \sin\Delta\lambda & \cos\varphi_2 \cos\varphi_1 \cos\Delta\pi + \sin\varphi_2 \sin\varphi_1 \end{pmatrix} u_{2k}$$

where $\Delta\lambda = \lambda_2 - \lambda_1$. This makes it possible thus to obtain the rectified azimuth and elevation angles, which characterize a direction expressed in the local reference frame of S2, in the local reference frame of S1.

For 2 close systems, the transformation matrix is close to the identity, but the first-order terms are enough to produce a deviation of the order of the mrd in azimuth with regard to the rectified direction for systems less than 10 km apart. Besides the separations in terms of longitude and latitude of the two systems, the latitude also influences the deviation between the origin and rectified angles, with increasing values as the equator is moved away from.

The rectification of the site measurements may furthermore be subject to atmospheric refraction correction. This correction is all the more important when the lines of sight of the sensors on the objects are highly oblique. It may be performed without additional information, using a standard atmosphere, but it will be more precise to use local meteorological parameters such as temperature, pressure and water vapor partial pressure.

Hereinafter, the notations are simplified by neglecting the "prime" index regarding the azimuth and elevation measurements, this assuming that the angles indicated correspond to pre-rectified directions.

In the calculations, the unknowns are topped with a straight line as: $\overline{G}$. The values describing the objects are assigned a lower-case symbol. The values determined by the optronic system have an upper-case symbol.

With apparatuses having standard performances (EMPG giving a difference in position precision of the class of a meter, EMAR a precision of 0.5 mrad, EMED of S1 of the class of 2 m to 1 σ), the method according to the invention allows S1 (and possibly other optronic systems S2, . . . , Sm, . . . ) to determine its bearing with a precision of the class of the milliradian.

One advantage of this collaborative system is that of not enforcing visibility between all or some of the systems. This facilitates installation and extends the conditions of use over an area with masking (elevation, forest, conurbation, etc.). Although they are not visible to one another, two systems of course have any latitude and a high probability of being able to observe at least one common object in the scene.

Distinguishing a configuration of the network according to the number of interacting systems, the hardware configuration on each system, the number of objects on which the measurements are performed and the estimated physical values (such as bearing, attitude or object position/speed characteristic), it is readily understood that there are infinite possible combinations and therefore configurations. The following text describes one representative sample thereof without limitation. It is considered that the complexity of a configuration decreases with:

the number of interacting systems,
  the number and the precision of the apparatuses implemented,
  the number of objects on which the measurements are shared,
  the number of values (bearing, attitude, coordinates of the objects and/or of the systems) estimated by the process.

Figure 5:
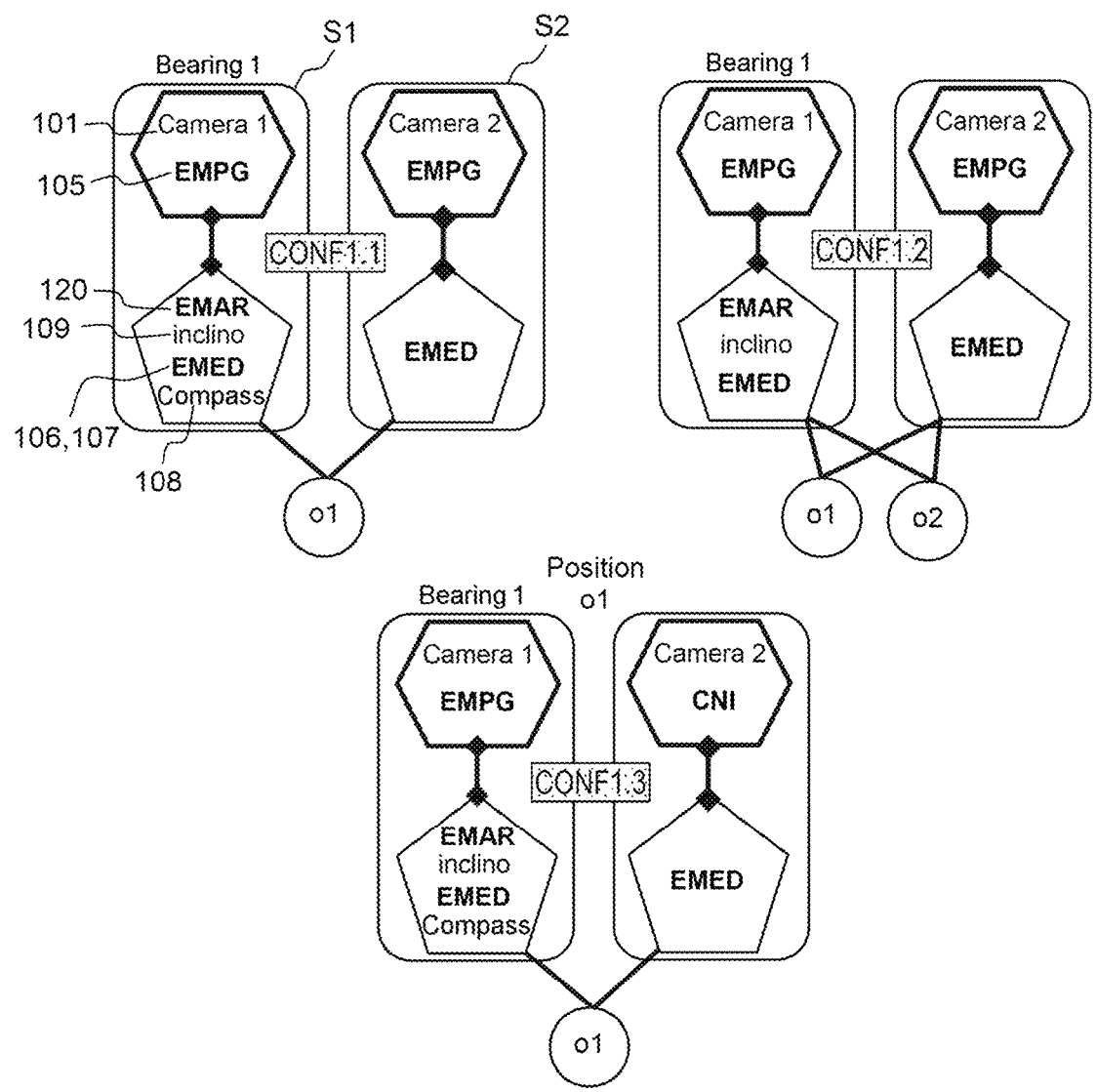

Hereinafter, configurations 1.1, 1.2 and 1.3, described with reference to FIG. 5, are configurations with a specific feature of collaboration limited to 2 collaborating systems, only system S1 having to estimate its bearing.

Figure 6:
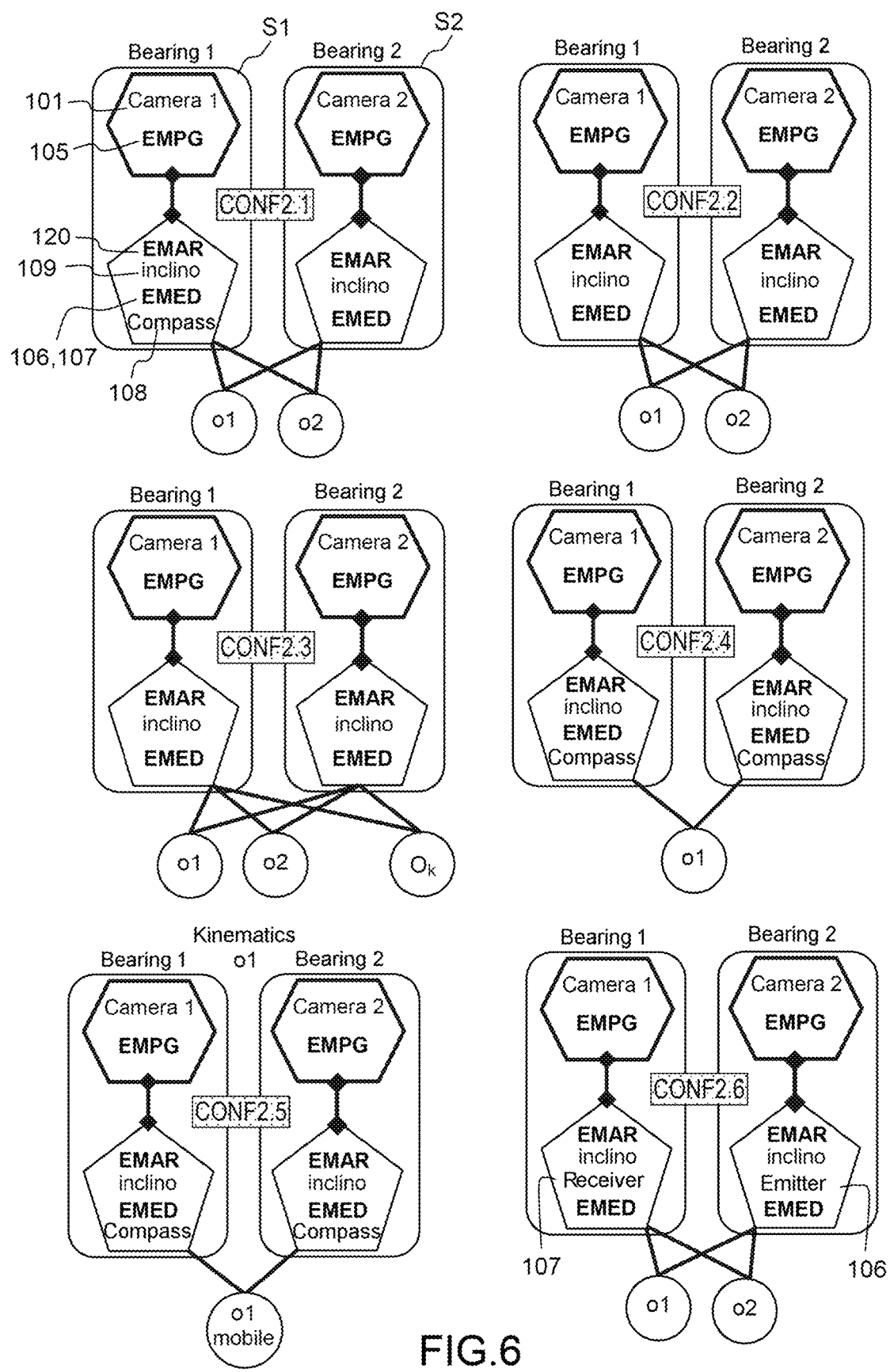

Configurations 2.1 to 2.6, described with reference to FIG. 6, are also configurations limited to 2 collaborating systems but that this time each have to estimate at least their bearing (and also other features depending on the configuration under consideration).

Figure 7:
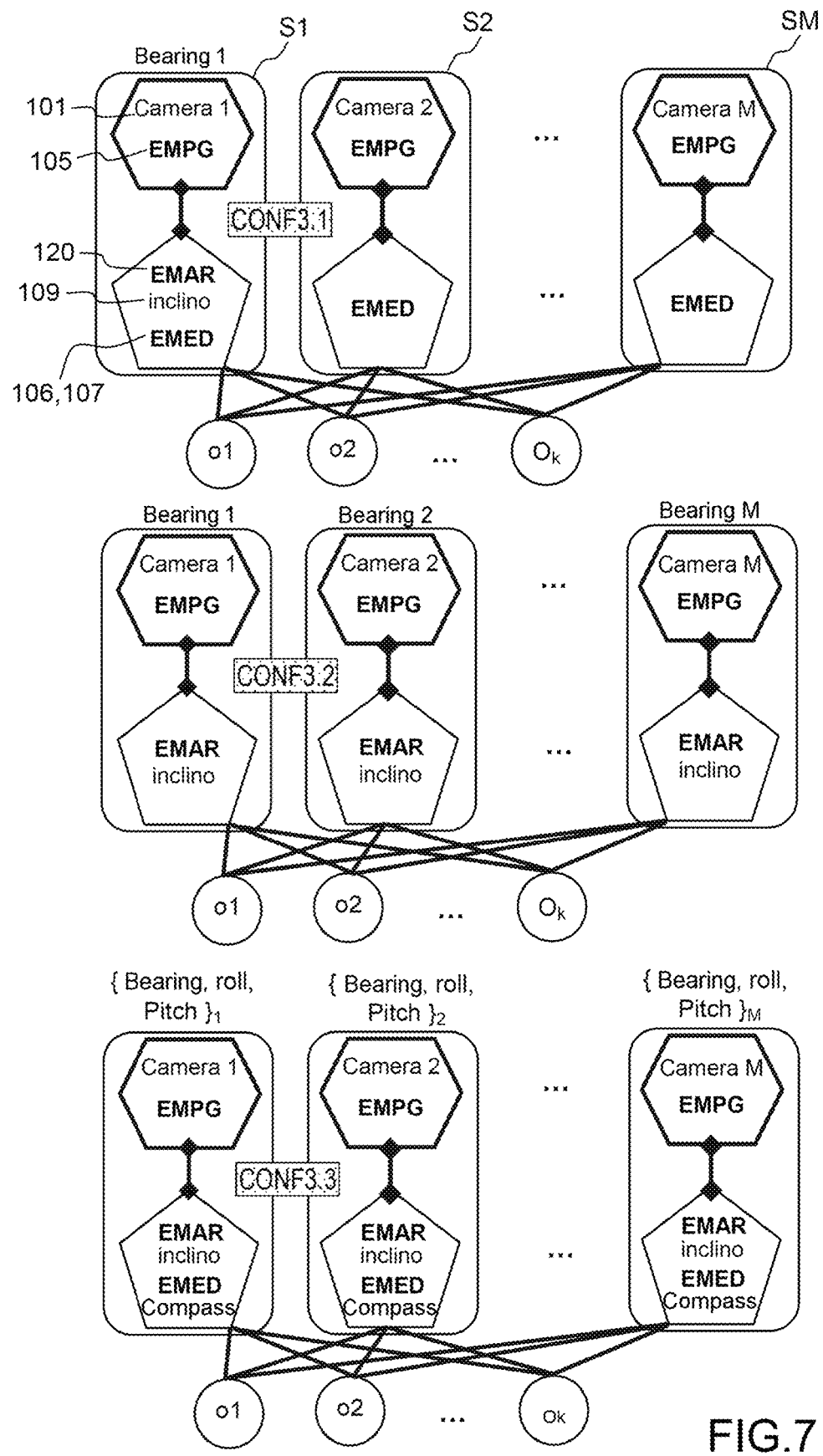

Configurations 3.1, 3.2, 3.3 described with reference to FIG. 7 relate to more collaborating systems (M>2).

Configurations 4 have a specific feature of collaborating with a plurality of systems partly having EPMGs (4.1), and with landmark utilization (4.2).

Configurations 5.1 and 5.2, described with reference to FIG. 9, correspond to collaborations with portable systems having more lightweight and less efficient EMARs of magnetic compass or MEMS type.

Configuration 1.1

A description will first of all be given of a first mode of calculating the North with a configuration having two collaborating optronic systems S1 and S2 (or tandem) on a single object Ok (k=K=1) for the purpose of determining the bearing of the EMAR of S1. The additional measurements are measurements:

of distance $R_{1k}$ between S1 and the object Ok and $R_{2k}$ between S2 and the object Ok,
  of approximate azimuth $A_{01k}$ provided by S1 and making it possible to determine an approximate bearing $G_{01}$ (by way of $G_{01} = A_{01k} - L_{1k}$) to within a precision of a few degrees (better than 5°); approximate azimuth is understood to mean a precision 10 times worse than the precision targeted for the estimation of the bearing $\overline{G_1}$, or of the other bearings or attitudes, as will be seen hereinafter.

To perform these additional measurements, the two determined positions being those of S1 and S2:

The first optronic system S1 furthermore comprises:
  an EMED or "electronic distance measurement apparatus" of telemeter type with an emitter 106 and a receiver 107, whose direction is aligned with the axis of the acquisition device 101, able to provide the distance $R_{1k}$ between S1 and the object Ok,
  a magnetic compass 108 or any other means able to provide an approximate azimuth $A_{01k}$ of the object Ok; another way of obtaining this is indicated further below.

And the second optronic system S2 furthermore comprises an EMED of telemeter type with an emitter 206 and a receiver 207, whose direction is aligned with the axis of the acquisition device 201 of S2, and that is able to provide the distance $R_{2k}$ between S2 and the object Ok. It is noted that, without a precise EMAR (a goniometer for example), S2 may in this case be a lightweight system of camera or portable binoculars type.

The acquisitions of the two systems are performed on a single object Ok,

The information calculated by the process relates to:
the estimated bearing $\overline{G_1}$ of the EMAR of S1,
the estimated coordinates of the object $(\overline{x}_k, \overline{y}_k, \overline{z}_k)$, which are easily obtained once the bearing has been estimated,
the theoretical precisions with regard to these values.

The magnetic compass of S1 has for example a magnetic azimuth measurement quality of the class of 10 mrad; on the other hand, the quality of ascertainment of the local magnetic declination afforded by the global WMM/IGRF models is 8.5 mrad at low latitudes. The geographical azimuth $A_{o1k}$ is deduced from the magnetic azimuth $M_{1k}$ reading and from the local magnetic declination $D_{M1}$ by $A_{o1k}=M_{1k}+DM_1$. On balance, the measurement error on average exceeds 13 mrad and worsens when the optronic system moves toward the magnetic poles. Thus, taken alone, the two systems S1 and S2 are incapable of achieving the objective of locating on average an object situated 10 km away to within 10 m. Specifically, on the one hand, S2 is not able to locate the object. On the other hand, S1 is able to locate the object with an error of the order of 130 m on account of its angular error of 13 mrad in terms of azimuth on account of the fact that it is limited to estimating the North with an absolute quality corresponding to that of its compass. The aim of the invention consists in S1 estimating the North with a quality compliant with the objective PGS, that is to say in the category of the milliradian.

With landmarks, S1 is able to find a North of the class of the mrad, but this approach becomes ineffective as soon as the system is situated in an environment unfavorable to the acquisition of landmarks (the case for a desert or forest scene) and/or when it has to work opportunistically.

Although it does not access objects having known geographical coordinates, the configuration with two systems S1 and S2 makes it possible, according to the invention, to estimate the bearing of the optronic system S1 and therefore to construct its North. To this end, the 2 optronic systems S1 and S2 of the tandem will perform their respective measurements on one or more $(k=\{1, \ldots, K\})$ common objects Ok.

A collaborative measurement is performed on a first object OK $(k=1)$ visible to S1 and to S2:

By way of its compass 108, S1 performs an approximate location of the object, such as a topographical detail deemed to be relevant. The relevance of a point is defined in terms of visibility for S2, and/or of lack of ambiguity on the common sight point, and/or of laser equivalent surface (or "LES").

S1 sends to S2 the approximate location and optionally, provided that the communication means 130 allow it to, an image of the object to be measured. As communication means S1 and S2 use for example a mobile telephone. S2 receives the approximate location of the object Ok to be measured.

S2 seeks the object using the approximate location and its own position (via its EMPG) in order to determine an approximate line of sight direction (azimuth, elevation) and distance, at which it is able to point on the basis of the "approximate" measurement of its compass 208. This pointing may be manual, with a sensor having a small acquisition field, automatic, with a pan & tilt, needless with an OMNI sensor. It will be noted that the presence of a compass on S2 is not necessary for calculating the bearing on S1, but that it is able to guide and shorten the time to acquire objects common between the two optronic systems. Given the orientation error of the class of the degree, the acquisition is facilitated provided that the field of the system S2 is greater than the pointing error. This then allows visual or automatic seeking of the object in a single image.

S2 performs its measurements on the object centered on the image: measurement of distance $R_{2k}$ between S2 and the object, measurement of the elevation $E_{2k}$ of the object Ok with the inclinometer of S2. S2 verifies that its distance measurement is compatible (to within measurement errors) with the approximately calculated theoretical distance, S2 sends to S1 these measurements along with the geodetic position (longitude, latitude, altitude) of S2.

S1 calculates the direction of the North (the azimuth or the bearing $\overline{G_1}$ corresponding to the zero value of its goniometer) on the basis of these observations.

The calculations by S1 for determining the bearing $\overline{G_1}$ of S1 may be described in 2 or 3 dimensions. In the case of a planar 2D description, the measurements performed in 3D are rectified by deducing the distances in the plane on the basis of the elevation measurements performed on the objects. The bearing (or North) $\overline{G_1}$ is calculated:

by linearizing the observation equations using the approximated expression:

$$G_{01}=M_{1k}+DM_1-L_{1k}$$

where $M_{1k}$ is the measurement of magnetic azimuth of the system S1 on the object k, $DM_1$ is the local magnetic declination, by writing the bearing $\overline{G_1}$ by way of this approximation and of the increment $\overline{\Delta G_1}$ with:

$$\overline{G_1}=G_{01}+\overline{\Delta G_1}$$

by calculating the increment $\overline{\Delta G_1}$ with:

$$[(X_2 - X_1)\cos(L_{1k} + G_{01}) - (Y_2 - Y_1)\sin(L_{1k} + G_{01})]\overline{\Delta G_1} = \frac{B_{21}^2 - R_{2k}^2 + R_{1k}^2}{2R_{1k} \cos E_{1k}} - (X_2 - X_1)\sin(L_{1k} + G_{01}) - (Y_2 - Y_1)\cos(L_{1k} + G_{01}) - (Z_2 - Z_1)\tan E_{1k}$$

$$\overline{G_1} = M_{1k} + DM_1 - L_{1k} + \overline{\Delta G_1}$$

In this expression, $k=1$ (the measurements pertain to the single object subject to the measurements of S1 and S2), the approximate value of the approximate bearing $G_{01}$ of S1 is obtained from the measurements provided by the magnetic compass of S1; the base "$B_{21}$", which is the Euclidean distance between the 2 optronic systems S1 and S2, is obtained from the coordinates of S1 and S2.

$$B_{nm}^2 = \sqrt{(X_m-X_n)^2(Y_m-Y_n)^2+(Z_m-Z_n)^2}$$

$$\Delta X_{nm}=X_n-X_m; \Delta Y_{nm}=Y_n-Y_m; \Delta Z_{nm}=Z_n-Z_m$$

It is also possible to obtain $G_{01}$ as follows in the absence of a magnetic compass on S1, but with a magnetic compass on S2 that will give an approximate location (longitude, latitude, altitude or height over the ellipsoid depending on the type of vertical reference selected) of the object with a measurement $E_{2k}$ that, transmitted to S1, will make it possible to determine an approximate azimuth $A_{01k}$ (in the sense of low accuracy) on the object, and therefore an approximate bearing $G_{01}$, by way of the reading $L_{1k}$, where $G_{01}=A_{01k}-L_{1k}$.

As will be seen in the other configuration examples, the estimation of the approximate bearing or azimuth is not essential, but the ability to perform this type of measurement is often such that it facilitates the reacquisition of an object from another delocalized optronic system. Specifically,
a compass available on an optronic system Sm makes it possible to approximately position an object, provided that Sm has an elevation measurement apparatus (for example an inclinometer) and an EMED (for example a telemeter).
An optronic system S1 receiving the approximate position of an object is able to identify it more easily since, as it has its position S1 and the approximate position of the object, S1 is able to determine:
the approximate azimuth of the object at which it is able to point itself within a field of the order of the degree if it has a magnetic compass,
the approximate elevation of the object that it is observing in order to bring the object close to the center of its imager by inclining its LoS,
the approximate distance of the object that it is able to measure on the object to be shared by way of the EMED.

The Cartesian coordinates of S1 and S2 are obtained starting from their geodetic coordinates (generally in WGS84) as follows:
converting the geodetic coordinates into geocentric coordinates (origin center of the Earth, X and Y axis in the equatorial plane, X passing through the Greenwich meridian line, z through the axis of the poles),
converting the geocentric coordinates into a local topocentric reference frame (origin on the position of the optronic system S1 for example, X in the local parallel, Y along the local meridian and z vertical ascending perpendicular to the Earth's ellipsoid).

The system S1 may also characterize the error in its bearing $G_1$ provided that it has knowledge of the errors in the measurements by way of the expressions, and construct a theoretical evaluation of the root mean square error (or RMSE). This is done by separating out the bias and noise contributions to the measurements, which respectively lead to a bias or systematic error and a noise or random error in the bearing $G_1$.

On the basis of this information (bias+noise), when the allocated performance objective PGS is more ambitious than the error obtained, the system S1 may determine the area of possible operation of the system S2 in which common objects would make it possible, if they exist, to get close to the performance objective PGS.

To this end and generally speaking, it is possible to amend the relative position of the 2 systems S1 and S2 (or of 2 optronic systems chosen from among N), and/or the choice of an object situated in a spatial region in which the overall configuration (object and optronic system) makes it possible to achieve the allocated performance.

With regard to the performance of the North thus obtained, it is noted that the expression indicated gives rise only to terms in differences of the 2 positions. At the level of the distances of the device, this aspect is beneficial to the performance with regard to the positioning of the optronic systems. With an EMPG of GNSS type, a significant portion of the contributions to the overall positioning error are caused by propagation times in the ionosphere and the troposphere, and are subtracted for quasi-simultaneous measurements on close positions (a few 10 km).

According to the process that is proposed, a performance deemed to be insufficient may lead to the use of a second object (→K=2, k={1,2}, see configuration 1.2).

Before launching into the acquisition of measurements on a second object, the system S1 will evaluate the theoretical performance PGT that a second object is able to add to the improvement of its North, for the purpose of achieving the allocated objective PGS. The candidate areas for the acquisition (=areas in which objects able to be selected are located) are those that both make it possible to achieve this performance and correspond to a common visibility over the area, for the two systems, of one and the same object.

Once the measurements have been performed, the estimated bearing $\overline{G1}$ on S1 will facilitate acquisition and sharing between the 2 optronic systems. Specifically, this information makes it possible to precisely locate the first object and then to utilize this better position by transmitting it to S2. S2 is then able to use the object as a landmark so as to reduce both the bias in its knowledge of the local magnetic declination and its installation bias residual.

The calculation of the bearing with a second object is described further on (in a configuration 1.2). It will then be seen that a second object dispenses with the use of a magnetic compass on S1.

If the use of a second object gets close to the objective PGS performance while at the same time still remaining below this, other objects may be used to perform common measurements (cf. configuration 1.3).

Configuration 1.2 (without a compass)

This configuration is distinguished from the previous one in that the optronic system S1 (of configuration 1.1) does not have a magnetic compass 108, and the same applies for S2 without a magnetic compass 208: there is no longer access to an approximate line of sight azimuth on an object. The system S1 is still able to determine its bearing unambiguously (that is to say on $[-\pi,\pi]$), using at least two objects (K≥2).

This configuration will be described with two optronic systems S1 and S2 and K=2 objects, but the calculation applies more generally to M optronic systems and K≥2 objects (see configuration 3.1).

The additional measurements are measurements:
of distance $R_{1k}$ between S1 and the object k and $R_{2k}$ between S2 and the object k,
of elevation $E_{12}$ between S1 and the object 2 and $E_{2k}$ between S2 and the object k.

S2 sends to S1 these measurements $R_{2k}$ and $E_{2k}$ along with its geodetic position (longitude, latitude, altitude).

To perform the additional measurements, the two determined positions being those of S1 and S2, and with K=2:
The first optronic system S1 furthermore comprises an EMED 106, 107 able to provide the distance $R_{1k}$ between S1 and the object k, an inclinometer for measuring the elevation $E_{12}$ over the object 2,
and the second optronic system S2 furthermore comprises:
an EMED of telemeter type 206 and 207 whose direction is aligned with the axis of the acquisition device of S2 201, able to provide the distance $R_{2k}$ between S2 and the object k,
an inclinometer 209 able to provide the elevation $E_{2k}$ of the object k with respect to S2.

The quantity calculated is the bearing $\overline{G_1}$ of the EMAR of S1.

For this configuration, a description is given of an approach for obtaining the bearing G1 after rectification of the distance measurements in the horizontal 2D plane (by projecting the base B between the systems, which becomes "b", and the measured 3D distances $R_{1k}$ and $R_{2k}$ into the horizontal plane by way of the elevations $E_{1k}$ and $E_{2k}$, where $r_{1k}=R_{1k} \sin E_{1k}$) as:

$$\overline{G_1}=a \tan 2(\overline{\sin G_1};\overline{\cos G_1})$$

a tan(a;b) corresponding to the bijective function a tan(b/a) onto $[-\pi,\pi]$, also often denoted a tan 2, $\overline{\sin G1}$ and $\overline{\cos G1}$ being obtained as a solution of the linear system:

$$\begin{pmatrix} \alpha_{11} & \alpha_{12} \\ \alpha_{21} & \alpha_{22} \end{pmatrix} \begin{pmatrix} \overline{\sin G_1} \\ \overline{\cos G_1} \end{pmatrix} = \begin{pmatrix} \beta_{11} \\ \beta_{21} \end{pmatrix}$$

where:

$$\begin{pmatrix} \alpha_{11} & \alpha_{12} \\ \alpha_{21} & \alpha_{22} \end{pmatrix} =$$
$$\begin{pmatrix} r_{11}(\Delta X_{21} \cos L_{11} - \Delta Y_{21} \sin L_{11}) & r_{11}(\Delta X_{21} \sin L_{11} + \Delta Y_{21} \cos L_{11}) \\ r_{12}(\Delta X_{21} \cos L_{12} - \Delta Y_{21} \sin L_{12}) & r_{12}(\Delta X_{21} \sin L_{12} + \Delta Y_{21} \cos L_{12}) \end{pmatrix}$$

$$\begin{pmatrix} \beta_{11} \\ \beta_{21} \end{pmatrix} = \frac{1}{2} \begin{pmatrix} b_{21}^2 - r_{21}^2 + r_{11}^2 \\ b_{21}^2 - r_{22}^2 + r_{12}^2 \end{pmatrix}$$

with a single solution for non-aligned lines of sight:

$$\det = b_{21}^2 r_{11} r_{12} \sin(L_{12}-L_{11}) \neq 0 \Leftrightarrow L_{12} \neq L_{11}+n\pi$$

In this 2D description, the measurements are transposed beforehand into a local topographical reference frame whose origin may be taken for example at the barycenter of the 2 positions of the optronic systems.

The rectification/transposition operation consists simply in substituting the distances R of the measurements resulting from the EMEDs with their projection r onto the horizontal plane, and in substituting the base between the 2 systems by way of the measurements $E_{mk}$ of the inclinometers.

S1 may evaluate the bias in the bearing $\overline{G_1}$ according to the 2D measurement bias:

$$\delta\overline{G_1} = \frac{\delta\beta_{k1} - \delta\alpha_{k1}\overline{\sin G_1} - \delta\alpha_{k2}\overline{\cos G_1}}{\alpha_{k1}\overline{\cos G_1} - \alpha_{k2}\overline{\sin G_1}}; k \in \{1,2\}$$

$$\delta\alpha_{11} = \frac{\alpha_{11}}{r_{11}}\delta r_1 + r_{11}(\delta\Delta X_{21} \cos L_{11} - \delta\Delta Y_{21} \sin L_{11}) - \alpha_{12}\delta L_1$$

$$\delta\alpha_{12} = \frac{\alpha_{12}}{r_{11}}\delta r_1 + r_{11}(\delta\Delta X_{21} \sin L_{11} + \delta\Delta Y_{21} \cos L_{11}) + \alpha_{11}\delta L_1$$

$$\delta\alpha_{21} = \frac{\alpha_{21}}{R_{12}}\delta r_1 + r_{12}(\delta\Delta X_{21} \cos L_{12} - \delta\Delta Y_{21} \sin L_{12}) - \alpha_{22}\delta L_1$$

$$\delta\alpha_{22} = \frac{\alpha_{22}}{r_{12}}\delta r_1 + r_{12}(\delta\Delta X_{21} \sin L_{12} + \delta\Delta Y_{21} \cos L_{12}) + \alpha_{21}\delta L_1$$

$$\delta\beta_{k1} = b_{21}\delta b_{21} - r_{2k}\delta r_2 + r_{1k}\delta r_1$$

and the noise according to:

$$\sigma_{\overline{G_1}}^2 = \frac{\sigma_{\beta_{11}}^2 + \overline{\sin G_1}^2 \sigma_{\alpha_{11}}^2 + \overline{\cos G_1}^2 \sigma_{\alpha_{12}}^2}{(\alpha_{11}\overline{\cos G_1} - \alpha_{12}\overline{\sin G_1})^2} \text{ or } \sigma_{\overline{G_1}}^2 =$$

$$\frac{\sigma_{\beta_{21}}^2 + \overline{\sin G_1}^2 \sigma_{\alpha_{21}}^2 + \overline{\cos G_1}^2 \sigma_{\alpha_{22}}^2}{(\alpha_{21}\overline{\cos G_1} - \alpha_{22}\overline{\sin G_1})^2}$$

$$\sigma_{\alpha_{11}}^2 = \frac{\alpha_{11}^2}{r_{11}^2}\sigma_{r_1}^2 + r_{11}^2(\cos^2 L_{11}\sigma_{\Delta X_{21}}^2 + \sin^2 L_{11}\sigma_{\Delta Y_{21}}^2) + \alpha_{12}^2\sigma_{L_1}^2$$

$$\sigma_{\alpha_{12}}^2 = \frac{\alpha_{12}^2}{r_{11}^2}\sigma_{r_1}^2 + r_{11}^2(\sin^2 L_{11}\sigma_{\Delta X_{21}}^2 + \cos^2 L_{11}\sigma_{\Delta Y_{21}}^2) + \alpha_{11}^2\sigma_{L_1}^2$$

$$\sigma_{\alpha_{21}}^2 = \frac{\alpha_{21}^2}{r_{12}^2}\sigma_{r_1}^2 + r_{12}^2(\cos^2 L_{12}\sigma_{\Delta X_{21}}^2 + \sin^2 L_{12}\sigma_{\Delta Y_{21}}^2) + \alpha_{22}^2\sigma_{L_1}^2$$

$$\sigma_{\alpha_{22}}^2 = \frac{\alpha_{22}^2}{r_{12}^2}\sigma_{r_1}^2 + r_{12}^2(\sin^2 L_{12}\sigma_{\Delta X_{21}}^2 + \cos^2 L_{12}\sigma_{\Delta Y_{21}}^2) + \alpha_{21}^2\sigma_{L_1}^2$$

$$\sigma_{\beta_{11}}^2 = b_{21}^2\sigma_{b_{21}}^2 + r_{21}^2\sigma_{r_2}^2 + r_{11}^2\sigma_{r_1}^2$$

$$\sigma_{\beta_{21}}^2 = b_{21}^2\sigma_{b_{21}}^2 + r_{22}^2\sigma_{r_2}^2 + r_{12}^2\sigma_{r_1}^2$$

Depending on the value of the resultant squared error (PGT) and the targeted performance objective (PSG), S1 is able to determine in advance the positions of S2 that are eligible for the assigned objective.

In 3D, the bearing $\overline{G_1}$ is obtained simply as a particular case of configuration 3.1, described below.

Once its North or bearing $\overline{G_1}$ has been determined, the system S1 is able to locate the measured objects Ok, but also other objects of the scene that may be seen only from its position. It thus extracts the object geographical coordinates from the scene with good quality. This location information may directly meet a requirement or be archived in order to construct a local landmark database, which may subsequently supply other requirements or users. This information will be useful in particular for maintaining a North on a system that has to move in the scene.

Once $\overline{G_1}$ has been obtained, the use of other objects makes it possible to process the observation equations as above, by linearizing the equations around the value $\overline{G_1}$ in order to estimate an increment that brings it close to its optimum value.

Configuration 2.1 (Partly without a Distance Measurement Device)

According to another configuration, two systems having an EMAR collaborate, with the particular feature that the system S2 no longer uses its EMED 206, 207, either intentionally for the sake of discretion or through lack of capability (object too far away or equivalent surface of the object too small), or unintentionally (fault): the distance $R_{2k}$ measurements are no longer available. The tandem S1, S2 will seek to obtain the bearing on each of the two systems; S2 then also has an EMAR 220. To this end, it will perform measurements on 2 objects O1 and O2 (K=2). The additional measurements are measurements:

from S1 of distance $R_{11}$ on the object O1 and $R_{12}$ on the object O2, of elevation $E_{12}$ between S1 and the object O2, of horizontal relative angle $L_{12}$ of the EMAR when its optronic system points at the object O2, of approximate azimuth, let us say better than 5 degrees, on the 2 objects $A_{01k}$ for $k \in \{1, 2\}$; this for the purpose of estimating an approximate value $G_{01}$ of $G_1$, from S2 of elevation $E_{21}$ and $E_{22}$ between S2 and the respective objects O1 and O2, of horizontal relative angle $L_{21}$ and $L_{22}$ on the EMAR of S2 when its optronic system points at the objects O1 and O2, respectively.

Two objects (k=1,2) contribute to the measurements of the two systems,

The estimated quantities are the bearings $\overline{G_1}$ and $\overline{G_2}$ of the EMARs of S1 and S2. If necessary, the coordinates of the 2 objects are easily deduced from this, along with the precisions with regard to these quantities.

To perform the additional measurements, the two determined positions being those of S1 and S2, and with K=2:

The first optronic system S1 furthermore comprises:
an EMED or "electronic distance measurement apparatus" of telemeter type 106 and 107, whose direction is aligned with the axis of the acquisition device, able to provide the distance $R_{1k}$ between S1 and the object Ok,
an inclinometer 109 able to provide the elevation $E_{12}$ of the object O2 with respect to S1.

And the second optronic system S2 furthermore comprises:
an inclinometer 209 able to provide the elevations $E_{2k}$ of the objects Ok (k=1 and 2) with respect to S2,
an EMAR 220 able to provide the relative angles $L_{2k}$ between S2 and the objects Ok,
the system S1 comprises a magnetic compass able to provide, directly (through measurement) or indirectly (through calculation), an approximate azimuth on the 2 objects $A_{02k}$.

S2 sends to S1 the measurements performed by S2 along with its own geodetic position (longitude, latitude, altitude).

By rectifying the distance measurements (projection in the plane by way of the elevations), the observation equations are of the form:

|    | Object O1 | Object O2 |
|----|-----------|-----------|
| S1 | $x_1 - X_1 = r_{11} \sin(L_{11} + \overline{G_1})$ | $x_2 - X_1 = r_{12} \sin(L_{12} + \overline{G_1})$ |
|    | $y_1 - Y_1 = r_{11} \cos(L_{11} + \overline{G_1})$ | $y_2 - Y_1 = r_{12} \cos(L_{12} + \overline{G_1})$ |
| S2 | $x_1 - X_2 = \bar{r}_{21} \sin(L_{21} + \overline{G_2})$ | $x_2 - X_2 = \bar{r}_{22} \sin(L_{22} + \overline{G_2})$ |
|    | $y_1 - Y_2 = \bar{r}_{21} \cos(L_{21} + \overline{G_2})$ | $y_2 - Y_2 = \bar{r}_{22} \cos(L_{22} + \overline{G_2})$ |

By eliminating the coordinates of the objects, $$X_2 - X_1 = r_{11} \sin(L_{11} + \overline{G_1}) - \bar{r}_{21} \sin(L_{21} + \overline{G_2})$$

$$Y_2 - Y_1 = r_{11} \cos(L_{11} + \overline{G_1}) - \bar{r}_{21} \cos(L_{21} + \overline{G_2})$$

$$X_2 - X_1 = r_{12} \sin(L_{12} + \overline{G_1}) - \bar{r}_{22} \sin(L_{22} + \overline{G_2})$$

$$Y_2 - Y_1 = r_{12} \sin(L_{12} + \overline{G_1}) - \bar{r}_{22} \sin(L_{22} + \overline{G_2})$$

The system is able to be solved simply by linearization, provided that there is an approximate value (of a few degrees) of the bearings, with:

$$\overline{G_1} = G_{01} + \overline{\Delta G_1}; \overline{G_2} = G_{02} + \overline{\Delta G_2}$$

In this situation, the bearings are obtained by solving the linear system:

$$\begin{pmatrix} r_{11} \cos(A_{011} - A_{021}) & \Delta X_{21} \sin(L_{21} + G_{02}) + \Delta Y_{21} \cos(L_{21} + G_{20}) - r_{11} \cos(A_{011} - A_{021}) \\ r_{12} \cos(A_{012} - A_{022}) & \Delta X_{21} \sin(L_{22} + G_{02}) + \Delta Y_{21} \cos(L_{22} + G_{20}) - r_{12} \cos(A_{012} - A_{022}) \end{pmatrix} \begin{pmatrix} \overline{\Delta G_1} \\ \overline{\Delta G_2} \end{pmatrix} =$$

$$\begin{pmatrix} \Delta X_{21} \cos(L_{21} + G_{02}) - \Delta Y_{21} \sin(L_{21} + G_{02}) - r_{11} \sin(A_{011} - A_{021}) \\ \Delta X_{21} \cos(L_{22} + G_{02}) - \Delta Y_{21} \sin(L_{22} + G_{02}) - r_{12} \sin(A_{012} - A_{022}) \end{pmatrix}$$

Where the approximate azimuth $A_{0mk}$ is obtained for $m \in \{1,2\}$ and $k \in \{1,2\}$ by:

$$A_{0mk} = L_{mk} + G_{0m}$$

Once the bearings have been obtained, the coordinates of the 2 objects are obtained simply in the topographical reference frame of S1 according to the observation relationships of S1 and its bearing. The distances $R_{21}$ and $R_{22}$ may also be easily deduced from this. The theoretical precision with regard to the bearings is also obtained conventionally using a covariance propagation technique similar to the one described in configuration 1.2.

Configuration 2.2 (without a Compass/2 Objects)

According to another configuration, consideration is given to 2 identical optronic systems (M=2, m={1, 2}) collaborating on 2 objects (K=2, k={1, 2}) without a magnetic compass. The two systems aim to collaborate in order to determine the bearing of each of them or, equivalently, the geographic azimuth corresponding to the origin of the horizontal reading of their EMAR. Each one has an EMED and:

an EMAR in the form of a dual-axis goniometer able to provide a horizontal relative angle and an elevation, or
a single-axis EMED and an inclinometer that is able to be integrated into the camera for example.

The two systems collaborate and exchange their measurements on two separate objects of the scene. The additional measurements are measurements:

from S1
of distance $R_{11}$ on the object O1 and $R_{12}$ on the object O2,
of elevation $E_{12}$ between S1 and the object O2,
of horizontal relative angle $L_{12}$ of the EMAR when its optronic system points at the object O2, from S2
of distance $R_{21}$ on the object O1 and $R_{22}$ on the object O2,
of elevation $E_{21}$ and $E_{22}$ between S2 and the respective objects O1 and O2,
of horizontal relative angle $L_{21}$ and $L_{22}$ on the EMAR of S2 when its optronic system points at the objects O1 and O2, respectively.

Two objects (k=1,2) contribute to the measurements of the two systems,

The calculated quantities are the bearings $\overline{G_1}$ and $\overline{G_2}$ of the EMARs of S1 and of S2. If necessary, the coordinates of the 2 objects are easily deduced from this, along with the precisions with regard to these quantities. The bearing of S1 is estimated by S1, as has already been seen. That of S2 is estimated by the calculating unit of S2 on the basis of the observations, those that it does not already have directly being communicated to it by S1. According to one variant, the bearing of S2 is estimated by S1 and then communicated to S2.

A performance calculation makes it possible to evaluate the capability of achieving the performance using the known characteristics of the measurement instruments and by amending the acquisition configuration of the system:

for the first object that is used, and if no appropriate area or object have been determined a priori (before the measurements), S1 seeks the favorable areas for an object on which the tandem S1, S2 will exchange its measurements, for a fixed base (positions of the 2 optronic systems) and the fixed position of an object no. 1, the position of an object no. 2 is modified so as to determine the spatial areas compatible with the performance and in which a second object would be relevant, for objects having fixed and known positions and a known and fixed position of S1, it is possible to determine the areas corresponding to spatial positions of S2 that are eligible for obtaining the performance. These areas may be used:

by directly utilizing the position of S2 without movement, by moving S2 over an accessible area.

The 2 bearings of the 2 systems may be obtained simultaneously by first of all solving the linear system:

$$\begin{pmatrix} R_{11}\cos E_{11}\sin L_{11} & R_{11}\cos E_{11}\cos L_{11} & -R_{21}\cos E_{21}\sin L_{21} & -R_{21}\cos E_{21}\cos L_{21} \\ R_{11}\cos E_{11}\cos L_{11} & -R_{11}\cos E_{11}\sin L_{11} & -R_{21}\cos E_{21}\cos L_{21} & R_{21}\cos E_{21}\sin L_{21} \\ R_{12}\cos E_{12}\sin L_{12} & R_{12}\cos E_{12}\cos L_{12} & -R_{22}\cos E_{22}\sin L_{22} & -R_{22}\cos E_{22}\cos L_{22} \\ R_{12}\cos E_{12}\cos L_{12} & -R_{12}\cos E_{12}\sin L_{12} & -R_{22}\cos E_{22}\cos L_{22} & R_{22}\cos E_{22}\sin L_{22} \end{pmatrix} \begin{pmatrix} \overline{\cos G_1} \\ \overline{\sin G_1} \\ \overline{\cos G_2} \\ \overline{\sin G_2} \end{pmatrix} = \begin{pmatrix} \Delta X_{21} \\ \Delta Y_{21} \\ \Delta X_{21} \\ \Delta Y_{21} \end{pmatrix}$$

and then, using the 4 unknowns that are obtained, the 2 bearings are deduced:

$$\overline{G_1} = a\tan 2(\overline{\sin G_1}, \overline{\cos G_1})$$

$$\overline{G_2} = a\tan 2(\overline{\sin G_2}, \overline{\cos G_2})$$

In this approach, the system does not require an approximate value ($G_{01}$, $G_{02}$), and therefore a compass-type apparatus on the optronic systems, for example.

Once the bearings $\overline{G_1}$ and $\overline{G_2}$ have been obtained using this non-optimum approach, the system of the observation equations may be solved iteratively in a definitive manner in a Gauss-Newton estimation procedure that estimates, at each step, the increments $\overline{\Delta G_1}$ and $\overline{\Delta G_2}$ (see details in the description of configuration 2.3).

Configuration 2.3 (without a Compass/K Objects)

According to another configuration, configuration 2.2 is generalized by still collaborating with 2 systems but observing K>2 objects. The situation of configuration 2.2 is generalized without difficulty when K>2 objects contribute to the collaborative North calculation, by solving the following system having 4 unknowns:

$$\begin{pmatrix} R_{11}\cos E_{11}\sin L_{11} & R_{11}\cos E_{11}\cos L_{11} & -R_{21}\cos E_{21}\sin L_{21} & -R_{21}\cos E_{21}\cos L_{21} \\ R_{11}\cos E_{11}\cos L_{11} & -R_{11}\cos E_{11}\sin L_{11} & -R_{21}\cos E_{21}\cos L_{21} & R_{21}\cos E_{21}\sin L_{21} \\ R_{12}\cos E_{12}\sin L_{12} & R_{12}\cos E_{12}\cos L_{12} & -R_{22}\cos E_{22}\sin L_{22} & -R_{22}\cos E_{22}\cos L_{22} \\ R_{12}\cos E_{12}\cos L_{12} & -R_{12}\cos E_{12}\sin L_{12} & -R_{22}\cos E_{22}\cos L_{22} & R_{22}\cos E_{22}\sin L_{22} \\ \vdots & \vdots & \vdots & \vdots \\ R_{1K}\cos E_{1K}\sin L_{1K} & R_{1K}\cos E_{1K}\cos L_{1K} & -R_{2K}\cos E_{2K}\sin L_{2K} & -R_{2K}\cos E_{2K}\cos L_{2K} \\ R_{1K}\cos E_{1K}\cos L_{1K} & -R_{1K}\cos E_{1K}\sin L_{1K} & -R_{2K}\cos E_{2K}\cos L_{2K} & R_{2K}\cos E_{2K}\sin L_{2K} \end{pmatrix} \begin{pmatrix} \overline{\cos G_1} \\ \overline{\sin G_1} \\ \overline{\cos G_2} \\ \overline{\sin G_2} \end{pmatrix} = \begin{pmatrix} \Delta X_{21} \\ \Delta Y_{21} \\ \Delta X_{21} \\ \Delta Y_{21} \\ \vdots \\ \Delta X_{21} \\ \Delta Y_{21} \end{pmatrix}$$

With approximate solutions of the bearings (either with a compass or having performed the above procedure), it is more effective (in terms of performance) to solve the system having two unknowns ($\overline{\Delta G_1}$, $\overline{\Delta G_2}$) by inverting, as is conventional, the following system by way of the pseudo-inverse matrix:

$$\begin{pmatrix} R_{11} \cos E_{11} \cos(L_{11}+G_{01}) & -R_{21} \cos E_{21} \cos(L_{21}+G_{02}) \\ -R_{11} \cos E_{11} \sin(L_{11}+G_{01}) & R_{21} \cos E_{21} \sin(L_{21}+G_{02}) \\ R_{12} \cos E_{12} \cos(L_{12}+G_{01}) & -R_{22} \cos E_{22} \cos(L_{22}+G_{02}) \\ -R_{12} \cos E_{12} \sin(L_{12}+G_{02}) & R_{22} \cos E_{22} \sin(L_{22}+G_{02}) \\ \vdots & \vdots \\ R_{1K} \cos E_{1K} \cos(L_{1K}+G_{01}) & -R_{2K} \cos E_{2K} \cos(L_{2K}+G_{02}) \\ -R_{1K} \cos E_{1K} \sin(L_{1K}+G_{01}) & R_{2K} \cos E_{2K} \sin(L_{2K}+G_{01}) \end{pmatrix}$$

$$\begin{pmatrix} \overline{\Delta G_1} \\ \overline{\Delta G_2} \end{pmatrix} =$$

$$\begin{pmatrix} \Delta X_{21} - R_{11} \cos E_{11} \sin(L_{11}+G_{01}) + R_{21} \cos E_{21} \sin(L_{21}+G_{02}) \\ \Delta Y_{21} - R_{11} \cos E_{11} \cos(L_{11}+G_{01}) + R_{21} \cos E_{21} \cos(L_{21}+G_{02}) \\ \Delta X_{21} - R_{12} \cos E_{12} \sin(L_{12}+G_{01}) + R_{22} \cos E_{22} \sin(L_{22}+G_{02}) \\ \Delta Y_{21} - R_{12} \cos E_{12} \cos(L_{12}+G_{01}) + R_{22} \cos E_{22} \cos(L_{22}+G_{02}) \\ \vdots \\ \Delta X_{21} - R_{1K} \cos E_{1K} \sin(L_{1K}+G_{01}) + R_{2K} \cos E_{2K} \sin(L_{2K}+G_{02}) \\ \Delta Y_{21} - R_{12} \cos E_{12} \cos(L_{12}+G_{01}) + R_{2K} \cos E_{2K} \cos(L_{2K}+G_{02}) \end{pmatrix}$$

To arrive at the solution, the system is first of all inverted using the pseudo-inverse matrix, and then, with the increments $\overline{\Delta G_1}$ and $\overline{\Delta G_2}$, a new approximation is calculated by substituting the value of $G_{0k}$ with that of $G_{0k}+\overline{\Delta G_k}$.

The system converges after a few iterations, which may be interrupted depending on the desired precision with regard to the bearings (for example when the norm of the vector $[\overline{\Delta G_1}, \overline{\Delta G_2}]$ becomes lower than a certain threshold—0.1 mrad for example—for the current iteration).

Provided that K≥2 objects are available, the performance gain of this estimation method (Gauss-Newton) on the direct method of above configuration 2.2 is notable in situations where there is a small abundance of information, for example when the 2 optronic systems collaborate on two objects and more particularly when the 2 objects move close to one another (thus tending to provide just a single item of information). This consideration makes it possible to choose between the 2 approaches depending on the geometrical configuration of the sensors and of the objects of the scene.

Configuration 2.4 (2 EMARs/1 Object)

According to this configuration, 2 systems S1 and S2 each with an EMAR aim to find their bearing and then their North by collaborating on a single object "k".

The additional measurements are measurements:
of distance $R_{1k}$ between S1 and the object k and $R_{2k}$ between S2 and the object k,
of elevation $E_{2k}$ between S2 and the object k.

To perform the additional measurements, the two determined positions being those of S1 and S2, and for a single object:

The first optronic system S1 furthermore comprises an EMED 106, 107 able to provide the distance $R_{1k}$ between S1 and the object k, And the second optronic system S2 furthermore comprises:
an EMED of telemeter type 206 and 207 whose direction is aligned with the axis of the acquisition device of S2 201, able to provide the distance $R_{2k}$ between S2 and the object k,
an inclinometer 209 able to provide the elevation $E_{2k}$ of the object k with respect to S2 (or a 2-axis EMED such as a goniometer situated at the horizontal with a conventional means of integrated spirit level type).

As indicated, a single object (k=1) is subjected to the measurements of the two systems.

The calculated quantities are the bearings $\overline{\Delta G_1}$ and $\overline{G_2}$ of the EMARs of S1 and S2, respectively. If need be, the coordinates of the object and the performances with regard to these values may be deduced from this. The bearing of S1 is estimated by S1, as has already been seen. That of S2 is estimated by the calculating unit of S2 on the basis of the observations, those that it does not already have directly being communicated to it by S1. According to one variant, the bearing of S2 is estimated by S1 and then communicated to S2.

For this configuration having 2 EMARs, the observation equations on the single object "k=1" are written:

$$\bar{x}_1-X_1=r_{11}\sin(L_{11}+\overline{G_1})$$

$$\bar{y}_1-Y_1=r_{11}\cos(L_{11}+\overline{G_1})$$

$$\bar{x}_1-X_2=r_{21}\sin(L_{21}+\overline{G_2})$$

$$\bar{y}_1-Y_2=r_{21}\cos(L_{21}+\overline{G_2})$$

In these expressions, the quantity r still represents the projection of the distances onto the horizontal plane by way of:

$$r_{m1}=R_{m1}\sin E_{m1}$$

For this configuration, the bearings may still be obtained simply by linearizing the observation equations, provided that the approximate azimuths are available.

In this configuration, there is indicated an expedient way of choosing an optimum position of the object to be measured so as to have optimum performance with regard to the bearings for two fixed positions of the 2 systems. This approach, which utilizes the covariance propagation, is general and applies to all of the configurations with calculations that, such as here, are able to be conducted in such a way as to obtain a simple analytical expression, and for more complex configurations that may be limited to numerical solving of a linear system. Considering the measurement errors as mainly noise-based, the error in the estimated value (here the bearing or the azimuth corresponding to the zero reading of the EMAR) is described by a covariance matrix.

According to this approach based on the covariance propagation, differentiating the observation equations makes it possible, after a few simple calculations, to express the covariance $\Lambda_A$ with regard to the azimuths $A_{jk}=L_{jk}+G_j$ of the object k as a function of the covariances with regard to the differences in position $\Lambda_{\Delta P}$ and the distance measurements $\Lambda_R$ in the form:

$$\Lambda_A = N^{-1}\left[\Lambda_{\Delta P} + \begin{pmatrix} -\sin A_1 & \sin A_2 \\ -\cos A_1 & \cos A_2 \end{pmatrix} \Lambda_R \begin{pmatrix} -\sin A_1 & \sin A_2 \\ -\cos A_2 & \cos A_2 \end{pmatrix}^T \right](N^{-1})^T$$

where the 2×2 N matrix of the system of unknowns A1 and A2 is simply inverted with:

$$N^{-1} = \frac{1}{R_1 R_2 \sin(A_2-A_1)}\begin{pmatrix} R_2 \sin A_2 & R_2 \cos A_2 \\ R_1 \sin A_1 & R_1 \cos A_1 \end{pmatrix}$$

With identical or close errors in the two optronic systems, the best-performance configuration corresponds to symmetrical lines of sight, that is to say sighting an object situated on the perpendicular bisector of the segment joining the two positions of the optronic systems. For this configuration, we have: A2=−A1=−A and R1=R2=R and, if the correlation with regard to the position coordinates is neglected, we have:

$$\Lambda_A = \frac{1}{R^2 \sin^2 2A} \begin{pmatrix} \Lambda_{\Delta Y} \cos^2 A + \Lambda_{\Delta X} \sin^2 A & \Lambda_{\Delta Y} \cos^2 A - \Lambda_{\Delta X} \sin^2 A \\ \Lambda_{\Delta Y} \cos^2 A - \Lambda_{\Delta X} \sin^2 A & \Lambda_{\Delta X} \sin^2 A + \Lambda_{\Delta Y} \cos^2 A \end{pmatrix}$$

Thus, with identical position error components ($\Lambda_{\Delta X}=\Lambda_{\Delta Y}=\sigma_{\Delta P}^2$), and recalling that, in this line of sight configuration, the distance R to the object is linked to the base B and the azimuth A by the relationship R=0.5*B/sin A, the azimuth standard deviation may be written in the form:

$$\sigma_A^2 = \sigma_G^2 + \sigma_L^2 = \frac{\sigma_{\Delta P}^2 + 2\sigma_R^2 - \sigma_R^2 \sin^2 2A}{B^2 \cos^2 A}$$

Seeking the optimum location for the object to be used amounts to finding the maximum performance with regard to the estimation of G for a given base when the azimuth A varies. In this case, $\sigma_G^2$ is still a maximum and corresponds to the value ($\partial \sigma_G^2/\partial A=0$), i.e. all calculations performed at an optimum azimuth A* satisfying:

$$\cos^2 A_* = \frac{\sqrt{\sigma_{\Delta P}^2 + 2\sigma_R^2}}{2\sigma_R}$$

The optimal parallactic angle γ*, or angle between the two lines of sight (double the azimuth value with symmetrical lines of sight), leading to a zero estimation of the EMAR with optimum performance, is able to be obtained and plotted in the form of a 3D layer using the above expression. It is noted that a homogeneous improvement or worsening of the measurements leaves the parallactic value invariant. The optimum geometry thus depends only on the relationship μ of the standard deviation of difference in position with that of distance, with:

$$\cos \gamma_* = \frac{\sqrt{\sigma_{\Delta P}^2 + 2\sigma_R^2} - \sigma_R}{\sigma_R} = \sqrt{2+\mu^2} - 1$$

To clarify expectations, with $\sigma_{\Delta P}$=1 m and $\sigma_R$=2 m, a parallactic angle of 60° is obtained. This angle remains unchanged if the difference, position and distance errors remain double one another and, generally speaking, it is easy to use the above expression to evaluate the optimum angle in order to choose the approximate distance of the object that will give the best performance R*=(B/2)/sin(γ*/2). This type of information is highly useful for the process of forming teams of collaborating optronic systems.

If it is desired to have the performance at all points, it is possible to utilize the above relationships to calculate and plot equal performance curves to find North with a single object.

Once the North and its performance have been obtained, it is easy to determine the performance with which the system is able to locate the object that is used.

The spatial distribution of the performance may also be shown more visually by indicating, on the horizontal plane, the curves of equal performance level as a function of the position of the object for a choice of position of the optronic systems and of quality of the measurements.

In the example of FIG. 10, the bearing of the 2 systems (S1, S2) is calculated by way of a single object. The 2 systems S1 and S2 are shown (plan view) on the plane (x,y) of the scene. When the object "01" is situated at the position (x,y) of the plane, the bearings of S1 and of S2 may be calculated.

The theoretical performance with regard to these bearings (PGT) may be calculated for various positions and for a realistic measurement error set. There is then an error surface above the plane whose height is lower the better the performance. This surface has equal performance curves in space, which may be projected into the horizontal plane.

In FIG. 10a, the values indicated correspond to these curves for the mean performance of the bearings "G1" and "G2" expressed in mrd. Here, the thick unbroken line corresponds to the performance of 1 mrad for the mean bearing.

For this same configuration, FIG. 10b indicates the performance (in meters) obtained with regard to the position (x1,y1) of the object "o1".

These PGT curves illustrate the dependency of the performance with respect to the configuration, and also the requirement to adjust the configuration for the purpose of achieving the PGS.

Configuration 2.5 (Mobile Object)

According to another configuration, consideration is given this time to 2 optronic systems collaborating in order simultaneously to establish their North, using measurements on a single mobile object O, having unknown coordinates and speed. The object may move on the ground, such as for example a pedestrian, a land vehicle or an isolated boat navigating at sea, or in space (aircraft). Such a variant has 2 benefits:

adjusting to a difficult context highly depleted in terms of objects on which to perform common measurements,
characterizing the kinematics of objects moving in a scene.

The additional measurements are measurements:
from S1
of distances $R_{1j}$ on the object at the times $t_j$,
of elevations $E_{1j}$ of the object at the times $t_j$,
of horizontal relative angles $L_{1j}$ of the EMAR when its optronic system points at the object at the times $t_j$,
of approximate azimuth $A_{1j}$ of the optronic system-object direction at the times $t_j$.
from S2 and symmetrically but with multiple dates
of distances $R_{2j'}$ on the object at the times $t_{j'}$,
of elevations $E_{2j'}$ of the object at the times $t_{j'}$,
of horizontal relative angles $L_{2j'}$ of the EMAR when its optronic system points at the object at the times $t_{j'}$,
of approximate azimuth $A_{1j'}$ of the optronic system-object direction at the times $t_{j'}$.

A single mobile object "k" contributes to the measurements of the two systems.

The estimated quantities are:
the bearings of the two systems $\overline{G1}$ and $\overline{G2}$,
the coefficients characterizing the path model of the mobile object.

These quantities are estimated by S1 and/or by S2, as has already been seen.

To this end, the optronic system utilizing the distributed measurements interpolates them in time on the basis of their respective dating. The UTC dating available for example at the GNSS receivers (for example GPS receivers) constitutes a common time scale that has the required precision. However, it will be beneficial for the system to synchronize these measurements on a time base with good consistency and higher clocking (such as image capturing at 50 or 100 Hz), which is itself synchronized in order to ascertain an absolute measurement at the UTC base.

To perform the additional measurements, the two determined positions being those of S1 and S2, and for a single mobile object:
the first optronic system S1 furthermore comprises:
an EMED able to provide the distances $R_{1j}$ between S1 and the mobile object at the times $t_j$,
an inclinometer able to provide the elevations $E_{1j}$ of the mobile object with respect to S1 at the times $t_j$,
a magnetic compass informing of the approximate azimuth $A_{1j}$ on the object at the times $t_j$,
means for dating and for synchronizing the image and angle measurements at the times accommodated for example within the processing unit 110.
and the second optronic system S2 furthermore comprises:
an EMAR able to provide the relative angle $L_{2j'}$ between S2 and the object k at the times $t_{j'}$,
an EMED able to provide the distances $R_{2j'}$ between S2 and the mobile object at the times $t_{j'}$,
an inclinometer able to provide the elevations $E_{2j'}$ of the mobile object with respect to S2 at the times $t_{j'}$,
a magnetic compass informing of the approximate azimuth $A_{2j'}$ on the object at the times $t_{j'}$,
means for dating and for synchronizing the image and angle measurements at the times $t_{j'}$ accommodated for example within the processing unit.

Increasing the speed of the object increases the synchronization constraint and therefore the quality of the dating of the measurements in a common time scale. Increasing the maneuverability of the object increases the complexity or the number of parameters of the path model and therefore the number of measurements necessary for characterization thereof. The measurements of the apparatuses have to be performed over time intervals that at least partly overlap.

The scene may be highly depleted in terms of objects, when for example in the presence of a homogeneous background of sea or sky type. According to this approach, the path of the object is modeled to the order P in the following parametric form:

$$\bar{x}(t) = \sum_{p=0}^{P} \frac{a_p}{p!}(t-t_0)^p$$

$$\bar{y}(t) = \sum_{p=0}^{P} \frac{b_p}{p!}(t-t_0)^p$$

$$\bar{z}(t) = \sum_{p=0}^{P} \frac{c_p}{p!}(t-t_0)^p$$

where the 3P coefficients ($a_p$, $b_p$, $c_p$) are to be determined in order to characterize the path. The time t is for example expressed in the UTC base of the GNSS receiver; $t_0$ is an arbitrary reference time that makes it possible in particular to improve the numerical configuration of the equation system; it may correspond for example to the date of the first measurement on the object.

The speed is obtained by differentiating the expression of the path as a function of time.

It is potentially possible to take into account a clock shift between the dating of measurements of 2 optronic systems, thereby adding an unknown. This is needless if using signals of GNSS quality, such as those of the GPS, but it may prove practical as soon as a lower-quality time base is employed. To clarify expectations, it is possible for example to stop modeling of the path at the order 2 in order to depict an object performing an accelerated movement in the three directions in space. The observation equations on the object are then written:
at three times $t_j$ from the optronic system S1 performing the measurements $R_{1j}$, $L_{1j}$ and $E_{1j}$ at the times $t_j$:

$$a_0 + a_1(t_j - t_0) + \frac{a_2}{2}(t_j - t_0)^2 - X_1 = R_{1j}\sin(L_{1j} + \bar{G}_1)\cos(E_{1j})$$

$$b_0 + b_1(t_j - t_0) + \frac{b_2}{2}(t_j - t_0)^2 - Y_1 = R_{1j}\cos(L_{1j} + \bar{G}_1)\cos(E_{1j})$$

$$c_0 + c_1(t_j - t_0) + \frac{c_2}{2}(t_j - t_0)^2 - Z_1 = R_{1j}\sin(E_{1j})$$

at three times tj' (which may generally be different from tj) from the optronic system S2 performing the measurements R2j', L2j' and E2j' at the times tj':

$$a_0 + a_1(t_{j'} - t_0) + \frac{a_2}{2}(t_{j'} - t_0)^2 - X_2 = R_{2j'}\sin(L_{2j'} + \bar{G}_2)\cos(E_{2j'})$$

$$b_0 + b_1(t_{j'} - t_0) + \frac{b_2}{2}(t_{j'} - t_0)^2 - Y_2 = R_{2j'}\cos(L_{2j'} + \bar{G}_2)\cos(E_{2j'})$$

$$c_0 + c_1(t_{j'} - t_0) + \frac{c_2}{2}(t_{j'} - t_0)^2 - Z_2 = R_{2j'}\sin(E_{2j'})$$

The approximate azimuth $A_{0mk}$ information also makes it possible to linearize the trigonometric expressions for the observation on the system Sm, m∈{1, 2}, at the time k, with:

$$L_{mk} + \bar{G}_m = L_{mk} + \Delta\bar{G}_m = A_{mk}$$

in which, having an approximate azimuth $A_{0mk}$, we substitute:

$$L_{mk} + \bar{G}_m = A_{0mk} + \Delta\bar{G}_m$$

in order to completely linearize the observation equations and obtain, iteratively for the $\Delta G_m$ via a Gauss-Newton algorithm, all of the unknowns of the system.

It is noted that the system may also be solved by eliminating the path coefficients by subtracting the equations member by member. a0 is eliminated in a first step, and then a1 by multiplying the equations by the appropriate temporal coefficient etc.; then the operation is repeated for the equations of the components Y and Z with the coefficients at b and c.

With 11 unknowns, or 12 if a time delay between the clocks of the receivers of the 2 systems is introduced, one set of measurements on the object by each optronic system S1 and S2 are enough to ascertain 12 equations. These measurements may be performed at 2 identical dates, but the rigidification of the path by its model makes it possible to process measurements at 4 dates that are separate but preferably contained in overlapping intervals. It is preferred to synchronize the measurements by way of the time base of the GNSS receiver. With the 12 available equations, the system of equations is (already) plentiful; the processing that is proposed makes it possible to perform processing identically to a system of equations that may be oversized with more observations.

When the path modeling for the object may be limited to a rectilinear movement (P=1), the number of unknowns is reduced to 8. It is then necessary to ascertain at least 3 measurements on the object in order to obtain a solution for the two bearings $\overline{G_1}$ of S1 and $\overline{G_2}$ of S2.

This approach is applied particularly effectively with optronic systems that have an automatic tracking function with a mechanism for orienting the LoS and an image deviation measurement system for keeping the object at the image center despite these movements in the scene.

As another variant to this approach, the North finding may also be carried out in the absence of distance measurements $R_{1j}$ and $R_{2j'}$ on the mobile object. This approach becomes relevant as soon as the optronic system is not able to perform an MED (electronic distance measurement) on the object, due to its distance or on account of its small equivalent surface or else simply because the system does not have an EMED.

Configuration 2.6 (Bistatic Measurements)

According to another configuration, two optronic systems S1 and S2 collaborate; their communication means are optical and formed by a bistatic system that is able to code the observations by modulating a laser beam signal. An overview of such systems is presented in the document: "Survey on Free Space Optical Communication-A Communication Theory Perspective 2014". Free-space optical/laser (FSO/FSL) communication technologies are growing and bistatic lidar systems are proposed:

in an exo-atmospheric environment for detecting space debris "Multistatic Laser Ranging to Space Debris" Kirchner 2012, in an atmospheric environment for assisting in landing by analyzing the atmospheric content, as described in "Unmanned Aircraft Bistatic LIDAR for CO2 Column Density Determination" 2014, in an underwater environment, such as described in "Experiments in bistatic Laser Line Scan (LLS) underwater imaging" Dalgleish 2009.

These technologies are able to be utilized on optronic systems having telemeters that operate appropriately in the 0.8 to 1.5 μm band so as to transport information between two delocalized optronic systems. According to the invention, this technology is utilized as a new method for observing and for communicating for a collaborative bistatic system with optronic systems whose aim is to find their North for the purpose of calibrating/utilizing their EMAR.

Figure 4:
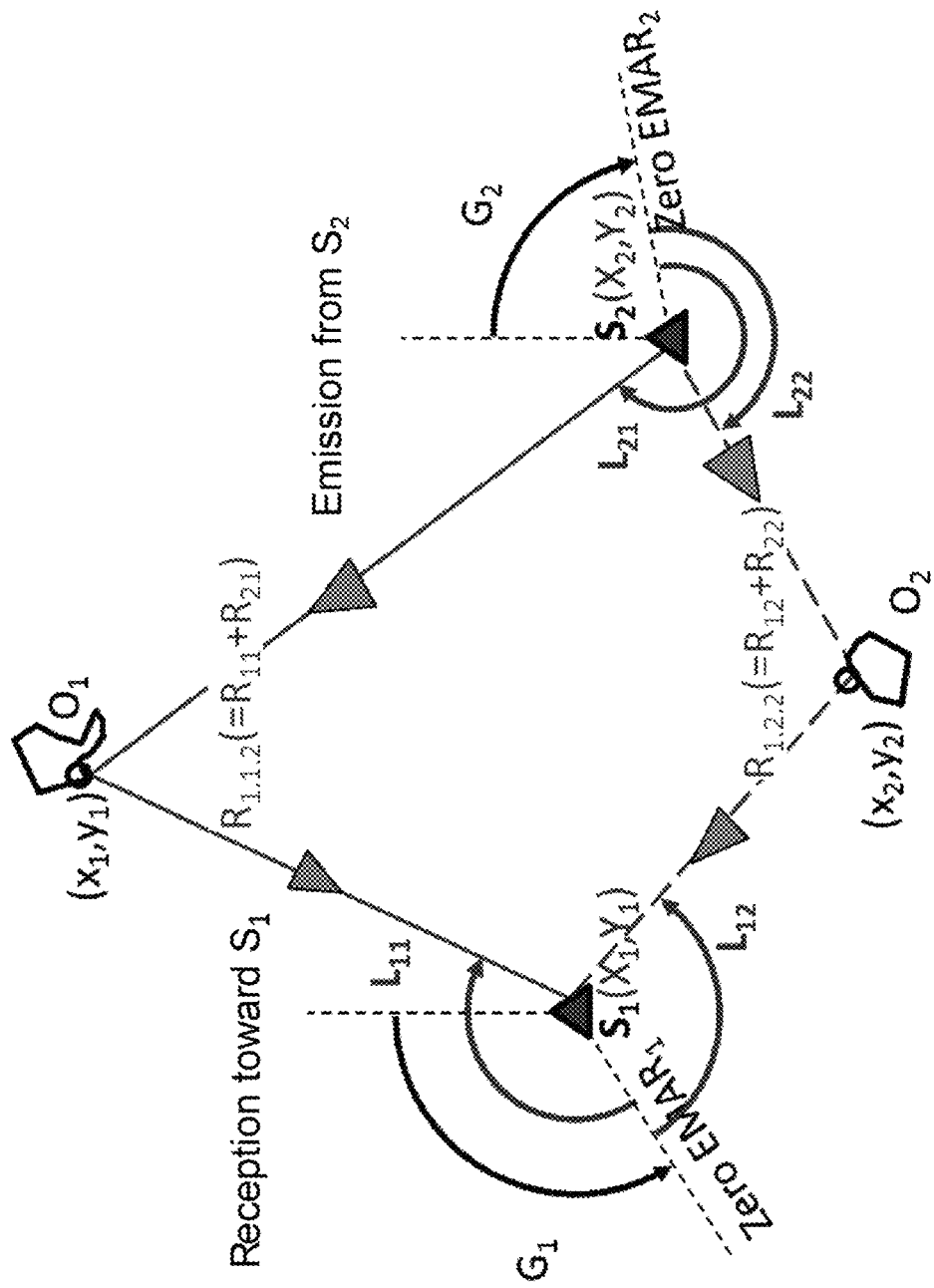

According to this configuration, illustrated in FIGS. 4 and 6, the two systems therefore collaborate with a bistatic laser apparatus and with measurements of a kind different from the previous ones. In this configuration, limited for this description to two systems S1 and S2, S2 emits, with its emitter 206, a laser beam pointed toward an object "Ok" of the scene (natural or artificial) and S1 receives, with its receiver 107, the beam returned by the object Ok. S1 therefore measures a distance corresponding to the sum of the distances between S1 and O1, on the one hand, and O1 and S2, on the other hand, each term of the sum not being measured separately. S1 has means allowing it to orient its laser receiver on the object pointed at by S2. S2 benefits from the abilities to modulate the emitted signal, so as to add to the beam prior measurement information, in particular its measurements:

of geodetic position, performed by way of its EMPG 205,
of site on the object, performed by way of an inclinometer 209,
of approximate azimuth on the object, performed by way of a magnetic compass 208.

In practice, the inclination of the line of sight direction must allow the observation to be rectified in the horizontal plane, but this is facilitated when there is knowledge of the distance from the optronic system to the sighted object. It is possible first of all to assume quasi-horizontal measurements for estimating an approximate position of the object, and then thereafter reiterate the calculation using a distance approximated via this initial position calculation.

One practical situation is that of using an approximate azimuth provided for example by a magnetic compass, in order to obtain an approximate position of the object by triangulation (after communicating the position of the optronic system and line of sight direction).

The bistatic observation equation between the optronic system S1 and the optronic system S2, which corresponds to the sum $S_{12}$ of the distances S1-object Ok and object Ok-S2, is of the form:

$$\sqrt{(x_k-X_1)^2+(y_k-Y_1)^2}+\sqrt{(x_k-X_2)^2+(y_k-Y_2)^2}=S_{12-k}$$

If there are 2 optronic systems having known coordinates, this bistatic observation, the goniometer horizontal reading of the two optronic systems, there are a total of 5 equations for 6 unknowns ($\overline{R_{1k}}, \overline{R_{2k}}, \overline{x_k}, \overline{y_k}, \overline{G_1}, \overline{G_2}$). Therefore, as the bistatic mode does not allow the individual distances to be estimated, a third optronic system or a second object is used.

By adding the more conventional measurements, there is then the set of observations (10 equations having 10 unknowns) featured in the following table, which shows the 2D observation relationships with 2 cameras and 2 objects contributing to a bistatic measurement:

|  | Object O1 | Object O2 |
|---|---|---|
| S1 | $\overline{x}_1 - X_1 = \overline{R}_{11} \sin(L_{11} + \overline{G}_1)$ | $\overline{x}_2 - X_1 = \overline{R}_{12} \sin(L_{12} + \overline{G}_1)$ |
|  | $\overline{y}_1 - Y_1 = \overline{R}_{11} \cos(L_{11} + \overline{G}_1)$ | $\overline{y}_2 - Y_1 = \overline{R}_{12} \cos(L_{12} + \overline{G}_1)$ |
| S2 | $\overline{x}_1 - X_2 = \overline{R}_{21} \sin(L_{21} + \overline{G}_2)$ | $\overline{x}_2 - X_2 = \overline{R}_{22} \sin(L_{22} + \overline{G}_2)$ |
|  | $\overline{y}_1 - Y_2 = \overline{R}_{21} \cos(L_{21} + \overline{G}_2)$ | $\overline{y}_2 - Y_2 = \overline{R}_{22} \cos(L_{22} + \overline{G}_2)$ |
| Bistatic S1 & S2 | $\sqrt{(\overline{x}_1 - X_1)^2 + (\overline{y}_1 - Y_1)^2} + \sqrt{(\overline{x}_1 - X_2)^2 + (\overline{y}_1 - Y_2)^2} = S_{12-1}$ | $\sqrt{(\overline{x}_2 - X_1)^2 + (\overline{y}_2 - Y_1)^2} + \sqrt{(\overline{x}_2 - X_2)^2 + (\overline{y}_2 - Y_2)^2} = S_{12-2}$ |

For 2 optronic systems and 2 objects, there are then just enough observations but a system of nonlinear equations. To solve this in a simple manner, it is assumed that there is an approximate solution to the position of the objects $(x_{Ok}, y_{Ok})$ obtained via a magnetic compass and conventional triangulation technique from the approximate line of sight directions of the 2 systems, for example. We then have:

$$\overline{x}_1 = x_{01} + \overline{dx_1}$$

$$\overline{y}_1 = y_{01} + \overline{dy_1}$$

and the increments $\overline{dx_1}$ and $\overline{dy_1}$, assumed to be small in comparison with the distances to the cameras, are sought.

This information makes it possible to determine approximate distances between the optronic systems and the object, and also possible approximate bearings.

In this "bistatic" configuration, the positions of S1 and S2 being determined, the additional measurement are $L_{1k}$, $L_{2k}$, and measurements of approximate azimuth $A_{O1k}$, $A_{O2k}$. The approximate positions of the objects $(x_{Ok}, y_{Ok})$ are obtained as indicated above.

In practice, the bistatic measurement equation is written, for the entity "k":

$$\sqrt{(x_{Ok}-X_1+\overline{dx_k})^2+(y_{Ok}-Y_1+\overline{dy_k})^2} + \sqrt{(x_{Ok}-X_2+\overline{dx_k})^2+(y_{Ok}-Y_2+\overline{dy_k})^2} = S_{12}$$

i.e., after first-order arrangement:

$$\left(\frac{x_{0k}-X_1}{R_{01k}}+\frac{x_{0k}-X_2}{R_{02k}}\right)\overline{dx_k}+\left(\frac{y_{0k}-Y_1}{R_{01k}}+\frac{y_{0k}-Y_2}{R_{02k}}\right)\overline{dy_k} = S_{12-k} - R_{01K} - R_{02k}$$

Moreover, there are still angular lines of sight satisfying the 4 following equations for $(m,k=\{1,2\})$ $$[(x_{0k}-X_m)\sin A_{0mk}+(y_{0k}-Y_m)\cos A_{0mk}]\overline{\Delta G_m}-\cos A_{0mk}\overline{dx_k}+\sin A_{0mk}\overline{dy_k}=(x_{0k}-X_m)\cos A_{0mk}-(y_{0k}-Y_m)\sin A_{0mk}$$

where:

$$A_{0mk}=L_{mk}+G_{0m}$$

$$\overline{G_m}=G_{m0}+\overline{\Delta G_m}$$

That is to say a reduction to 6 linear equations having 6 unknowns $(\overline{dx_1}, \overline{dy_1}, \overline{dx_2}, \overline{dy_2}, \overline{\Delta G_1}, \overline{\Delta G_2})$:

Denoted:

$$\Delta x_{mk}=x_{0k}-X_m; \Delta y_{mk}=y_{0k}-Y_m$$

From the above linear system, it is easy to estimate the two bearings $\overline{\Delta G_1}$ and $\overline{G_2}$ of S1 and S2 and, secondarily, the position of the 2 objects subjected to the measurements.

Note: In the event of direct optical vision of the 2 systems S1 and S2, a constraint that may also be facilitated by utilizing visibility maps with DTMs, the two systems may establish communication beforehand in order to exchange protocol information, their geodetic positions and approximate directions on objects contributing to measurements.

This type of collaboration has the following advantages:
the joint incorporation of the measurement and information transmission aspects,
the lack of a natural error linked to pointing over an area slightly separate from
the object, while this error has to be reduced by the user in the case of 2 conventional systems,
a respective cost and mass gain for the EMEDs of the two systems.

Configuration 3.1 (1 EMAR, M Optronic Systems, K Objects)

According to another configuration, consideration is given to M collaborating systems for the purpose of estimating a North on the single optronic system S1 having an EMAR, with M≥2. The M−1 other systems do not have an EMAR, and the optronic systems perform measurements on K objects, with K≤2 (at least K=2 objects, provided that the M−1 systems do not have an approximate azimuth measurement means).

The first optronic system S1 comprises an EMED or "electronic distance measurement apparatus" of telemeter type with an emitter 106 and a receiver 107, whose direction is aligned with the axis of the acquisition device 101, able to provide the distance $R_{1k}$ between S1 and the object Ok, And each of the "M−1" other optronic systems Sm ∈ {2, . . . , M} furthermore comprises:
an EMED of telemeter type with an emitter 206 and a receiver 207, whose direction is aligned with the axis of the acquisition device 201 of S2, able to provide the distance $R_{mk}$ between Sm and the object Ok.

The geographical positions of the M−1 other systems are provided by the positioning means (EMPG) fitted to each optronic system. The additional measurements are distance measurements performed from the optronic systems on the objects "Ok".

$$\begin{cases} \text{object 1:} \\ (\Delta x_{11} \sin A_{011} + \Delta y_{11} \cos A_{011})\overline{\Delta G_1} - \cos A_{011}\overline{dx_1} + \sin A_{011}\overline{dy_1} = \Delta x_{11} \cos A_{011} - \Delta y_{11} \sin A_{011} \\ (\Delta x_{21} \sin A_{021} + \Delta y_{21} \cos A_{021})\overline{\Delta G_2} - \cos A_{021}\overline{dx_1} + \sin A_{021}\overline{dy_1} = \Delta x_{21} \cos A_{021} - \Delta y_{21} \sin A_{021} \\ \left(\frac{\Delta x_{11}}{R_{011}} + \frac{\Delta x_{21}}{R_{021}}\right)\overline{dx_1} + \left(\frac{\Delta y_{11}}{R_{011}} + \frac{\Delta y_{21}}{R_{021}}\right)\overline{dy_1} = S_{12-1} - R_{011} - R_{021} \\ \text{object 2:} \\ (\Delta x_{12} \sin A_{012} + \Delta y_{12} \cos A_{012})\overline{\Delta G_1} - \cos A_{012}\overline{dx_2} + \sin A_{012}\overline{dy_2} = \Delta x_{12} \cos A_{012} - \Delta y_{12} \sin A_{012} \\ (\Delta x_{22} \sin A_{022} + \Delta y_{22} \cos A_{022})\overline{\Delta G_2} - \cos A_{022}\overline{dx_2} + \sin A_{022}\overline{dy_2} = \Delta x_{22} \cos A_{022} - \Delta y_{22} \sin A_{022} \\ \left(\frac{\Delta x_{12}}{R_{012}} + \frac{\Delta x_{22}}{R_{022}}\right)\overline{dx_2} + \left(\frac{\Delta y_{12}}{R_{012}} + \frac{\Delta y_{22}}{R_{022}}\right)\overline{dy_2} = S_{12-2} - R_{012} - R_{022} \end{cases}$$

The optronic systems S1, . . . , SM perform their measurements on K objects Ok ($k \in \{1, \ldots, K\}$), the M−1 other systems S2, SM send their measurements to S1.

The quantity calculated is the bearing $\overline{G_1}$ of the EMAR of S1.

We ascertain observation equations that make it possible to arrive at the form:

$$\sin(L_{1k} + \psi_{1m})\cos \overline{G_1} + \cos(L_{1k} + \psi_{1m})\sin \overline{G_1} =$$

$$\frac{B_{1m}^2 + R_{1K}^2 - R_{mK}^2 - 2R_{1K}\Delta Z_{m1} \sin E_{1K}}{2R_{1K}B_{1m} \cos E_{1K}}$$

or else:

$$(\Delta X_{m1} \sin L_{1K} + \Delta Y_{m1} \cos L_{1K})\cos \overline{G_1} +$$

$$(\Delta X_{m1} \cos L_{1K} - \Delta Y_{m1} \sin L_{1K})\sin \overline{G_1} =$$

$$\frac{B_{1m}^2 + R_{1K}^2 - R_{mK}^2 - 2R_{1K}\Delta Z_{m1} \sin E_{1K}}{2R_{1K} \cos E_{1K}}$$

with:

$$\Delta X_{m1} = X_m - X_1; \Delta Y_{m1} = Y_m - Y_1; \quad B_{m1} = (X_m - X_1)^2 + (Y_m - Y_1)^2 + (Z_m - Z_1)^2$$

$$\psi_{1m} = \arctan(\Delta Y_{m1}; \Delta X_{m1})$$

and therefore, for the various observations, a bearing $\overline{G_1}$ satisfying the system:

$$\begin{pmatrix} \Delta X_{21}\sin L_{11} + \Delta Y_{21}\cos L_{11} & \Delta X_{21}\cos L_{11} - \Delta Y_{21}\sin L_{11} \\ \vdots & \vdots \\ \Delta X_{21}\sin L_{1K} + \Delta Y_{21}\cos L_{1K} & \Delta X_{21}\cos L_{1K} - \Delta Y_{21}\sin L_{1K} \\ \vdots & \vdots \\ \Delta X_{M1}\sin L_{11} + \Delta Y_{M1}\cos L_{11} & \Delta X_{M1}\cos L_{MK} - \Delta Y_{M1}\sin L_{1K} \\ \vdots & \vdots \\ \Delta X_{M1}\sin L_{1K} + \Delta Y_{M1}\cos L_{1K} & \Delta X_{M1}\cos L_{1K} - \Delta Y_{M1}\sin L_{1K} \end{pmatrix} \begin{pmatrix} \overline{\cos G_1} \\ \overline{\sin G_1} \end{pmatrix} =$$

$$\begin{pmatrix} \frac{B_{12}^2 + R_{11}^2 - R_{21}^3 - 2R_{11}\Delta Z_{21}\sin E_{11}}{2R_{11}\cos E_{11}} \\ \vdots \\ \frac{B_{12}^2 + R_{1K}^2 - R_{2K}^2 - 2R_{1K}\Delta Z_{21}\sin E_{1K}}{2R_{1K} \cos E_{1K}} \\ \vdots \\ \frac{B_{1M}^2 + R_{1K}^2 - R_{MK}^2 - 2R_{1K}\Delta Z_{M1}\sin E_{1K}}{2R_{11} \cos E_{11}} \\ \vdots \\ \frac{B_{1M}^2 + R_{1K}^2 - R_{MK}^2 - 2R_{1K}\Delta Z_{M1}\sin E_{1K}}{2R_{1K} \cos E_{1K}} \end{pmatrix}$$

Either making A the matrix of the system, D the second component member ($D_{mk}$) and $N_{MK}$ the matrix $A^T A$ (where $A^T$ is the transposed matrix of A):

$$A_{MK} = \begin{pmatrix} \Delta X_{21} \sin L_{11} + \Delta Y_{21} \cos L_{11} & \Delta X_{21} \cos L_{11} - \Delta Y_{21} \sin L_{11} \\ \vdots & \vdots \\ \Delta X_{21} \sin L_{1K} + \Delta Y_{21} \cos L_{1K} & \Delta X_{21} \cos L_{1K} - \Delta Y_{21} \sin L_{1K} \\ \vdots & \vdots \\ \Delta X_{M1} \sin L_{11} + \Delta Y_{M1} \cos L_{11} & \Delta X_{M1} \cos L_{MK} - \Delta Y_{M1} \sin L_{1K} \\ \vdots & \vdots \\ \Delta X_{M1} \sin L_{1K} + \Delta Y_{M1} \cos L_{1K} & \Delta X_{M1} \cos L_{1K} - \Delta Y_{M1} \sin L_{1K} \end{pmatrix}$$

$$F_{MK} = \begin{pmatrix} D_{11} \\ \vdots \\ D_{1K} \\ \vdots \\ D_{M1} \\ \vdots \\ D_{MK} \end{pmatrix}$$

With, for $n \in \{2, \ldots, M\}$ and $l \in \{1, \ldots, K\}$:

$$D_{n\ell} = \frac{B_{1n}^2 + R_{1\ell}^2 - R_{n\ell}^2 - 2R_{1\ell}\Delta Z_{n1} \sin E_{1\ell}}{2R_{1\ell}B_{1n} \cos E_{1\ell}}$$

$$\gamma_{n\ell} = L_{1\ell} + \psi_{1n}$$

With, for the solution of the system:

$$\begin{pmatrix} \overline{\cos G_1} \\ \overline{\sin G_1} \end{pmatrix} = N_{MK}^{-1} A_{MK}^T F_{MK}$$

Or making A the matrix of the system, F the second member and $N_{MK}$ the matrix $A^T A$:

$$N_{MK} = A_{MK}^T A_{MK} = \begin{pmatrix} \sum_{k=1}^{K}\sum_{m=1}^{M} \sin^2 \gamma_{mk} & \sum_{k=1}^{K}\sum_{m=2}^{M} \sin \gamma_{mk} \cos \gamma_{mk} \\ \sum_{k=1}^{K}\sum_{m=2}^{M} \sin \gamma_{mk} \cos \gamma_{mk} & \sum_{k=1}^{K}\sum_{m=2}^{M} \cos^2 \gamma_{mk} \end{pmatrix}$$

Or a determinant for N of:

$$\Delta_{MK} = \frac{1}{4}\left[K^2(M-1)^2 - \left(\sum_{k=1}^{K}\sum_{m=2}^{M}\cos 2\gamma_{mk}\right)^2 - \left(\sum_{k=1}^{K}\sum_{m=2}^{M}\sin 2\gamma_{mk}\right)^2\right]$$

The performance is at a maximum when this determinant is zero; i.e. for:

$$\sum_{k=1}^{K}\sum_{m=1}^{M-1} \cos 2\gamma_{mk} = 0 \text{ and } \sum_{k=1}^{K}\sum_{m=1}^{M-1} \sin 2\gamma_{mk} = 0$$

With all calculations performed, the solution is written as:

$$\overline{G_1} = \arctan(\overline{\sin G_1}; \overline{\cos G_1})$$

with:

$$\overline{\sin G_1} = \frac{1}{\Delta_{MK}} \sum_{k=1}^{K}\sum_{m=2}^{M}\sum_{\ell=1}^{K}\sum_{n=2}^{M} D_{n\ell} \sin \gamma_{mk} \sin(\gamma_{mk} - \gamma_{n\ell})$$

$$\overline{\cos G_1} = \frac{1}{\Delta_{MK}} \sum_{k=1}^{K}\sum_{m=2}^{M}\sum_{\ell=1}^{K}\sum_{n=2}^{M} D_{n\ell} \cos \gamma_{mk} \sin(\gamma_{n\ell} - \gamma_{mk})$$

or, giving a compact expression of the bearing $\overline{G_1}$, in the form:

$$\overline{G_1} = \arctan\left(\sum_{k=1}^{K}\sum_{m=2}^{M}\sum_{\ell=1}^{K}\sum_{n=2}^{M} D_{n\ell} \sin \gamma_{mk} \sin(\gamma_{mk} - \gamma_{n\ell}); \sum_{k=1}^{K}\sum_{m=2}^{M}\sum_{\ell=1}^{K}\sum_{n=2}^{M} D_{n\ell} \cos \gamma_{mk} \sin(\gamma_{n\ell} - \gamma_{mk})\right)$$

where $(n,m) \in \{2, \ldots, M\}^2$ and $(l,k) \in \{1, \ldots, K\}^2$ and a tan(a;b) corresponds to the bijective function a tan(b/a) onto $[-\pi, \pi]$, also often denoted a tan 2.

The previous expression thus indicates the value of the bearing of the EMAR of the system S1 collaborating with M−1 other optronic systems that communicate to it the measurements on K objects, the measurements in question being the geographical positions of the M−1 other systems, and the distance between the M−1 other systems and the K objects.

In practice, if the measurement of the system "n" on the object 'T' is not performed, the corresponding observation equation does not exist and should not be taken into account in the summations. To generalize the expression for these situations, Kroner symbols, denoted "$\delta_{n\ell}$", with the value of 1 if the system "n" performs the measurement on the object 'l' and 0 if not, could be used.

The benefit of the previous expression is that of obtaining a bearing in a configuration that does not require resorting to a magnetic compass or to any form of information necessary to ascertain an orientation reference value approximated to a few degrees. Once the bearing has been obtained, it is recommended to linearize the initial observation system around this value and seek an optimum value of $\overline{G_1}$ in iteration form in a Gauss-Newton procedure; with the only unknown being the increment $\overline{\Delta G_1}$ determined in each step. This recommendation applies particularly if the number of objects K is small, such as for example K=2, with two objects close to one another (with regard to the distribution of the objects p/r to the optronic systems).

Configuration 3.2 (Passive)

In a passive approach, the joint acquisition by two delocalized optronic systems may practically use the epipolar geometry of the 2 optronic systems for the purpose of reducing, on a second optronic system, the time to seek an object acquired by a first optronic system. This epipolar geometry, which is based on the geometric constraint posed by the imaging models of the 2 optronic systems, indicates that an object of the scene, having known image coordinates corresponding to a spatial direction in the scene, lies situated on a curve (said to be epipolar) in the image of the second optronic system. If the object moves in the initial direction (modifying its depth in the scene) corresponding to a point in the image of the first optronic system, then it moves over the epipolar curve in the image of the second optronic system. In the most conventional sensor case, in which the imaging geometry corresponds to a pinhole model, these epipolar curves are straight lines. Instead of seeking an object of the scene in the entire image plane (2D space) of the second optronic system, its search is thus limited to a curve/straight line (1D space).

To perform these additional measurements, the first optronic system S1 already comprises an inclinometer (or a 2-axis EMAR) also able to provide the elevations $E_{1k}$ of the object k with respect to S1, and has a GNSS able to provide the position of S1.

The second optronic system S2 furthermore comprises:
an inclinometer able to provide the elevations $E_{2k}$ of the object k with respect to S2,
a device (EMAR or "relative horizontal angular measurement apparatus") for measuring the relative angle $L_{2k}$ between S2 and the object k,
a GNSS able to provide the position of S2.

The third optronic system S3 furthermore comprises:
an inclinometer able to provide the elevations $E_{3k}$ of the object k with respect to S3,
a device (EMAR or "relative horizontal angular measurement apparatus") for measuring the relative angle $L_{3k}$ between S3 and the object k,
a GNSS able to provide the position of S3.

On the basis of the observations that are exchanged (L1k, additional measurements and at least three optronic system positions), each optronic system having an EMAR will determine its bearing $\overline{G_m}$ and possibly the associated performance.

First of all, approximate coordinates of the objects are determined. To this end, the use of approximate azimuth values makes it possible to determine, by triangulating pairs of measurements, approximate positions of the objects ($x_{0k}$, $y_{0k}$, $z_{0k}$).

Another approach for ascertaining approximate values of the positions of the objects consists simply in solving the following linear system:

$$x_{0k} \cos A_{0mk} - \overline{y}_{0k} \sin_{mk} A_{0mk} = X_m \cos A_{0mk} - Y_m \sin A_{0mk}$$

where the approximate azimuths are fixed according to the value provided by the magnetic compass:

$$A_{0mk} = L_{mk} + G_{0m}$$

$$S1 \begin{cases} \overline{x}_1 \cos A_{011} - \overline{y}_1 \sin A_{011} = X_1 \cos A_{011} - Y_1 \sin A_{011} \\ \overline{x}_2 \cos A_{012} - \overline{y}_2 \sin A_{012} = X_1 \cos A_{012} - Y_1 \sin A_{012} \\ \vdots \\ \overline{x}_K \cos A_{01K} - \overline{y}_K \sin A_{01K} = X_1 \cos A_{01K} - Y_1 \sin A_{01K} \end{cases}$$

$$S2\begin{cases} \bar{x}_1 \cos A_{021} - \bar{y}_1 \sin A_{021} = X_2 \cos A_{021} - Y_2 \sin A_{021} \\ \bar{x}_2 \cos A_{022} - \bar{y}_2 \sin A_{022} = X_2 \cos A_{022} - Y_2 \sin A_{022} \\ \vdots \\ \bar{x}_K \cos A_{02K} - \bar{y}_K \sin A_{02K} = X_2 \cos A_{02K} - Y_2 \sin A_{02K} \end{cases}$$

$$\vdots$$

$$SM \begin{cases} \bar{x}_1 \cos A_{0M1} - \bar{y}_1 \sin A_{0M1} = X_M \cos A_{0M1} - Y_M \sin A_{0M1} \\ \bar{x}_2 \cos A_{0M2} - \bar{y}_2 \sin A_{0M2} = X_M \cos A_{0M2} - Y_M \sin A_{0M2} \\ \vdots \\ \bar{x}_K \cos A_{0MK} - \bar{y}_K \sin A_{0MK} = X_M \cos A_{0MK} - Y_M \sin A_{0MK} \end{cases}$$

Neglecting the index 0 indicating the obtaining of approximate values so as not to overload the expressions, the coordinates of the K objects are therefore obtained, using:

$$\begin{pmatrix} \cos A_{11} & -\sin A_{11} & 0 & 0 & \cdots & 0 & 0 \\ 0 & 0 & \cos A_{12} & -\sin A_{21} & \cdots & 0 & 0 \\ \vdots & \vdots & \vdots & \vdots & \ddots & \vdots & \vdots \\ 0 & 0 & 0 & 0 & \cdots & \cos A_{1K} & -\sin A_{1K} \\ \cos A_{21} & -\sin A_{21} & 0 & 0 & \cdots & 0 & 0 \\ 0 & 0 & \cos A_{22} & -\sin A_{22} & \cdots & 0 & 0 \\ \vdots & \vdots & \vdots & \vdots & \ddots & \vdots & \vdots \\ 0 & 0 & 0 & 0 & \cdots & \cos A_{2K} & -\sin A_{2K} \\ \vdots & \vdots & \vdots & \vdots & & \vdots & \vdots \\ \cos A_{M1} & -\sin A_{M1} & 0 & 0 & \cdots & 0 & 0 \\ 0 & 0 & \cos A_{M2} & -\sin A_{M2} & \cdots & 0 & 0 \\ \vdots & \vdots & \vdots & \vdots & \ddots & \vdots & \vdots \\ 0 & 0 & 0 & 0 & \cdots & \cos A_{MK} & -\sin A_{MK} \end{pmatrix}$$

$$\begin{pmatrix} \bar{x}_1 \\ \bar{y}_1 \\ \bar{x}_2 \\ \bar{y}_2 \\ \vdots \\ \bar{x}_K \\ \bar{y}_K \end{pmatrix} = \begin{pmatrix} X_1 \cos A_{11} - Y_1 \sin A_{11} \\ \vdots \\ X_1 \cos A_{1K} - Y_1 \sin A_{1K} \\ \vdots \\ X_M \cos A_{M1} - Y_M \sin A_{M1} \\ \vdots \\ X_M \cos A_{MK} - Y_M \sin A_{MK} \end{pmatrix}$$

Once the 2K coordinates $(\overline{x_{0k}}, \overline{y_{0k}})$ are available for $k \in \{1, \ldots K\}$, it is possible to linearize the whole system and seek M values $\overline{\Delta G_m}$ and K coordinate corrections $(d\bar{x}_k, d\bar{y}_k)$ satisfying:

$$\bar{x}_k = x_{0k} + d\bar{x}_k; k \in \{1, \ldots, K\}$$

$$\bar{y}_k = x_{0k} + d\bar{y}_k; k \in \{1, \ldots, K\}$$

$$\overline{G}_k = G_{0k} + \overline{\Delta G_m}; m \in \{1, \ldots, M\}$$

Expanding the generic observation equation gives:

$$(x_{0k} + d\bar{x}_k - X_m)\cos(A_{0mk} + \overline{\Delta G_m}) = (y_{0k} + d\bar{y}_k - Y_m)\sin(A_{0mk} + \overline{\Delta G_m})$$

i.e.:

$$(x_{0k} + d\bar{x}_k - X_m)(\cos A_{0mk} - \sin A_{mk0}\overline{\Delta G_m}) = (y_{0k} + d\bar{y}_k - Y_m)(\sin A_{0mk} + \cos A_{0mk}\overline{\Delta G_m})$$

and by expanding:

$$[(x_{0k} - X_m)\sin A_{0mk} + (y_{0k} - Y_m)\cos A_{0mk}]\overline{\Delta G_m} - \cos A_{0mk} d\bar{x}_k + \sin A_{0mk} d\bar{y}_k = (x_{0k} - x_m)\cos A_{0mk} - (y_{0k} - Y_m)\sin A_{0mk}$$

giving increments that solve the linear system:

$$(\Delta x_{mk} \sin A_{0mk} + \Delta y_{mk} \cos A_{0mk})\overline{\Delta G_m} - \cos A_{0mk} d\bar{x}_k + \sin A_{0mk} d\bar{y}_k = \Delta x_{mk} \cos A_{0mk} - \Delta y_{mk} \sin A_{0mk}$$

with:

$$\Delta x_{mk} = x_{0k} - X_m; \Delta y_{mk} = y_{0k} - Y_m$$

That is to say, for each system Sm and for each object k:

$$S1 \begin{cases} (\Delta \bar{x}_{11} \sin A_{011} + \Delta \bar{y}_{11} \cos A_{011})\overline{\Delta G_1} - \cos A_{011} d\bar{x}_1 + \sin A_{011} d\bar{y}_1 = \Delta \bar{x}_{11} \cos A_{011} - \Delta \bar{y}_{11} \sin A_{011} \\ (\Delta \bar{x}_{12} \sin A_{012} + \Delta \bar{y}_{12} \cos A_{012})\overline{\Delta G_1} - \cos A_{012} d\bar{x}_2 + \sin A_{012} d\bar{y}_2 = \Delta \bar{x}_{12} \cos A_{012} - \Delta \bar{y}_{12} \sin A_{012} \\ \vdots \\ (\Delta \bar{x}_{1K} \sin A_{01K} + \Delta \bar{y}_{1K} \cos A_{01K})\overline{\Delta G_1} - \cos A_{01K} d\bar{x}_K + \sin A_{01K} d\bar{y}_K = \Delta \bar{x}_{1K} \cos A_{01K} - \Delta \bar{y}_{1K} \sin A_{01K} \end{cases}$$

$$S2 \begin{cases} (\Delta \bar{x}_{21} \sin A_{021} + \Delta \bar{y}_{21} \cos A_{021})\overline{\Delta G_2} - \cos A_{021} d\bar{x}_1 + \sin A_{021} d\bar{y}_1 = \Delta \bar{x}_{21} \cos A_{021} - \Delta \bar{y}_{21} \sin A_{021} \\ (\Delta \bar{x}_{22} \sin A_{022} + \Delta \bar{y}_{22} \cos A_{022})\overline{\Delta G_2} - \cos A_{022} d\bar{x}_2 + \sin A_{022} d\bar{y}_2 = \Delta \bar{x}_{22} \cos A_{022} - \Delta \bar{y}_{22} \sin A_{022} \\ \vdots \\ (\Delta \bar{x}_{2K} \sin A_{02K} + \Delta \bar{y}_{2K} \cos A_{02K})\overline{\Delta G_2} - \cos A_{02K} d\bar{x}_K + \sin A_{02K} d\bar{y}_K = \Delta \bar{x}_{2K} \cos A_{02K} - \Delta \bar{y}_{2K} \sin A_{02K} \end{cases}$$

$$\vdots$$

$$SM \begin{cases} (\Delta \bar{x}_{M1} \sin A_{0M1} + \Delta \bar{y}_{M1} \cos A_{0M1})\overline{\Delta G_M} - \cos A_{0M1} d\bar{x}_1 + \sin A_{0M1} d\bar{y}_1 = \Delta \bar{x}_{M1} \cos A_{0M1} - \Delta \bar{y}_{M1} \sin A_{0M1} \\ (\Delta \bar{x}_{M2} \sin A_{0M2} + \Delta \bar{y}_{M2} \cos A_{0M2})\overline{\Delta G_M} - \cos A_{0M2} d\bar{x}_2 + \sin A_{0M2} d\bar{y}_2 = \Delta \bar{x}_{M2} \cos A_{0M2} - \Delta \bar{y}_{M2} \sin A_{0M2} \\ \vdots \\ (\Delta \bar{x}_{MK} \sin A_{0MK} + \Delta \bar{y}_{MK} \cos A_{0MK})\overline{\Delta G_M} - \cos A_{0MK} d\bar{x}_K + \sin A_{0MK} d\bar{y}_K = \Delta \bar{x}_{MK} \cos A_{0MK} - \Delta \bar{y}_{MK} \sin A_{0MK} \end{cases}$$

and in the form of a linear system: and $$A \begin{pmatrix} \overline{\Delta G_1} \\ \vdots \\ \overline{\Delta G_M} \\ d\overline{x}_1 \\ d\overline{y}_1 \\ \vdots \\ d\overline{x}_K \\ d\overline{y}_K \end{pmatrix} = \begin{pmatrix} \Delta\overline{x}_{11} \cos A_{011} - \Delta\overline{y}_{11} \sin A_{011} \\ \Delta\overline{x}_{12} \cos A_{012} - \Delta\overline{y}_{12} \sin A_{012} \\ \vdots \\ \Delta\overline{x}_{1K} \cos A_{01K} - \Delta\overline{y}_{1K} \sin A_{01K} \\ \Delta\overline{x}_{21} \cos A_{021} - \Delta\overline{y}_{21} \sin A_{021} \\ \Delta\overline{x}_{22} \cos A_{022} - \Delta\overline{y}_{22} \sin A_{022} \\ \vdots \\ \Delta\overline{x}_{2K} \cos A_{02K} - \Delta\overline{y}_{2K} \sin A_{02K} \\ \vdots \\ \Delta\overline{x}_{M1} \cos A_{0M1} - \Delta\overline{y}_{M1} \sin A_{0M1} \\ \Delta\overline{x}_{M2} \cos A_{0M2} - \Delta\overline{y}_{M2} \sin A_{0M2} \\ \vdots \\ \Delta\overline{x}_{MK} \cos A_{0MK} - \Delta\overline{y}_{MK} \sin A_{0MK} \end{pmatrix}$$

where $$A = (A_G \; A_{xy})$$

$$A_G = \begin{pmatrix} \Delta\overline{x}_{11} \sin A_{011} + \Delta\overline{y}_{11} \cos A_{011} & 0 & 0 & 0 \\ \Delta\overline{x}_{12} \sin A_{012} + \Delta\overline{y}_{12} \cos A_{012} & 0 & 0 & 0 \\ \vdots & \vdots & \vdots & 0 \\ \Delta\overline{x}_{1K} \sin A_{01K} + \Delta\overline{y}_{1K} \cos A_{01K} & 0 & 0 & 0 \\ & \Delta\overline{x}_{21} \sin A_{021} + \Delta\overline{y}_{21} \cos A_{021} & \cdots & 0 \\ & \Delta\overline{x}_{22} \sin A_{022} + \Delta\overline{y}_{22} \cos A_{022} & \cdots & 0 \\ & \vdots & \cdots & \vdots \\ & \Delta\overline{x}_{2K} \sin A_{02K} + \Delta\overline{y}_{2K} \cos A_{02K} & \cdots & 0 \\ & & \ddots & \\ & & & \Delta\overline{x}_{M1} \sin A_{0M1} + \Delta\overline{y}_{M1} \cos A_{0M1} \\ & & & \Delta\overline{x}_{M2} \sin A_{0M2} + \Delta\overline{y}_{M2} \cos A_{0M2} \\ & & & \Delta\overline{x}_{MK} \sin A_{0MK} + \Delta\overline{y}_{MK} \cos A_{0MK} \end{pmatrix}$$

$$A_{xy} = \begin{pmatrix} -\cos A_{011} & \sin A_{011} & 0 & 0 & \cdots & 0 & 0 \\ 0 & 0 & -\cos A_{012} & \sin A_{012} & \cdots & 0 & 0 \\ \vdots & \vdots & \vdots & \vdots & \ddots & \vdots & \vdots \\ 0 & 0 & 0 & 0 & \cdots & -\cos A_{01K} & \sin A_{01K} \\ -\cos A_{021} & \sin A_{021} & 0 & 0 & \cdots & 0 & 0 \\ 0 & 0 & -\cos A_{022} & \sin A_{022} & \cdots & 0 & 0 \\ \vdots & \vdots & \vdots & \vdots & \ddots & \vdots & \vdots \\ 0 & 0 & 0 & 0 & \cdots & -\cos A_{02K} & \sin A_{02K} \\ \vdots & \vdots & \vdots & \vdots & \ddots & \vdots & \vdots \\ -\cos A_{0M1} & \sin A_{0M1} & 0 & 0 & \cdots & 0 & 0 \\ 0 & 0 & -\cos A_{0M2} & \sin A_{0M2} & \cdots & 0 & 0 \\ \vdots & \vdots & \vdots & \vdots & \ddots & \vdots & \vdots \\ 0 & 0 & 0 & 0 & \cdots & -\cos A_{0MK} & \sin A_{0MK} \end{pmatrix}$$

Once the corrections have been determined, the unknown quantities are updated and the elements of the matrices are recalculated, and the system is again solved in order to determine a new correction, as in a Gauss-Newton approach. The iterations are interrupted when the weighted norm (or split so as to separate the comparison of the position and angular variables) of the solution vector drops below a low and consistent threshold (for example 1/10) of the sought performance objective (PGS).

To ascertain a minimum degree of freedom, allowing the system to be solved, the relationship giving the minimum number of objects $K_{3D}$ on which measurements have to be performed from M systems is specified. For measurements in 3D:

$$K_{3D} \geq \frac{M}{2M - 3}$$

$K_{3D}$ being positive, there then results a requirement for at least M=2 systems and, in this case, at least $K_{3D}$=2 objects to be observed.

In the case of 2D measurements, or as a limit of the 2D case when the elevation measurements are low in comparison with the PGS, the numbers of observations and of unknowns are different. For one and the same number of M systems, the availability of a sufficient number of degrees of freedom (DoF≥0) corresponds to a number of objects $K_{2D}$ satisfying:

$$K_{2D} \geq \frac{M}{M-2}$$

i.e., for this situation, a minimum requirement of 3 systems and then at least $K_{2D}$=3 objects to be observed.

It is recalled that the number of degrees of freedom (DoF) is a number obtained by subtracting the number of unknowns or quantities to be estimated from the number of equations available. It is therefore positive or at least zero.

Once the bearings and coordinates have been estimated with a given number of objects, these values may be used so as to be improved in an approach that adds additional measurements on new objects.

Configuration 3.3 (Attitude Estimation)

The previous configurations are aimed at calibrating the vertical axis of rotation of the EMAR of each optronic system, by aligning it with the local vertical of its position (direction of gravity). Or, in other words, they make it possible to position its horizontal plane of rotation in the plane perpendicular to the direction of the plumb line. This new configuration makes it possible to estimate the complete attitude of the EMAR in the local geographical reference frame and therefore to operate without this prior operation of calibrating its axis of rotation.

According to this configuration 3.3, use is made of M similar collaborating optronic systems Sm, for m∈{1, . . . M}, equipped with relative angle measurement means, and their attitudes are calculated in a local geographical reference frame, that is to say the rotations about the three directions of orientation (the 3 Euler angles $\varphi_m$, $\theta_m$, $\psi_m$, the rotation fixing the North corresponding to $\psi_m$), for S1, this amounts to calculating two other directions of orientation, its bearing supplementing the third rotation about the vertical axis. The optronic systems are all equipped with EMARs (EMAR 120, 220, etc.) in the form of 2-axis goniometers that are therefore also able to provide elevations, and collaborate by exchanging measurements on at least 2 separate common objects of the scene (K≥2)

As a scenario, the axes of the EMAR are assumed to be largely positioned at the horizontal; i.e. in practice $|(\varphi_m|<10°$ and $|\theta_m|<10°$.

The additional measurements are measurements:

For the optronic system 1:
of distance $R_{1k}$ between S1 and the object k, k∈ {1, . . . , K},
of elevation $E_{1k}$ on the object k, k∈{2, . . . , K} from S1,
of horizontal relative angle $L_{1k}$ of the line of sight from S1 on the object k, k∈{2, . . . , K}.
of approximate azimuth $A_{01k}$ of the line of sight from S1 on the object k, k∈{1, . . . , K}.

For the optronic system m, m∈{2, . . . , M}:
of distance $R_{mk}$ between Sm and the object k, k∈ {1, . . . , K},
of elevation $E_{mk}$ on the object k, k∈{1, . . . , K} from Sm,
of horizontal relative angle $L_{mk}$ of the line of sight from Sm on the object k, k∈{1, . . . , K}.
of approximate azimuth $A_{0mk}$ of the line of sight from S1 on the object k, k∈{1, . . . , K}.

K objects (k≥2) contribute to the measurements of the M systems.

The sought quantities are:
the M bearings $\overline{G_m}$ (or here $\overline{\psi_m}$) that characterize the orientation of the reference axis of the EMAR (North) in the horizontal plane,
the roll $\overline{\varphi_m}$ and pitch $\overline{\theta_m}$ angles characterizing the elementary rotations (less than 10 degrees) allowing the reference plane of the EMAR to be put into the horizontal plane.
secondarily, the coordinates of the K objects that are able in any case to be evaluated after estimating the previous attitudes on each EMAR.

To perform these additional measurements, the M positions of S1, . . . SM being determined:
the first optronic system Sm furthermore comprises:
an EMED "m06", "m07" able to provide the distances $R_{mk}$ between Sm and the object Ok,
an inclinometer "m09" able to provide the elevations $E_{mk}$ of the object Ok with respect to Sm (unless the elevations are provided by a 2-axis goniometer)
a magnetic compass "m08" able to provide an approximate azimuth $A_{0mk}$ on the object Ok from Sm with a precision of a few degrees.

Each EMAR "120", "220", . . . , "M20" has to orient the 3 axes of the goniometer in the local topographical reference frame. It is assumed that the inclination of the EMAR is reasonably low (rough adjustment limited to a precision of a few degrees (less than 5°)). The system is thus able to initialize an approximate attitude.

In a simple model, the transformation $T_E^G$ passing from the reference frame of the measurements of each EMAR to the geographical reference frame uses 3 rotations (for example with rotations about x, y, z in the form of the Euler angles $(\overline{\varphi_m}, \overline{\theta_m}, \overline{\psi_m})$). It transforms a direction $s_E$ measured in the reference frame (RE) of the EMAR into a direction $s_G$ measured in the local geographical reference frame, with:

$$s_G = T_E^G s_E$$

$$\begin{pmatrix} u_G \\ v_G \\ w_G \end{pmatrix} = T_E^G \begin{pmatrix} u_E \\ v_E \\ w_E \end{pmatrix}$$

The direction $s_G=[u_G, v_G, w_G]$ of the local geographical reference frame is determined simply from the direction $s_E=[u_E; v_E, w_E]$ in the base reference frame of the EMAR from horizontal (L) and vertical (E) readings. For the optronic system Sm, the direction to the object k is written:

$$\begin{pmatrix} u_E \\ v_E \\ w_E \end{pmatrix} = \begin{pmatrix} \cos L_{mk} \cos E_{mk} \\ \sin L_{mk} \cos E_{mk} \\ \sin E_{mk} \end{pmatrix}$$

Measuring the distance $R_{mk}$ from the optronic system m to the object "k", this geographical direction is expressed as a function of the one in the reference frame of the EMAR by:

$$\begin{pmatrix} \bar{x}_k - X_m \\ \bar{y}_k - Y_m \\ \bar{z}_k - Z_m \end{pmatrix} = R_{mk} r_{\bar{\psi}_m} r_{\bar{\theta}_m} r_{\bar{\varphi}_m} \begin{pmatrix} u_E \\ v_E \\ w_E \end{pmatrix}$$

With:

$$\begin{pmatrix} u_G \\ v_G \\ w_G \end{pmatrix} = \frac{1}{R_{mk}} \begin{pmatrix} \bar{x}_k - X_m \\ \bar{y}_k - Y_m \\ \bar{z}_k - Z_m \end{pmatrix}$$

The attitude matrix of the EMAR breaks down into three rotations $r_\psi$, $r_\theta$, $r_\varphi$ about the axes (x,y,z) of the local reference frame. In practice, $\overline{\psi_m}$ corresponds to the bearing of the system Sm that is initialized with the approximate measurement of the compass, and the other two angles $\overline{\varphi_m}$ and $\overline{\theta_m}$ are assumed to be small (less than a few degrees), this making it possible to write:

$$\frac{1}{R_{mk}}\begin{pmatrix} \bar{x}_k - X_m \\ \bar{y}_k - Y_m \\ \bar{z}_k - Z_m \end{pmatrix} = r_{\bar{\psi}_m} \begin{pmatrix} 1 & 0 & \bar{\theta}_m \\ 0 & 1 & 0 \\ -\bar{\theta}_m & 0 & 1 \end{pmatrix}\begin{pmatrix} 1 & 0 & 0 \\ 0 & 1 & -\bar{\varphi}_m \\ 0 & \bar{\varphi}_m & 1 \end{pmatrix}\begin{pmatrix} u_E \\ v_E \\ w_E \end{pmatrix}$$

The angle of rotation iv about z corresponds to the reading with the addition of the zero of the EMAR. By differences in the observation equations of the system Sm to those of the optronic system S1 m∈{2, . . . , M}, there is obtained, for the object k:

$$r_\psi = \begin{pmatrix} \cos\bar{\psi}_m & -\sin\bar{\psi}_m & 0 \\ \sin\bar{\psi}_m & \cos\bar{\psi}_m & 0 \\ 0 & 0 & 1 \end{pmatrix} = \begin{pmatrix} \cos(A_{0mk}+\Delta\bar{\psi}_m) & -\sin(A_{0mk}+\Delta\bar{\psi}_m) & 0 \\ \sin(A_{0mk}+\Delta\bar{\psi}_m) & \cos(A_{0mk}+\Delta\bar{\psi}_m) & 0 \\ 0 & 0 & 1 \end{pmatrix}$$

With, for the right-hand member, the use of the approximate azimuths and of the equivalence between G and ψ:

$$\bar{\psi}_m = L_{mk} + \bar{G}_m = A_{0mk} + \Delta\bar{G}_m = A_{0mk} + \Delta\bar{\psi}_m$$

That is to say, by expanding the expression:

$$R_{mk}\begin{pmatrix} w_G \sin A_{0mk} & w_G \cos A_{0mk} & -u_G \sin A_{0mk} - v_G \cos A_{0mk} \\ -w_G \cos A_{0mk} & w_G \sin A_{0mk} & u_G \cos A_{0mk} - v_G \sin A_{0mk} \\ v_G & -u_G & 0 \end{pmatrix}$$

$$\begin{pmatrix} \bar{\varphi}_m \\ \bar{\theta}_m \\ \Delta\bar{\psi}_m \end{pmatrix} = \begin{pmatrix} \bar{x}_k - X_m \\ \bar{y}_k - Y_m \\ \bar{z}_k - Z_m \end{pmatrix} - R_{mk}\begin{pmatrix} u_G \cos A_{0mk} - v_G \sin A_{0mk} \\ u_G \sin A_{0mk} + v_G \cos A_{0mk} \\ w_G \end{pmatrix}$$

It is possible to expand these expressions in the case of M (M≥2) optronic systems and k objects. Insofar as the coordinates of the objects are unknown, consideration is given, for all of the systems, to the measurements on the particular object k, and we work with the difference to the measurements of a pivot system (S1 for example):

S2 − S1:

$X_2 - X_1 - R_{1k}(u_{1k} \cos A_{01k} - v_{1k} \sin A_{01k}) +$ $R_{2k}(u_{2k} \cos A_{02k} - v_{2k} \sin A_{02k}) - R_{1k} \ w_{1k}\theta_1 \cos A_{01k} -$ $R_{1k} \ w_{1k}\varphi_1 \sin L_{1k0} + R_{2k} \ w_{2k}\theta_2 \cos A_{02k} + R_{2k} \ w_{2k}\varphi_2 \sin A_{02k} =$ $+w_{1k}R_{1k} \sin A_{01k}\varphi_1 + w_{1k}R_{1k} \cos A_{01k}\theta_1 -$ $R_{1k} (u_{1k} \sin A_{01k} + v_{1k} \cos A_{01k})\Delta\psi_1 - w_{2k}R_{2k} \sin A_{02k}\varphi_2 -$ $w_{2k}R_{2k} \cos A_{02k}\theta_2 + R_{2k} (u_{2k} \sin A_{02k} + v_{2k} \cos A_{02k})\Delta\psi_2$ $Y_2 - Y_1 - R_{1k}(u_{1k} \sin A_{01k} + v_{1k} \cos A_{01k}) +$ $R_{2k}(u_{2k} \sin A_{02k} + v_{2k} \cos A_{02k}) - R_{1k} \ w_{1k}\theta_1 \sin A_{01k} +$ $R_{1k} \ w_{1k}\varphi_1 \cos A_{1k0} + R_{2k} \ w_{2k}\theta_2 \sin A_{02k} + R_{2k} \ w_{2k}\varphi_2 \cos A_{02k} =$ $-w_{1k}R_{1k} \cos A_{01k}\varphi_1 + w_{1k}R_{1k} \sin A_{01k}\theta_1 +$ $R_{1k} (u_{1k} \cos A_{01k} - v_{1k} \sin A_{01k})\Delta\psi_1 + w_{2k}R_{2k} \cos A_{02k}\varphi_2 -$ $w_{2k}R_{2k} \sin A_{02k}\theta_2 - R_{2k} (u_{2k} \cos A_{02k} - v_{2k} \sin A_{02k})\Delta\psi_2$ $Z_2 - Z_1 - R_{1k}(-u_{1k}\theta_1 + v_{1k}\varphi_1 + w_{1k}) + R_{2k}(-u_{2k}\theta_2 + v_{2k}\varphi_2 + w_{2k}) =$ $-u_{1k}R_{1k}\theta_1 + u_{2k}R_{2k}\theta_2 + v_{1k}R_{1k}\varphi_1 - v_{2k}R_{2k}\varphi_2$ $\vdots$ Sm − S1:

$X_m - X_1 - R_{1k}(u_{1k} \cos A_{01k} - v_{1k} \sin A_{01k}) +$ $R_{mk}(u_{mk} \cos A_{0mk} - v_{mk} \sin A_{0mk}) - R_{1k} \ w_{1k}\theta_1 \sin A_{01k} +$ $R_{1k} \ w_{1k}\varphi_1 \cos A_{01k} + R_{mk} \ w_{mk}\theta_{m0} \cos A_{0mk} + R_{mk} \ w_{mk}\varphi_m \sin A_{0mk} =$ $+w_{1k}R_{1k} \sin A_{01k}\varphi_1 + w_{1k}R_{1k} \cos A_{01k}\theta_1 -$ $R_{1k} (u_{1k} \sin A_{01k} + v_{1k} \cos A_{01k})\Delta\psi_1 - w_{mk}R_{mk} \sin A_{0mk}\varphi_m -$ $w_{mk}R_{mk} \cos A_{01k}\theta_m + R_{mk} (u_{mk} \sin A_{0mk} + v_{mk} \cos A_{0mk})\Delta\psi_m$ $Y_m - Y_1 - R_{1k}(u_{1k} \sin A_{01k} + v_{1k} \cos A_{01k}) +$ $R_{2k}(u_{2k} \sin A_{0mk} + v_{2k} \cos A_{0mk}) - R_{1k} \ w_{1k}\theta_1 \sin A_{01k} + R_{1k} \ w_{1k}$ $\varphi_1 \cos A_{01k} + R_{mk} \ w_{mk}\theta_m \sin A_{0mk} + R_{mk} \ w_{mk}\varphi_m \cos A_{0mk} =$ $-w_{1k}R_{1k} \cos A_{01k}\varphi_1 + w_{1k}R_{1k} \sin A_{01k}\theta_1 +$ $R_{1k} (u_{1k} \cos A_{01k} - v_{1k} \sin A_{01k})\Delta\psi_1 + w_{mk}R_{mk} \cos A_{0mk}\varphi_2 -$ $w_{mk}R_{mk} \sin A_{0mk}\theta_m - R_{mk} (u_{mk} \cos A_{0mk} - v_{mk} \sin A_{0mk})\Delta\psi_m$ $Z_m - Z_1 - R_{1k}(-u_{1k}\theta_1 + v_{1k}\varphi_{10} + w_{1k}) + R_{mk}(-u_{mk}\theta_m + v_{mk}\varphi_m + w_{mk}) =$ $-u_{1k}R_{1k}\theta_1 + u_{mk}R_{mk}\theta_m + v_{1k}R_{1k}\varphi_1 - v_{mk}R_{mk}\varphi_m$ That is to say a linear system of 3×(M−1)×K equations for the 3×M unknowns of elementary angles ($\overline{\varphi_m}$, $\overline{\theta_m}$, $\overline{\Delta\psi_m}$). Starting from zero values for all of these small angles, a Gauss-Newton algorithm working with the pseudo-inverse matrix, as already outlined, and reiterating in 2 or 3 steps is enough to obtain the performance within the outlined objective range. In each step, the values of the unknown quantities are updated on the basis of the estimated increments.

In this general approach (M optronic systems and K objects), working by differences in position coordinates of the optronic systems, the number of degrees of freedom is fixed at 3×M×(K−1)−3:

the number of observation equations is equal to 3 (M−1)× K, the number of unknowns is equal to 3×M.

In terms of observability, M=2 and K=2 objects are necessary at the least to meet the attitude estimation requirement. We have satisfied the capability of estimating the attitudes of the 2 systems in this configuration. To generally be assured of this, a person skilled in the art may evaluate the performance thereof by way of a Monte-Carlo method, by characterizing for example the attitude estimation quality for the system Sm according to the criterion:

$$\chi_m = \sqrt{(\psi^*_m - \psi_m^\diamond)^2 + (\theta^*_m - \theta_m^\diamond)^2 + (\varphi^*_m - \varphi_m^\diamond)^2}$$

where $\psi^*$ is the estimated value and $\psi\diamond$ the true value. For all of the collaborating systems, the mean of this expression may be used for example as an overall average quality criterion, with:

$$\chi = \frac{1}{M}\sum_{m=1}^{M} \chi_m$$

As indicated above, objects may also be added by selecting them a posteriori, depending on the accessible performance with regard to the targeted performance objective.

The attitude estimation of the optronic systems in a local geographical reference frame is accessible for these systems provided that they share a plurality of spatial directions corresponding to common objects of the scene, and in a manner without requiring a reference direction or position for these objects. Once the attitude has been estimated for these systems, each of them may for example perform an object tracking function:

autonomously, by tracking the angular directions in its own environment and by assigning absolute directions with the previously estimated attitude quality, collaboratively, by estimating the local directions of the objects as above, and then their distance by passive triangulation by associating the image information for the objects detected in the common space of each system.

Configuration 4.1 (Partly without a Positioning Device/M>2)

Consideration is given to a configuration in which M systems S1, S2, . . . , SM collaborate, some of them having an EMPG. This collaboration variant applies if one or more of the collaborating optronic systems does not have positioning means, either because it does not have an EPMG or because it does not have GNSS reception (for example when the system is situated inside a building, or because the GNSS signals are masked or scrambled). It has been indicated that the observability (obtaining of a unique and correct solution) requires at least 2 positions in the network; for M collaborating systems, the maximum permitted number of systems without an EMPG will therefore be M−2.

On the basis of the exchange of observations on objects having coordinates and geographical directions that are all unknown, the optronic systems will determine their bearings and also the geodetic positions of the optronic systems without an EMPG.

Very generally (in contrast, it is enough to swap the indices), it is considered that S1 and SM have correct receptions and that M−2 systems are potentially without a GNSS. The M systems collaborate on K objects.

The first optronic system S1 comprises an EMED or "electronic distance measurement apparatus" of telemeter type with an emitter 106 and a receiver 107, whose direction is aligned with the axis of the imaging device 101, able to provide the distance $R_{1k}$ between S1 and the object Ok. It additionally has:

a magnetic compass 108 or any other means able to provide an approximate azimuth $A_{1k}$ of the object Ok and
  an inclinometer 109 able to provide the elevation $E_{1k}$ of the object Ok with respect to S1.

The last optronic system SM has the same configuration.

And each of the "M−2" other optronic systems Sm m∈ {2, . . . , M−1} has an equivalent configuration, except that it does not have an EMPG or GNSS reception or any other information (map, landmark, etc.) that could allow it to determine its position.

The optronic systems perform their measurements on K objects Ok (k∈{1, . . . , K})

The quantities calculated are the bearings $\overline{G_m}$ of the EMARs of the M systems; the positions $(\overline{X_m}, \overline{Y_m})$ are those of the M−2 systems without an EMPG; the positions $(\overline{x_k}, \overline{y_k})$ are those of the objects on which the measurements are performed.

If it has the necessary observations, one system is able to estimate the bearings of all of the systems and then communicate them to each other system in question. More generally, each system that has observations originating from other systems is able to estimate their bearings.

In the particular configuration in which the collaboration is performed on a minimum number of K=2 objects O1 and O2, we ascertain, using the same expressions and notations as the previous ones (see config 3.2 for example) between approximate azimuth values, EMAR readings and bearing values, the following relationships:

|  | Object O1 | Object O2 |
|---|---|---|
| S1 | $\overline{x}_1 - X_1 = r_{11}\sin(A_{O11} + \overline{AG_1})$ | $\overline{x}_2 - X_1 = r_{12}\sin(A_{O12} + \overline{AG_2})$ |
|  | $\overline{y}_1 - Y_1 = r_{11}\cos(A_{O11} + \overline{AG_1})$ | $\overline{y}_2 - Y_1 = r_{12}\cos(A_{O12} + \overline{AG_2})$ |
| S2 | $\overline{x}_1 - \overline{X}_2 = r_{21}\sin(A_{O21} + \overline{AG_2})$ | $\overline{x}_2 - \overline{X}_2 = r_{22}\sin(A_{O22} + \overline{AG_2})$ |
| (no GPS) | $\overline{y}_1 - \overline{Y}_2 = r_{21}\cos(A_{O21} + \overline{AG_2})$ | $\overline{y}_2 - \overline{Y}_2 = r_{22}\cos(A_{O22} + \overline{AG_2})$ |
| SM = S3 | $\overline{x}_1 - X_M = r_{M1}\sin(A_{OM1} + \overline{AG_M})$ | $\overline{x}_2 - X_M = r_{M2}\sin(A_{OM2} + \overline{AG_M})$ |
|  | $\overline{y}_1 - Y_M = r_{M1}\cos(A_{OM1} + \overline{AG_M})$ | $\overline{y}_2 - Y_M = r_{M2}\cos(A_{OM2} + \overline{AG_M})$ |

The quantity "$r_{mk}$" still represents the projection into the horizontal plane of the distance from the system Sm to the object Ok, performed by way of the measurement of elevation "$E_{mk}$".

More generally, there are, with M systems, 4M equations having 3M unknowns (number of degrees of freedom or DOF=M).

Figure 8:
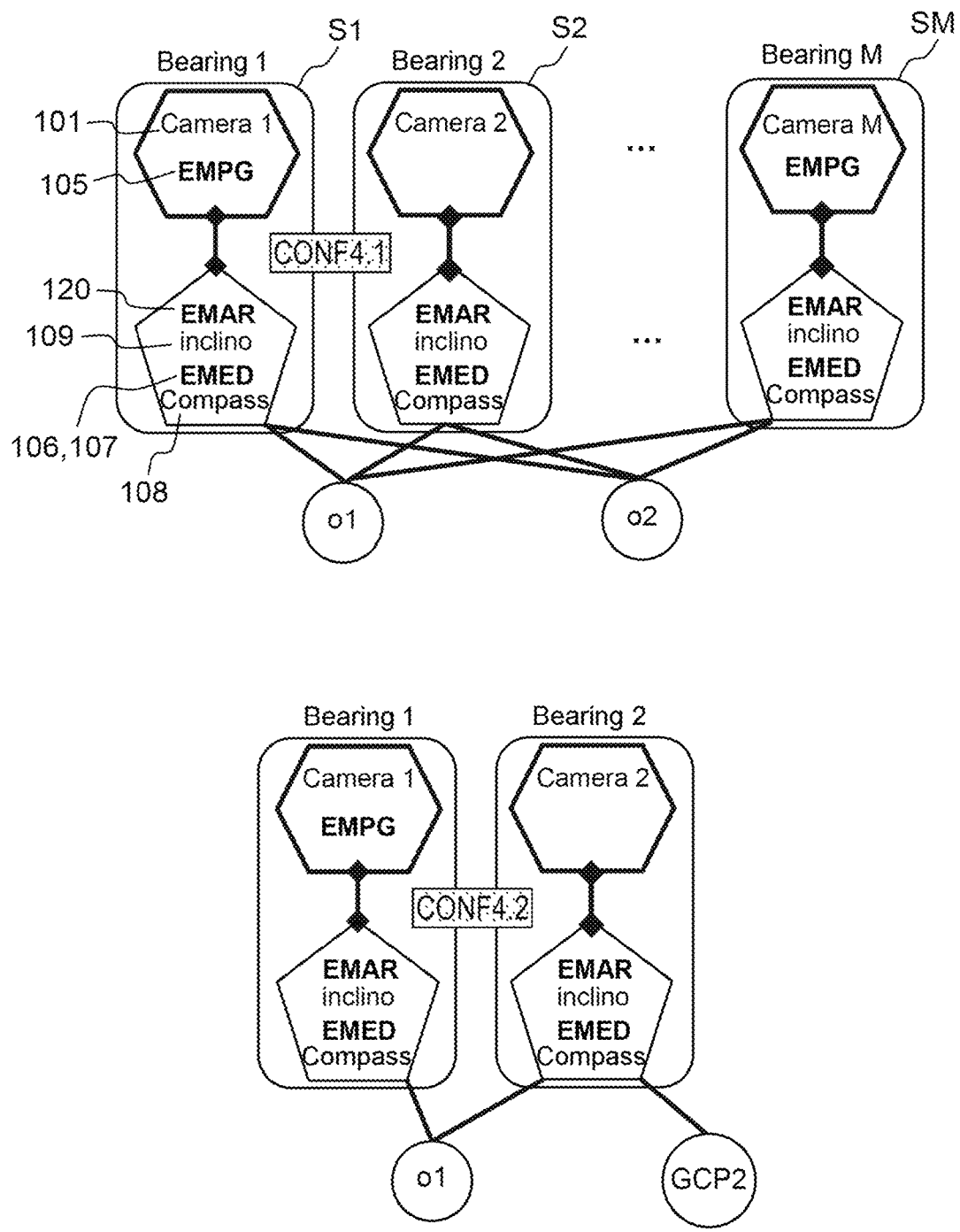

For the example of M=3 systems S1, S2, S3 (config 4.1 of FIG. 8), this corresponds to solving a system of 12 equations having 9 unknowns. In practice, one of the 3 systems might not observe one of the 2 objects; there would then remain 10 observation equations that would still make it possible to estimate the 9 unknowns. This possibility of partial observation of the objects applies of course with more systems and objects, and does so over the majority of the configurations described.

By eliminating the unknown coordinates of the objects, we write:

$$\overline{X_2} - X_1 = r_{11} \sin(A_{011} + \overline{\Delta G_1}) - r_{21} \sin(A_{021} + \overline{\Delta G_2})$$

$$\overline{Y_2} - Y_1 = r_{11} \cos(A_{011} + \overline{\Delta G_1}) - r_{21} \cos(A_{021} + \overline{\Delta G_2})$$

$$\overline{X_2} - X_1 = r_{12} \sin(A_{012} + \overline{\Delta G_1}) - r_{22} \sin(A_{022} + \overline{\Delta G_2})$$

$$\overline{Y_2} - Y_1 = r_{12} \cos(A_{012} + \overline{\Delta G_1}) - r_{22} \cos(A_{022} + \overline{\Delta G_2})$$

$$\vdots$$

$$X_M - \overline{X_2} = r_{21} \sin(A_{021} + \overline{\Delta G_2}) - r_{M1} \sin(A_{0M1} + \overline{\Delta G_M})$$

$$Y_M - \overline{Y_2} = r_{21} \cos(A_{021} + \overline{\Delta G_2}) - r_{M1} \cos(A_{0M1} + \overline{\Delta G_M})$$

$$X_M - \overline{X_2} = r_{22} \sin(A_{022} + \overline{\Delta G_2}) - r_{M2} \sin(A_{0M2} + \overline{\Delta G_M})$$

$$Y_M - \overline{Y_2} = r_{22} \cos(A_{022} + \overline{\Delta G_2}) - r_{M2} \cos(A_{0M2} + \overline{\Delta G_M})$$

In the more general case of M systems, this elimination keeps the number "M" of degrees of freedom, since there are 4M−4 equations for 3M−4 unknowns.

For this example of 3 systems S1, S2, S3, we obtain 8 equations for 5 unknowns.

If it is sought as a priority to extract the bearings, it is possible to eliminate the unknown coordinates of the systems without an EMPG, so as to write, using the 4 first and last equations:

$$X_M - X_1 = r_{11} \sin(A_{011} + \overline{\Delta G_1}) - \overline{r}_{M1} \sin(A_{0M1} + \overline{\Delta G_M})$$

$$X_M - X_1 = r_{12} \sin(A_{012} + \overline{\Delta G_1}) - \overline{r}_{M2} \sin(A_{0M2} + \overline{\Delta G_M})$$

$$Y_M - Y_1 = r_{11} \sin(A_{011} + \overline{\Delta G_1}) - \overline{r}_{M1} \sin(A_{0M1} + \overline{\Delta G_M})$$

$$Y_M - Y_1 = r_{12} \sin(A_{012} + \overline{\Delta G_1}) - \overline{r}_{M2} \sin(A_{0M2} + \overline{\Delta G_M})$$

By limited expansion of the trigonometric expressions, we obtain $\overline{\Delta G_1}$ and $\overline{\Delta G_M}$ by solving the following system:

$$\begin{pmatrix} r_{11} \cos A_{011} & -r_{M1} \cos A_{0M1} \\ r_{12} \cos A_{012} & -r_{M2} \cos A_{0M2} \\ -r_{11} \sin A_{011} & r_{M1} \sin A_{0M1} \\ -r_{12} \sin A_{012} & r_{M2} \sin A_{0M2} \end{pmatrix} \begin{pmatrix} \overline{\Delta G_1} \\ \overline{\Delta G_M} \end{pmatrix} =$$

$$\begin{pmatrix} X_M - X_1 - r_{11} \sin A_{011} + r_{M1} \sin A_{0M1} \\ X_M - X_1 - r_{12} \sin A_{012} + r_{M2} \sin A_{0M2} \\ Y_M - Y_1 - r_{11} \cos A_{011} + r_{M1} \cos A_{0M1} \\ Y_M - Y_1 - r_{12} \cos A_{012} + r_{M2} \cos A_{0M2} \end{pmatrix}$$

The following step uses the bearings estimated with $\overline{\Delta G_1}$ and $\overline{\Delta G_M}$ in order to determine the coordinates $(\overline{x_1}, \overline{y_1})$ and $(\overline{x_2}, \overline{y_2})$ of the objects "o1" and "o2" on the basis of the first and last observation relationships. The redundancy in the observations may be managed either by taking the mean value of each coordinate calculated, or by seeking the optimum values in a least-squares linear approach.

Generally speaking, the final step uses the coordinates obtained for the objects to estimate the "M−2" bearings on the basis of the quantities $\overline{\Delta G_m}$, as well as the M−2 coordinates of the systems $(\overline{X_m}, \overline{Y_m})$ for $m \in \{2, M-1\}$. To this end, we linearize the trigonometric functions in the 4M−4 observation relationships corresponding to the systems without an EMPG. We then iteratively solve a linear system of 4M−4 equations having 3M−6 unknowns (2M−4 for the system positions and M−2 for the bearings).

In this solution configuration, it is recalled that managing the differences in coordinates of the systems is beneficial for the purpose of reducing the error budget, in particular if the EMPGs are working on a GNSS type configuration (deletion of ionospheric and tropospheric propagation error over an area of a few tens of kilometers).

Configuration 4.2 (Partly without a Positioning Device/1 Landmark)

According to another configuration, consideration is given to 2 collaborating systems with the special feature of:
  collecting measurements of the systems S1 and S2 on a common object "Ok" (k=1) of the scene having unknown coordinates $(\overline{x_1}, \overline{y_1}, \overline{z_1})$, lack of GNSS reception on S2 (unknown geodetic coordinates of S2 and therefore unknown position $(\overline{X_2}, \overline{Y_2}, \overline{Z_2})$);
  capability of S2 to perform measurements on a landmark k=2 (or GCP for ground control point) having known coordinates $(x_2, y_2, z_2)$;
  possible prior implementation of a collaboration with other systems working for example with a device similar to configuration 5.1 in order to construct the coordinates of the GCP.

This prior implementation is performed if it is desired to avoid the constraint of knowing the coordinates of a landmark or a reference direction. The preliminary step uses at least one object of the scene having unknown coordinates and a subset of 2 systems on delocalized positions from which GNSS receptions allow use of their EMPG.

It was indicated in the preamble that these North-finding methods based on landmarks had good performance but were constrictive with regard to the management of landmark databases, but also in terms of probability of finding landmarks close to the systems. The step may:
  either utilize 2 optronic systems that are already present over an area in order to construct a landmark from an object having unknown coordinates on which the collaborative measurements are performed, including on natural objects (trees, stationary vehicle),
  or utilize the progression or the movement of an optronic system on the ground, while at the same time lightening the mass and decreasing the implementation time, by utilizing only the portable part of a system (for example utilizing the camera without putting it on a tripod and utilizing a goniometer).

Note: in the case of using a single moving system, this configuration comprises the case of measurements on shared objects from positions along a path, some stations of the system not allowing a measurement with an EMPG (for example without GNSS reception).

To describe this configuration, consideration is given to two systems S1 and S2 collaborating by way of measurements on:
  a common object k=1 having unknown coordinates,
  a constructed GCP, partially visible from the single system S2.

The two optronic systems then perform observations on common object no. 1 of the scene, and S2 adds to it its observations on the object GCP (ground control point) (k=2).

The additional measurements are measurements:
  of distance $R_{11}$ between S1 and the object 1 and $R_{2k}$ between S2 and the object $k \in \{1,2\}$,
  of elevation $E_{2k}$ between S2 and the object k,
  of approximate azimuth $A_{011}$ of S1 on the object O1,
  of approximate azimuths $A_{021}$ and $A_{022}$ of S2 on the objects O1 and O2.

Two objects are intended for the observations; only object 1 is subjected to measurement by the two systems; the GCP is observed only by S2.

The quantities to be estimated as a priority are the bearings of S1 and of S2 and the geodetic coordinates of S2, and secondarily the coordinates of object no. 1 and the performance with regard to these quantities.

To perform the additional measurements, the two determined positions being those of S1 and S2, and with K=2:

The first optronic system S1 furthermore comprises:
an EMED 106, 107 able to provide the distance $R_{11}$ between S1 and the object O1,
a magnetic compass 108 or any other means allowing it to ascertain an approximate orientation of the azimuth of the object O1 seen from S1.

And the second optronic system S2 furthermore comprises:
an EMED of telemeter type 206 and 207 whose direction is aligned with the axis of the acquisition device of S2 201, able to provide the distance $R_{21}$ between S2 and the object O1, and the distance $R_{22}$ between S2 and the object O2 (GCP),
an inclinometer 209 able to provide the elevations $E_{2k}$ of the objects k e{1,2} with respect to S2.
a magnetic compass 208 making it possible to ascertain an approximate orientation of the azimuth of the object Ok seen from S2.

one object Ok (k=1) is observed from S1 and two objects (k=1 & 2) are observed from S2. Object O1 has known coordinates (landmarks or "GCPs")
the quantities to be estimated are the bearings of the two systems and the geodetic position of S2.

The observations are distributed as follows.

|  | Object 1 (common) | Object 2 (GCP visible to S2) |
|---|---|---|
| S1 | $\bar{x}_1 - X_1 = R_{11} \sin(L_{11} + \bar{G}_1)\cos E_{11}$<br>$\bar{y}_1 - Y_1 = R_{11} \cos(L_{11} + \bar{G}_1)\cos E_{11}$<br>$\bar{z}_1 - Z_1 = R_{11} \sin E_{11}$ | — <br>(invisible from S1) |
| S2<br>(GPS<br>denied) | $\bar{x}_1 - \bar{X}_2 = R_{21} \sin(L_{21} + \bar{G}_2)\cos E_{21}$<br>$\bar{y}_1 - \bar{Y}_2 = R_{21} \cos(L_{21} + \bar{G}_2)\cos E_{21}$<br>$\bar{z}_1 - \bar{Z}_2 = R_{21} \sin E_{21}$ | $x_2 - \bar{X}_2 = R_{22} \sin(L_{22} + \bar{G}_2)\cos E_{22}$<br>$y_2 - \bar{Y}_2 = R_{22} \cos(L_{22} + \bar{G}_2)\cos E_{22}$<br>$z_2 - \bar{Z}_2 = R_{22} \sin E_{22}$ |

NB: if there is a reference direction seen from S2 rather than a landmark, the observation equations are modified to read:

$$x_2 - \bar{X}_2 = k u_{22}$$

$$y_2 - \bar{Y}_2 = k v_{22}$$

$$z_2 - \bar{Z}_2 = k w_{22}$$

There is therefore a total of 9 equations having 8 unknowns. By limiting ourselves to planimetric information or after rectification of the measurements, there are 6 equations for 6 unknowns. These equations may be linearized provided that the approximate values $G_{01}$ and $G_{02}$ of $G_1$ and $G_2$, respectively, are available to within a few degrees (a mediocre-quality magnetic compass is sufficient). Once the coordinates of S2 have also been determined, S2, knowing its bearing, is able to autonomously locate other objects present in its environment on the basis of these EMAR and EMED measurements.

By projecting the distances into the plane by way of the elevations of the lines of sight and with the same notations "r" as the previous ones, we obtain:

$$\begin{pmatrix} r_{11} \cos A_{011} & r_{22} \cos A_{022} - r_{21} \cos A_{021} \\ -r_{11} \sin A_{011} & r_{21} \sin A_{021} - r_{21} \sin A_{021} \end{pmatrix} \begin{pmatrix} \Delta \bar{G}_1 \\ \Delta \bar{G}_2 \end{pmatrix} =$$

$$\begin{pmatrix} x_2 - X_1 - r_{11} \sin A_{011} + r_{21} \sin A_{021} - r_{22} \sin A_{022} \\ y_2 - Y_1 - r_{11} \cos A_{011} + r_{21} \cos A_{021} - r_{22} \cos A_{022} \end{pmatrix}$$

where $$A_{0mk} = L_{mk} + G_{0m}$$

$$\bar{G}_m = G_{0m} + \Delta \bar{G}_m$$

The system has a solution for the 2 bearings provided that the optronic systems configuration in relation to the objects satisfies:

$$r_{22} \sin(A_{022} - A_{011}) \neq r_{21} \sin(A_{021} - A_{011})$$

Once the bearing G2 has been obtained, the position of the optronic system S2 is easily obtained by using the observation equations of S2 on the GCP.

The configuration may be available with more systems, including a plurality without GPS reception. This elementary configuration illustrates the benefit of a collaboration with knowledge of reference coordinates (here a GOP); it is noted that S1 alone is not able to determine its North. Likewise, S2 alone is not able to find its North and its position. Their collaboration makes it possible simultaneously to determine the bearings G1 and G2 on the two optronic systems, and secondarily the coordinates of the object O1 if this information is beneficial. In the complete absence of an EMPG, complete absence of GPS on the network, 2 GCPs will be necessary to orient all of the information and estimate, with as many common objects having unknown coordinates that are observed as necessary, the bearings and positions of all of the systems.

Configuration 5.1 (with "Degraded" EMARs)

According to this configuration, consideration is given to 2 collaborating systems without high-performance relative angle measurement devices. To clarify expectations, consideration will be given to a collaboration between portable systems each using an EMAR of magnetic compass type. The azimuth is measured by way of a magnetic compass that generally has an orientation capability that:

in absolute terms is situated at an order of magnitude lower than the PGS (typically of the class of the degree vs the milliradian sought for the PGS), in relative terms is able to achieve a few milliradians (around 1 to 3 mrad) provided that the compass has undergone a calibration procedure for its internal components (estimation of the biases, scale factors, non-orthogonalities of axes for its magnetometers and accelerometers) and is moving in a magnetic environment that is not polluted or disrupted by sources of electromagnetic radiation.

The elevation may be measured by an inclinometer that uses accelerometers with performances of the class of the mrad, and achieves this even with MEMS sensors.

The magnetic compass, installed in the optronic system and aligned with its LoS, allows an absolute measurement of the direction of orientation observed by the system, with reference to the direction of the local magnetic field. The angle between the magnetic field and the local geographical North, called magnetic declination and illustrated in FIG. 1, may be evaluated on the basis of geographical maps or of a global model. The best-known global models for describing the Earth's magnetic field are the World Magnetic Model (WMM) and the International Geomagnetic Reference Field (IGRF). The benefit of these lies in the ease of implementation, the automatic access to the declination value on the basis of the EMPG position, and the temporal extrapolation thereof on the basis of the current date. The quality with which the declination is evaluated by way of these models is of the order of 0.5° at latitudes close to the equator, with worsening as the magnetic poles are moved toward and with age or the difference between the current date and the date when the model was updated (new models are updated and made available every 5 years). Moreover, phenomena whose time period is shorter than that of the updating of the models or whose spatial period is much finer than their resolution cell cause an effect on the declination that is not able to be recorded though the parameters of the model. Thus, in spite of access to a model, it remains desirable to access a capability that makes it possible to better characterize the local declination. An error in its value is reflected directly in an angular bias in the bearing determination.

The magnetic compass allows, besides its absolute measurement, a relative measurement of orientation with a quality that may reach a few mrd in an unpolluted magnetic environment and after calibration of the internal parameters aimed in particular at estimating the biases and scale factors of the components internal to the compass (accelerometers and magnetometers). The performance of an azimuth measurement difference by a compass is automatically better that its absolute measurement performance, since:
  it eliminates the error in the declination knowledge,
  it reduces measurement defects inherent to bias compasses,
  it removes alignment bias defects (in the form of small angular values characterizing its installation on the system) from the axes of the compass with axes linked to the structure of the system; here the reference axis of the LoS of the optronic system for example.

In practice, using $A_{mk}$ to denote the geographical azimuth at which Sm sees the object "k", "$L_{mk}$" to denote the raw magnetic measurement, "$\overline{B_m}$" to denote the addition of the installation and reading biases and "$\overline{D_m}$" to denote the local declination at the location and at the date of measurement, we ascertain a relationship in the form:

$$A_{mk}=L_{mk}-\overline{B_m}+\overline{D_m}$$

That is to say an EMAR angular reading-azimuth relationship similar to the previous ones, by introducing the (pseudo)bearing "$\overline{G_m}$":

$$\overline{G_m}=\overline{D_m}-\overline{B_m}$$

$$A_{mk}=L_{mk}+\overline{G_m}$$

In practice, the installation bias and the declination may be approximately known, thus separating the approximate contribution (indexed "0") from the one that is unknown, with:

$$B_m=B_{0m}+\overline{\Delta B_m}; D_m=D_{0m}+\overline{\Delta D_m}$$

The compass measurement biases and the installation biases may be respectively reduced after the calibration of the compass on the measurement site and by a factory procedure of comparing a measurement with reference information. After these 2 operations, the bias residual in the angular measurement may be considered to be negligible in comparison with the declination value and the measurement noise of the compass.

Figure 9:
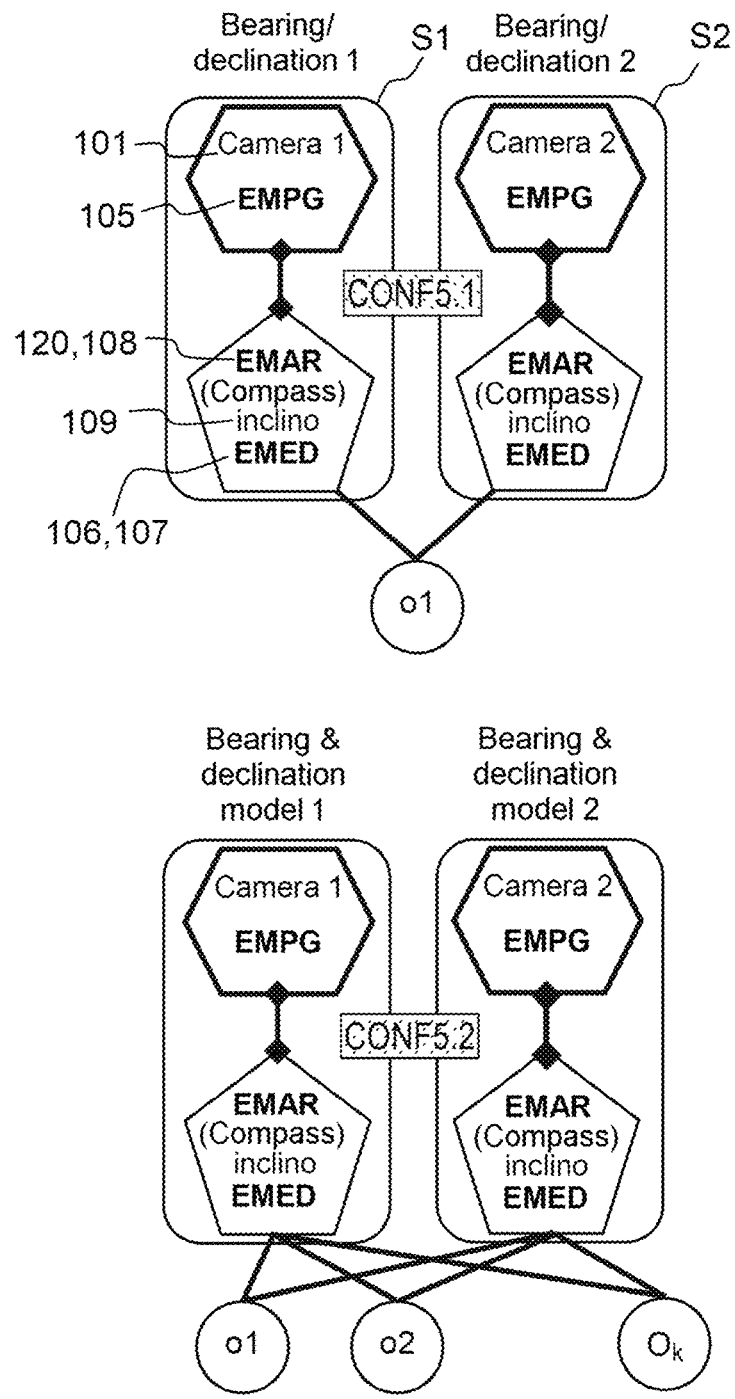

For this configuration, illustrated in FIG. 9, the estimation of the bearing of the EMAR is reflected by the determination of the angle that essentially incorporates the local declination value and the reading and installation offset residuals of the compass.

Thus, according to this configuration, two systems collaborate with the particular feature that the systems S1 and S2 use an EMAR 220 of compass type. The reduction in size and mass of this type of apparatus makes the system more portable and easier to move. To obtain the bearings on each of the two systems, the tandem S1-S2 will perform measurements on an object Ok (with k=K=1). The additional measurements are measurements:
  from S1
    of distance $R_{1k}$ on the object Ok,
    of elevation $E_{1k}$ between S1 and the object Ok,
    of magnetic azimuth $L_{1k}$ of the EMAR (magnetic compass) when the optronic system S1 is pointing at the object Ok,
  from S2
    of distance $R_{2k}$ on the object Ok,
    of elevation $E_{2k}$ between S2 and the object Ok,
    of magnetic azimuth $L_{2k}$ on the EMAR of S2 when its optronic system is pointing at the object Ok.

One object (k=K=1) contributes to the measurements of the two systems.

The quantities calculated are the bearings $\overline{G_1}$ and $\overline{G_2}$ of the EMARs of S1 and S2, incorporating the local declination correction. If necessary, the coordinates of the objects are easily deduced from this, as are the precisions with regard to these quantities.

To perform the additional measurements, the two determined positions being those of S1 and S2, and with one object O1 (K=1):
  The first optronic system S1 furthermore comprises an EMED or "electronic distance measurement apparatus" of telemeter type 106 and 107, whose direction is aligned with the axis of the acquisition device, able to provide the distance $R_{1k}$ between S1 and the object Ok.
  And the second optronic system S2 furthermore comprises:
    an EMED or "electronic distance measurement apparatus" of telemeter type 206 and 207, whose direction is aligned with the axis of the acquisition device, able to provide the distance $R_{2k}$ between S2 and the object Ok,
    an inclinometer 209 able to provide the elevation $E_{2k}$ of the object OK (k=1) with respect to S2,
    an EMAR that is itself also degraded, 220 able to provide the relative angles between S2 and the object Ok using its magnetic compass.

The quantities estimated are the bearings of the 2 systems and the coordinates of the object.

There are thus 2 systems of portable camera type with magnetic compasses accessing only knowledge of their magnetic declination, which may be of mediocre quality with respect to the sought performance, such as that obtained at a high latitude with reference global models such as for example WMM or IRGF. The systems are able to measure:
geodetic positions of the two systems (with EMPGs of GNSS receiver type), measurements of each optronic system on a common object, consisting of:
  the distance from the optronic system $m \in \{1,2\}$ to the object $k=1$,
  the elevation of the line of sight $E_{m1}$ on the object,
  the magnetic azimuth measurement $L_{m1}$ on the object.

A single common object having unknown coordinates is used.

The quantities to be estimated are the (pseudo)bearings of the compasses for estimating the azimuths on the object from the two systems, and the position of the object.

The observation equations are as follows, in which equations the geographic azimuth $A_{mk}$ is deduced from the measurement of the compass, the alignment bias and the declination being approximately known and needing to be refined:

| | Object 1 (common) |
|---|---|
| S1 | $\bar{x}_1 - X_1 = R_{11} \sin \bar{A}_{11} \cos E_{11}$ |
| | $\bar{y}_1 - Y_1 = R_{11} \cos \bar{A}_{11} \cos E_{11}$ |
| | $\bar{z}_1 - Z_1 = R_{11} \sin E_{11}$ |
| S2 | $\bar{x}_1 - \bar{X}_2 = R_{21} \sin \bar{A}_{21} \cos E_{21}$ |
| | $\bar{y}_1 - \bar{Y}_2 = R_{21} \cos \bar{A}_{21} \cos E_{21}$ |
| | $\bar{z}_1 - \bar{Z}_2 = R_{21} \sin E_{21}$ |

The configuration makes it possible to determine:
The (pseudo)bearing incorporating local magnetic declination $\overline{D_m}$ and installation and measurement bias of the compass for each system, a precise collaborative location of the object by way of the elevation $E_{m1}$, of the distance $R_{m1}$ and of the position of the system Sm. This location is obtained for example in a geographical reference frame, with its origin on one of the 2 systems (example S1),
The topographical position "T1" (respectively T2) of S1 (respectively S2) is obtained by converting the geodetic coordinates of the EMPG into geocentric coordinates and then into topographical coordinates in a topographical reference frame whose origin is at S2 (respectively S1).

The geographical azimuths (True North) $A_{m1}$ of the object 1 seen from each system $S_m$ may be obtained from the coordinates of the systems and from the location of the object Ok by rectifying these values, as already indicated.

The (pseudo)bearing incorporating local magnetic declination "$\overline{D_m}$" and installation and measurement offsets of the compass "$\overline{B_m}$" are deduced on the two optronic systems by way of the magnetic measurements $L_{m1}$.

Thus, besides the position of the object with a performance in the class of a meter, the two optronic systems have pseudo-bearing values for their compasses for the purpose of performing other approximate locations in their vicinity. The bearing value thus obtained, which incorporates the possible installation bias of the compass in terms of azimuth in relation to the reference axes of the system, makes it possible to compensate this alignment position so as to rectify the future measurements of the compass.

The azimuth corrections and the estimated position of the object may be obtained simultaneously simply by iteratively solving the following linear system.

$$\begin{pmatrix} 1 & 0 & 0 & -R_{11} \cos E_{11} \cos A_{011} & 0 \\ 0 & 1 & 0 & R_{11} \cos E_{11} \sin A_{011} & 0 \\ 0 & 0 & 1 & 0 & 0 \\ 1 & 0 & 0 & 0 & -R_{21} \cos E_{21} \cos A_{021} \\ 0 & 1 & 0 & 0 & R_{21} \cos E_{21} \sin A_{021} \\ 0 & 0 & 1 & 0 & 0 \end{pmatrix} \begin{pmatrix} \bar{x}_1 \\ \bar{y}_1 \\ \bar{z}_1 \\ \overline{\Delta G_1} \\ \overline{\Delta G_2} \end{pmatrix} =$$

$$\begin{pmatrix} X_1 + R_{11} \cos E_{11} \sin A_{011} \\ Y_1 + R_{11} \cos E_{11} \cos A_{011} \\ Z_1 + R_{11} \sin E_{11} \\ X_2 + R_{21} \cos E_{21} \sin A_{021} \\ Y_2 + R_{21} \cos E_{21} \cos A_{021} \\ Z_2 + R_{21} \sin E_{021} \end{pmatrix}$$

One strength of this collaboration lies in the ability to estimate an overall bias in an environment incorporating in particular high-amplitude magnetic offsets, and doing so without any geographical direction or position reference knowledge.

Once the (pseudo)bearings "$\overline{G_m}$" have been estimated at the same time as the geographical location of the object ($\bar{x}_k$, $\bar{y}_k$, $\bar{z}_k$), the (pseudo)bearings of the compasses make it possible to better locate another object of the environment from a single system Sm prior to any collaboration of the systems.

The location of the object estimated in the collaborative context may be of excellent quality (typically the class of a meter), thereby also making it possible to utilize this configuration for the purpose of producing landmarks able to supply functions on other systems or other conditions of use, such as for configuration 4.2. To give a closer insight, the system is solved and a location performance evaluation is carried out using a Monte-Carlo approach. A quality with regard to the position of the object of better than 2 m to 1 sigma is obtained in the following conditions:
With measurements having qualities at 1 sigma for the EMPG of 2 m, for the EMED of 2.2 m, for the elevation measurement of 1.25 mrd and for azimuth knowledge of 15 mrd.
With an object situated within a distance range at the base of the two systems ranging between 0.5 and 10 km and for distance base ratios varying between 0.5 and 2.

This approach also indicates the parallactic angle that gives the best performance, thereby making it possible to select a preferred zone for the choice of the object on which the systems are all interested in sharing their measurements. For the above configurations, it is situated for example slightly above 60°.

The errors in the coordinates of the object (bias and covariance) may be obtained by error propagation with a technique similar to the one described above.

The object is then characterized by its position and by the associated error, and it may be called a GCP. Its coordinates ($\bar{x}_k$, $\bar{y}_k$, $\bar{z}_k$) in RGL (local geographical reference frame) may be converted, if necessary, into geodetic coordinates on a specific geodetic system (or datum) (for example WGS84).

The approach may be generalized easily with a number of cameras greater than "M=2". Moreover, it is noted that a single camera could be used by moving it over the terrain.

The geodetic coordinates of the object that are then available are able to be exploited from these same or other systems, at least one of which has to estimate its bearing.

Repeating this operation on a plurality of objects situated in different directions makes it possible to more accurately calibrate the EMAR of each optronic system; this is done by estimating a model transforming the magnetic azimuth measurement into a geographic azimuth, without being limited to a bias model as described above. This use is described hereinafter.

Configuration 5.2 (with "Degraded" EMARs/a Plurality of Objects)

In a configuration in which a number "M" of systems collaborate, it is possible to generalize the above approach on the basis of observations on a plurality of objects situated in different directions. It is then possible to more accurately calibrate the magnetic compass constituting the EMAR of each optronic system by estimating a calibration model for the magnetic compass, describing the transformation between magnetic and geographic azimuth measurements, which is more complex than the one limited to a bias as described above. For example, it is possible to incorporate effects of strong and weak disturbances of the magnetic field ("hard" and "soft" iron) into the model and transform the raw compass reading at the geographic azimuth with the form:

$$A_{mk} = L_{mk} + \overline{\alpha_m} + \overline{\beta_m} \sin L_{mk} + \overline{\gamma_m} \cos L_{mk} + \overline{\delta_m} \sin 2L_{mk} + \overline{\epsilon_m} \cos 2L_{mk}$$

For more details see "The American Practical Navigator" Chapter 6.

In terms of degrees of freedom (DoF), such a model used with M optronic systems collaborating on K objects provides 6K observations for 5M+3K unknowns. The resulting DoF, which is necessarily positive in order to promise a solution, is established at 3K−5M. It then requires the collaboration of M sensors (M≥2) on K objects, with K≥⌈5M/3⌉ (where ⌈x⌉ is the integer part in excess corresponding to the value of the smallest integer greater than x).

For a configuration having 2 systems, K=4 objects are then necessary to estimate the (pseudo)bearing models of each system.

This ends the description of the configurations proposed, without however limiting the collaborative North-finding function to just the configurations and to just the specific features outlined. As indicated, it is notably possible to collaborate in configurations including both absences of EMPGs on some systems, but also absences of EMEDs for example. With the objective being to ascertain a sufficient number of observations, for this purpose we act on the number of systems, the number of objects on which the measurements are performed and the number of systems sharing measurements on a given object; this is done for the purpose of ascertaining sufficient observability (DoF≥0) in order to estimate the quantities of interest.

These configurations are also available working with one or more omnidirectional (OMNI) optronic sensors. The particular feature of these sensors is that of offering panoramic vision, which makes it possible to utilize the optronic image as EMAR without another hardware device for measuring relative direction. Its particular feature is that of offering simultaneous broad vision of the scene.

When Sm has an OMNI optronic sensor (of fisheye, catadioptric or cylindrical type, for example) the azimuth $A_{mk}$ on an object "$O_k$" having image coordinates ($p_{mk}$, $q_{mk}$) is expressed according to:

$$A_{mk} = L_{mk} + \overline{G_m}$$

$$L_{mk} = \arctan(q_{mk} - q_{m0}, p_{mk} - p_{m0})$$

In this expression, $\overline{G_m}$ again denotes the bearing, that is to say the angle between the geographic North and the axis collinear to the rows of the imager; ($p_{m0}$, $q_{m0}$) are the image coordinates of the main point of symmetry (optical axis of the sensor) on the detector, and $L_{mk}$ corresponds to the reading of the EMAR in a more traditional configuration.

In the image reference frame of the system Sm with the origin at the main point of symmetry (PPS), and with the x- and y-axes collinear to the rows "q" and columns "p" of the image and the z-axis to the optical axis, the direction of a point "Ok" is given according to:

$$u_{mk} = \begin{pmatrix} \cos A_{mk} \cos E_{mk} \\ \sin A_{mk} \cos E_{mk} \\ \sin E_{mk} \end{pmatrix}$$

We deduce from this the elevation $E_{mk}$, as follows:
1) in the simplest case, when the OMNI sensor has undergone positioning at the horizontal of the detector plane with a spirit level for example, the elevation $E_{mk}$ is deduced from a law specific to the architecture of the sensor (depending on the combination and optical specific feature) rotational symmetry determines the path of the photons to the detector with a law that, for the elevation, depends only on the position of the pixel at the center of symmetry of coordinates ($p_{m0}$,$q_{m0}$). The parametric dependency of the function "ζ" depends more intimately on the architecture of the system and its parameters may be estimated in a pre-calibration factory phase:

$$E_{mk} = \zeta(p_{mk}, q_{mk}) = \zeta(\rho_{mk})$$

$$\rho_{mk} = \sqrt{(p_{mk} - p_{m0})^2 + (q_{mk} - q_{m0})^2}$$

2) in a more complex case, the elevation $E_{1k}$ is deduced by evaluating, in addition to the bearing, the roll and pitch angles characterizing the deviation of the axis of the detector from the local vertical. The attitude or the orientation of the sensor in the local geographical reference frame is then estimated by a rotation matrix by way of observations (via a passive version of configuration 3.3).

It may be assumed that the OMNI sensor does not generally have an EMED for evaluating its distance to a particular point of the scene. This specific feature may make finding a bearing more complex, since accessing an approximate position of an object for the purpose of linearizing the observation equations is no longer direct. The information on distances to the objects may therefore remain unknowns to be eliminated in the observations.

The case of using OMNI images potentially makes it possible to ascertain a very large number of objects (to clarify expectations from around ten to 1/10 of the number of common pixels able to be identified in the common portions of the images), leading to common measurements of spatial directions. Processing this volume of information is preferably carried out completely automatically by working as follows, with a description limited to 2 optronic systems S1 and S2, each equipped with an OMNI sensor:
  acquiring an image using the sensors of S1 and S2 and transferring the image from S2 to S1 along with the position and the attitude or the approximate orientation of S2,
  on S1, extracting image information or descriptors (for example point-type forms or/and segments, etc.) from the images of S2 and S1, spatial filtering of descriptors having low discrimination potential in order to eliminate descriptors that are too spatially close or have a poor radiometric characteristic from the image of S2, matching the image descriptors, utilizing:
  the approximate poses (position of the sensors and approximate orientations of the images via the compasses),
  use of a robust RANSAC algorithm to determine "good matches" (cf. below) between the information extracted from the images of the two sensors, Random Sample Consensus: A Paradigm for Model Fitting with Applications to Image Analysis and Automated Cartography Fischler & Bolles (1981).

In this way, we ascertain a large number of matches, pairs of coordinates $MEC_k = (\{p_{1k}, q_{1k}\}, \{p_{2k}, q_{2k}\})$, $k = \{1, \ldots, K\}$ and therefore of objects that are automatically paired.

Calculating the definitive attitudes of the 2 optronic systems, and if necessary the coordinates of the objects, using the "good matches" that are established.

The use of OMNI sensors and the large number of objects available in the images thus allows:
  complete automation of the method, more object searches, system pointing or specific interventions for taking measurements.
  robust automatic searching for pairing between images; the term "inlier" is used to indicate a "good match" between descriptors of the 2 images corresponding effectively to one and the same detail or object of the scene, and "outlier" is used to indicate a match between pixels that does not correspond to the same detail or object of the scene.
  an increase in the number of observations used, and therefore an improvement in the estimation of $\overline{G_m}$ or other quantities to be estimated.

In this approach, seeking matches may be accelerated from a calculation time point of view by using the epipolar geometry of the 2 OMNI sensors. This property of the geometry of the images indicates that an object Ok seen in the direction $u_{2k}$ from the sensor of S2 is located along an epipolar curve in the plane of the image from the sensor of S1. In the case of OMNI sensors, this curve is not a straight line. For more details see for example: "Numerical estimation of epipolar curves for omnidirectional sensors" (2005).

To this end, it is possible to rectify an image thumbnail from the sensor of S2 around the position of a descriptor by resampling it in the geometry of the image from the sensor of S1. The resampled thumbnail is then moved along the epipolar curve in order to establish a correlation score between the levels of the images.

This approach thus limits the size of the search space for a punctiform object of the image from the sensor S2 to a size in the image from S1 (rather than a 2D search in the entire image). The generalization to 3 images from 3 sensors limits the search to one point in the image (in practice a small area around the point, given the errors in the values of the internal parameters of the sensor and the external position and attitude parameters for the 2 images).

As an alternative, if we ascertain, on an optronic system Sm:
  its geographical position with its EMPG,
  its approximate orientation (with a compass) giving a "$G_{Om}$",
  a ground scenario or a terrain model (DTM),
it becomes possible to evaluate an approximate geographical position of an object situated on the ground on the basis of its image position and of the model indicated above giving the direction of a pixel. This is done using a ray-tracing technique.

On the basis of its image position, the optronic system positions the object along a direction that intersects the surface provided by the terrain model in the vicinity of the ground. Provided that the terrain information is utilized, it restricts the method to the use of objects on the ground, more precisely objects situated on the envelope of the DTM representing the terrain.

In the context of a self-collaborative capability, the system, which exploits its movement to acquire measurements, may, in the context of the capabilities described:

When it is a system with a portable camera having an EMAR in the form of a magnetic compass 108:
  Locate an object using measurements acquired with an EMPG, an EMED and its angular measurements by way of inclinometers and of its uncalibrated approximated compass,
  Calibrate its compass either in the form of an estimation of an offset, with measurements on a single object (config 5.1), or in the form of a more complex model if a plurality of objects are subjected to acquisitions between the movements (config 5.2)
  Directly locate, from its position, other objects with its EMAR calibrated in its last position. This type of calibration requires the EMAR to be recalibrated for any new movement so as to take into account the variability of the electromagnetic environment.
  To exploit the measurements previously performed and stored upon a new stationing over an area, it will therefore be expedient to acquire objects over areas having the best possibility of visibility index.

When it is a portable system on a tripod with a goniometer, it will be beneficial:
  to utilize only the optronic sensor portion 100 to acquire measurements, so as to shorten the implementation time for the acquisitions.
  The measured information is then stored in 100 upon the movement. The magnetic compass 108 of 100 may be calibrated, as indicated above, in order to facilitate if necessary the reacquisition of the objects upon subsequent stationing.
  All of the information is then utilized when the system is completely installed to determine the bearing of the EMAR 120.

The method also applies to the case where one or more of the collaborating systems S2, ..., Sm are mobile, S1 being assumed to be fixed, provided that all of the measurements are temporally synchronized. The above configurations are then available in the same way.

The temporal processing of the information from a single mobile system "Sm" collaborating at "T" times with S1 is equivalent, on the plane of the accrued information, to processing quasi-instantaneous measurements from "T" systems that are identical to "Sm" but spatially distributed.

This description gives a framework for many other configurations that may be used. For all of these collaboration configurations, the location (or geographical coordinates) of the sighted objects may furthermore be determined:
  by simultaneously solving the angular unknowns (bearing/attitude) and those corresponding to the unknown coordinates of the objects,
  by determining the coordinates of the objects after having oriented the systems in this case, the coordinates of the objects are first of all eliminated from the observations in the first estimation phase, and then evaluated on the basis of the angular references using conventional triangulation or trilateration routines, by determining the orientation on the systems after having first of all estimated the coordinates of the objects (landmark construction and then North finding).

After these calibration steps (North finding, positions of the objects or of the optronic systems), a function of locating distant objects, consisting in determining their geographical positions and the quality of these positions, may be performed locally by the collaborative system on the basis of measurements acquired from a single optronic system or by a plurality of optronic systems in the majority of the configurations described.

Generally speaking, the predicted performance (PGT) with regard to the estimated quantities may be determined systematically in a theoretical manner. It generally depends on the number of collaborating systems, on the type (or nature) of the measurements implemented, on the number of objects used, on the geometrical configuration or on the relative position of the system and object entities. These calculations may be carried out by:

Analyzing the mean and the variance or covariance propagation, in this approach:
the observation equations with respect to the quantities to be estimated and to the measurements are linearized and differentiated,
the vector of the elementary quantities of interest differentials is isolated from the measurement differentials,
the two members are multiplied by the conjugated vectors and the expectation is taken,
the covariance in the quantities is obtained as a function of the covariance in the measurements; the Jacobian matrices involved on either side encapsulating the geometric dilution of the measurements;

For detail, mean-variance analysis (MVA) utilizes the expansion of the observation equations around the true value of the unknowns. If the vector of the parameter values is denoted $\Theta$ and the vector of the measurements performed by the system is denoted M, the differentiation of the observation equations $f(\Theta, M)=0$ may generically be written as:

$$J_\Theta \cdot d\overline{\Theta} = -J_M \cdot dM$$

$$J_\Theta = \frac{\partial f(\Theta, M)}{\partial \Theta}; J_M = \frac{\partial f(\Theta, M)}{\partial M}$$

With $J_p$ the Jacobian matrix of the observation equations in relation to the parameters and $J_M$ with respect to the measurements.

The bias in the parameters is obtained using the bias vector of the measurement devices, using:

$$\overline{\delta\Theta} = -(J_\Theta^T J_\Theta)^{-1} \cdot J_\Theta^T J_m \cdot \delta M$$

A measurement bias "$\delta M$" thus propagates into a bias in the parameters "$\overline{\delta\Theta}$". In the absence of a bias in the measurements, the sought parameters will not be biased, i.e. $\overline{\delta\Theta}=0$, exclusive of specific bias of the estimator.

The variance $\Lambda_\Theta$ in the parameters is obtained on the basis of the variance in the measurements $\Lambda_M$, with:

$$\Lambda_\Theta = E[(\overline{d\Theta} - \overline{\delta\Theta})(\overline{d\Theta} - \overline{\delta\Theta})^T]$$

$$\Lambda_M = E[(\overline{dM} - \overline{\delta M}) \cdot (\overline{dM} - \overline{\delta M})^T]$$

By multiplying by the transposed quantity:

$$J_\Theta \cdot \overline{d\Theta - \delta\Theta}(\overline{d\Theta - \delta\Theta})^T \cdot J_\Theta^T) = J_M \cdot (dM - \delta M) \cdot (dM - \delta M)^T \cdot J_M^T$$

Without a bias, accessible above, taking the expectation:

$$J_\Theta \cdot \Lambda_\Theta \cdot J_\Theta^T = J_M \cdot \Lambda_M \cdot J_M^T$$

The variance in the parameters is expressed as:

$$\Lambda_\Theta = (J_\Theta^T \cdot J_\Theta)^{-1} \cdot J_\Theta^T \cdot J_M \cdot \Lambda_M \cdot J_{MT} \cdot J_\Theta \cdot (J_\Theta^T \cdot J_\Theta)^{-1}$$

An order of magnitude of the standard deviation of a parameter is then accessible by taking the square root of the associated diagonal element in $\Lambda_\Theta$, and the root mean square error $EQM_\Theta$ is approximated by:

$$EQM_\Theta^2 = \overline{\delta\Theta} \cdot \overline{\delta\Theta}^T + \Lambda_\Theta$$

The Cramer-Rao bound deduced as limit of the Fisher information matrix, which gives highest performance. For details, see chapter 4 of Harry L. Van Trees, Kristine L. Bell, "Bayesian Bounds for Parameter Estimation and Nonlinear Filtering Tracking" (2007).

With a set of observations and an estimator of the unknown parameters, it is also possible to evaluate this performance by way of a Monte-Carlo technique.

In this approach, having the geometric configuration (respective positions of the systems and objects):
theoretical measurements (distances, exact angles) are constructed,
the instrumental errors are applied to all of the observations,
the quantities with the erroneous measurements are determined by applying the operational estimation algorithm for estimating the quantities,
the second step is returned to in order to determine and apply a new set of measurement errors (randomly using known distribution laws and instrumental errors)
after a certain number of iterations (several tens), we ascertain a statistical distribution of the quantities obtained; from this distribution, it is possible to extract statistical characteristics (mean value and covariance) that describe the performance of the configuration (PGT).

For detail, see chapter "Monte Carlo Simulation of Synthetic Data Sets" in the work "Numerical Recipes in C." (2002)

The quality of estimation of the bearing (PGE) is evaluated (step C FIG. 11) by the processing unit of 51, or any other unit that may have information determined and communicated by the other systems, on the basis of the (generally redundant) observations and of an estimation algorithm according to the covariance of the estimated parameter vector and/or analysis of the residuals in the observations.

For detail, this operation is performed after having selected a configuration and having effectively implemented the measurements, the optimum values $\overline{\Theta}^*$ of the parameter vector and also its variance, which will give PGE, are sought. In the general case in which no explicit analytical solution is accessible and in which the number of measurements is redundant, the optimum solution $\overline{\Theta}^*$ is obtained via an estimation method based on the maximum likelihood or of least squares type with a gradient descent, Newton-Raphson, Gauss-Newton or else Levenberg-Marquardt algorithm or via a method using filtering of the observations with an extended Kalman filter for example. The optimum solution may be denoted:

$$\overline{\Theta}^* = \arg\min_{\overline{\Theta}} f(\Theta, M)$$

The components of the solution vector minimize the deviations in the measurements in the observation equations by weighting the respective covariances. This step requires linearizing the observation equations around an approximate value of the true value for the purpose of calculating derivatives or elements of Jacobian matrices in the vicinity of the values of the parameters. This is the reason for the benefit in ascertaining either an "approximate" measurement of the bearing, the term approximate corresponding to the fact that the error in the bearing measurement is far higher than the PGS (for example a magnetic compass), or an analytical calculation that uses an appropriate subset of the observations to calculate an approximate value of the bearing via explicit equations.

The present invention may be implemented on the basis of hardware and/or software elements. It may be available as a computer program product on a computer-readable medium, whether this be embedded within an optronic system or on an external central unit such as a mobile telephone, etc. The medium may be electronic, magnetic, optical, electromagnetic or be a broadcast medium of infrared type. Examples of such media are semiconductor memories (random access memory RAM, read-only memory ROM), tapes, floppy disks or magnetic or optical disks (compact disk-read-only memory (CD-ROM), compact disk-read/write (CD-R/W) and DVD).

The invention claimed is:

1. A method for estimating the bearing of an optronic system in a geographical reference frame, the optronic system being situated at a first position and denoted first optronic system, wherein it comprises the following steps:
  A) a collaborative configuration being defined by:
    a geometry or positions of at least two optronic systems including the first optronic system and at least one other optronic system, said optronic systems being respectively situated at separate positions and equipped with means for communication with one another and with devices for acquiring one or more objects in a scene, the first optronic system furthermore being equipped with an elevation measurement device and with a relative angle measurement device, each other optronic system furthermore being equipped with a distance measurement device and/or with an elevation measurement device and/or with a relative angle measurement device and/or with an approximate azimuth measurement device,
    K objects of the scene common to said optronic systems, whose positions are unknown,
    a nature of the measurements available for each optronic system,
    known statistical characteristics of the measurement errors,
    determining a collaborative collaboration in order to achieve a predetermined desired precision, which comprises the following sub-steps:
      A1) defining a collaborative configuration,
      A2) for this collaborative configuration, calculating, by way of a processing unit fitted to the first optronic system, a theoretical precision using said collaborative configuration,
      A3) comparing the calculated theoretical precision and the desired precision and, if the comparison is not satisfactory, reiterating steps A1), A2) and A3) for another collaborative configuration, and if not moving to step B),
  B) using the optronic systems of the collaborative configuration resulting from step A3), estimating a bearing of the first optronic system, which comprises the following sub-steps:
    B1) by way of the acquisition device of each optronic system, acquiring, in the scene, one or more objects common to said optronic systems, the direction of orientation between each optronic system and each object being unknown,
    B2) determining two geodetic positions from among those of said optronic systems,
    B3) for at least one common object:
      measuring the relative angle by way of the relative angle measurement device fitted to the first optronic system,
      measuring the elevation of the object by way of the elevation measurement device fitted to the first optronic system,
      by way of the first optronic system and of the measurement devices of each other optronic system, performing additional distance and/or elevation and/or relative angle and/or approximate azimuth measurements,
    B4) with the two positions and said measurements constituting observations, communication, by each other optronic system to the first optronic system, of the observations resulting from each other optronic system,
    B5) on the basis of the observations resulting from the first optronic system and of the observations communicated by each other optronic system, estimating the bearing of the first optronic system using a processing unit fitted to the first optronic system, configured to solve a system of equations having at least one unknown which is the bearing of the first optronic system,
  C) estimating a precision of the estimated bearing of the first optronic system, comparing it with the desired precision and, if the comparison is not satisfactory, reiterating steps A), B) and C), by choosing another collaborative configuration.

2. The bearing estimation method as claimed in claim 1, wherein the PGS is of the class of 1 mrd.

3. The bearing estimation method as claimed in claim 1, wherein the steps are performed by way of two optronic systems and for a single common object, and in that the additional measurements are obtained as follows:
  measuring the distance between each optronic system and the object by way of a distance measurement device fitted to each optronic system, measuring, in an approximate manner with precision better than 5°, an azimuth of the object by way of an approximate azimuth measurement device fitted to the first optronic system, and in that the observations are sufficient for estimating the bearing of the first optronic system.

4. The bearing estimation method as claimed in claim 1, wherein the steps are performed by way of two optronic systems and for two common objects, and in that the additional measurements are obtained as follows:
measuring the distance between each optronic system and each object by way of a distance measurement device fitted to each optronic system,
measuring the elevation between each optronic system and each object,
and in that the observations are sufficient for estimating the bearing of the first optronic system.

5. The bearing estimation method as claimed in claim 1, wherein the steps are performed by way of two optronic systems and for two common objects, and in that the additional measurements are obtained as follows by each optronic system:
measuring the distance between the first optronic system and each object by way of a distance measurement device fitted to the first optronic system,
measuring the elevation of each object by way of an elevation measurement device fitted to each optronic system,
measuring the relative angle of each object by way of a relative angle measurement device fitted to each optronic system, measuring an azimuth, with a precision better than 5°, on one of the two objects by way of an azimuth measurement device fitted to each optronic system,
on the basis of the observations, estimating, using the first or the second optronic system, the bearing of the second optronic system with a precision of at least the PGS class,
and in that the observations are sufficient for estimating the bearing of the first optronic system.

6. The bearing estimation method as claimed in claim 1, wherein the steps are performed by way of two optronic systems and for at least two common objects, and in that the additional measurements are obtained as follows:
measuring the distance between each optronic system and each object by way of a distance measurement device fitted to each optronic system,
measuring the elevation of each object by way of an elevation measurement device fitted to each optronic system,
measuring the relative angle of each object by way of a relative angle measurement device fitted to each optronic system,
on the basis of the observations, estimating the bearing of the second optronic system with a precision of at least the PGS class,
and in that the observations are sufficient for estimating the bearing of the first optronic system.

7. The bearing estimation method as claimed in claim 1, wherein the steps are performed by way of two optronic systems and for one common object, and in that the additional measurements are obtained as follows:
measuring the distance between each optronic system and the object by way of a distance measurement device fitted to each optronic system,
measuring the elevation of the object by way of an elevation measurement device fitted to each optronic system,
on the basis of the observations, estimating the bearing of the second optronic system with a precision of at least the PGS class,
and in that the observations are sufficient for estimating the bearing of the first optronic system.

8. The bearing estimation method as claimed in claim 1, wherein the steps are performed by way of two optronic systems and for one mobile common object, in that the measurements are performed over time intervals that at least partly overlap, and in that the additional measurements are obtained as follows:
measuring the distance between each optronic system and the object by way of a distance measurement device fitted to each optronic system,
measuring the elevation of the object by way of an elevation measurement device fitted to each optronic system,
measuring the relative angle by way of a relative angle measurement device fitted to each optronic system,
measuring an azimuth between each optronic system and the object, with a precision better than 5°, by way of an azimuth measurement device fitted to each optronic system,
on the basis of the observations, estimating the bearing of the second optronic system,
and in that the observations are sufficient for estimating the bearing of the first optronic system.

9. The bearing estimation method as claimed in claim 8, wherein the path of the mobile object is estimated at the same time as said estimations, over the time range of the measurements.

10. The bearing estimation method as claimed in claim 1, wherein the steps are performed for two common objects and by way of two optronic systems, in that the communication means are optical means, in that the additional measurements are obtained as follows:
measuring the distance corresponding to the sum of the distance between an object and an optronic system and the distance between said object and the other optronic system by way of a distance measurement device comprising an emitter fitted to the other optronic system and a receiver fitted to the optronic system,
measuring the relative angle of each object by way of a relative angle measurement device fitted to each optronic system,
measuring an azimuth, with a precision better than 5°, between each optronic system and each object by way of an azimuth measurement device fitted to each optronic system,
on the basis of the observations, estimating the bearing of the second optronic system,
and in that the observations are sufficient for estimating the bearing of the first optronic system.

11. The bearing estimation method as claimed in claim 1, wherein the steps are performed for at least two common objects and by way of at least two optronic systems, in that the additional measurements are obtained as follows:
measuring the relative angle of each object by way of the relative angle measurement device fitted to the first optronic system,
measuring the elevation of each object by way of the elevation measurement device fitted to the first optronic system,
measuring the distance between each optronic system and each object by way of a distance measurement device fitted to each optronic system,
and in that the observations are sufficient for estimating the bearing of the first optronic system.

12. The bearing estimation method as claimed in claim 1, wherein the steps are performed for at least one common object and by way of at least three optronic systems, in that the additional measurements are obtained as follows:
- measuring the relative angle of each object by way of a relative angle measurement device fitted to each optronic system,
- and the elevation of each object by way of an elevation measurement device fitted to each optronic system,
- determining the position of a third optronic system,
- on the basis of the observations, estimating the bearing of each optronic system, and in that the observations are sufficient for estimating the bearing of the first optronic system.

13. The bearing estimation method as claimed in claim 1, wherein the steps are performed for at least two common objects and by way of at least two optronic systems, in that the additional measurements are obtained as follows:
- measuring the relative angle of each object by way of a relative angle measurement device fitted to each optronic system,
- measuring the distance between each optronic system and each object by way of a distance measurement device fitted to each optronic system,
- measuring an azimuth between each optronic system and each object, with a precision better than 5°, by way of an azimuth measurement device fitted to each optronic system,
- on the basis of the observations, estimating the bearing as well as the roll and pitch of each optronic system, and in that the observations are sufficient for estimating the bearing of the first optronic system.

14. The bearing estimation method as claimed in claim 1, wherein the positions of the optronic systems are determined by way of a positioning device fitted to said optronic systems.

15. The bearing estimation method as claimed in claim 1, wherein the steps are performed by way of the first and of a second optronic system, for a common object and another object having a known position not common to the two optronic systems, that is to say visible only to the second optronic system, in that the additional measurements are obtained as follows:
- measuring the elevation of each object by way of an elevation measurement device fitted to the second optronic system,
- measuring the distance between the first optronic system and the common object by way of a distance measurement device fitted to the first optronic system,
- measuring the distance between the second optronic system and each object by way of a distance measurement device fitted to the second optronic system, in that the position of the first optronic system is determined by way of a positioning device fitted to said optronic system and in that the position of the second optronic system is determined by estimation, and in that the observations are sufficient for estimating the bearing of the first optronic system.

16. The bearing estimation method as claimed in claim 1, wherein the means for communication between the optronic systems are formed by a radio link.

17. The bearing estimation method as claimed in claim 1, wherein it comprises a step of calculating the coordinates and/or the direction of the acquired objects on the basis of the observations.

18. The bearing estimation method as claimed in claim 1, wherein at least one optronic system Sm, m varying between 2 and M, is a mobile optronic system having a known path, and in that the measurements performed from the mobile system(s) are temporally synchronized.

19. The bearing estimation method as claimed in claim 1, wherein at least one acquisition device is an omnidirectional sensor.

20. The bearing estimation method as claimed in claim 1, wherein at least one relative angle measurement device is a magnetic compass.

21. The bearing estimation method as claimed in claim 20, wherein the magnetic compass is calibrated by way of measurements on one or/and several objects.

22. The bearing estimation method as claimed in claim 1, wherein the observations are stored and able to be communicated by each optronic system.

23. The method for estimating a direction of orientation as claimed in claim 1, wherein it comprises, beforehand, a step of selecting the objects of the scene using a common visibility criterion and/or a performance criterion regarding the direction of orientation.

24. The method for estimating a direction of orientation as claimed in claim 1, wherein it comprises, beforehand, a step of selecting positions of the optronic systems.

25. A computer program product, said computer program comprising code instructions for carrying out the steps of the method as claimed in claim 1, when said program is executed on a computer.

\* \* \* \* \*